United States Patent [19]

Andrews

[11] Patent Number: 4,742,552
[45] Date of Patent: May 3, 1988

[54] VECTOR IMAGE PROCESSING SYSTEM

[75] Inventor: Barry A. Andrews, Auburn, Wash.

[73] Assignee: The Boeing Company, Seattle, Wash.

[21] Appl. No.: 536,385

[22] Filed: Sep. 27, 1983

[51] Int. Cl.$^4$ ............................................. G06K 9/36
[52] U.S. Cl. ......................................... 382/41; 382/49
[58] Field of Search ......................... 382/27, 41, 49, 54

[56] References Cited

U.S. PATENT DOCUMENTS

| | | | |
|---|---|---|---|
| 4,215,401 | 7/1980 | Holsztynski et al. | 382/49 |
| 4,363,104 | 12/1982 | Nussmeier | 382/41 |
| 4,442,543 | 4/1984 | Sternberg et al. | 382/49 |
| 4,484,349 | 11/1984 | McCubbrey | 382/27 |
| 4,524,455 | 6/1985 | Holsztynski et al. | 382/41 |

*Primary Examiner*—Leo H. Boudreau
*Attorney, Agent, or Firm*—H. Donald Nelson

[57] ABSTRACT

Hybrid parallel internally pipelined Vector Image Processors (24, 41, 54) which may also be externally pipelined. The exemplary Processors (24, 41, 54) include n processing elements ($PE_a$–$PE_n$)—wherein "n" is any whole integer but, when greater than "1", the elements are arranged in parallel in a one-dimensional column—for processing a two-dimensional XY PIXEL image array (25, 25', 38, 52) wherein each element ($PE_a$–$PE_n$) includes: (i) multiple cascaded latches (N1, N2, N3) in a one-dimensional row; (ii) a neighborhood functional unit ($NFU_n$) for performing NEIGHBORHOOD TRANSFORMS; (iii) an arithmetic logic unit (ALU) for performing ARTIHMETIC/LOGIC TRANSFORMS; (iv) means ($48_n$, $49_n$, $50_n$) for transferring data in the latches (N1, N2, N3) to the neighborhood functional unit ($NFU_n$) and to the neighboring north/south processors; (v) means ($48_n$, $49_n$) for transferring data in the latches (N1, N2) to the arithmetic logic unit (ALU); and (vi), means ($48_{n-1} \ldots 50_{n-1}$, $48_{n+1} \ldots 50_{n+1}$) for inputting image boundary and PIXEL neighbor data to the neighborhood functional unit ($NFU_n$). Where the number of rows ("X") of PIXEL data is greater than the number ("n") of processors ($PE_a$–$PE_n$), the system processes adjacent strips ($38_a$–$38_d$) of PIXEL rows with all PIXELS in a given column ("Y") within each strip ($38_a$–$38_d$) being processed in parallel and with all columns of PIXELS in each strip being processed in internally pipelined form. This latter system includes border Memories ($22_{NB}$, $22_{SB}$) for storing boundary data for each strip ($38_a$–$38_d$) and for cross-feeding the north and south rows of PIXEL output data in each strip to respective ones of the border Memories ($22_{SB}$, $22_{NB}$) for use in processing adjacent strips.

78 Claims, 13 Drawing Sheets

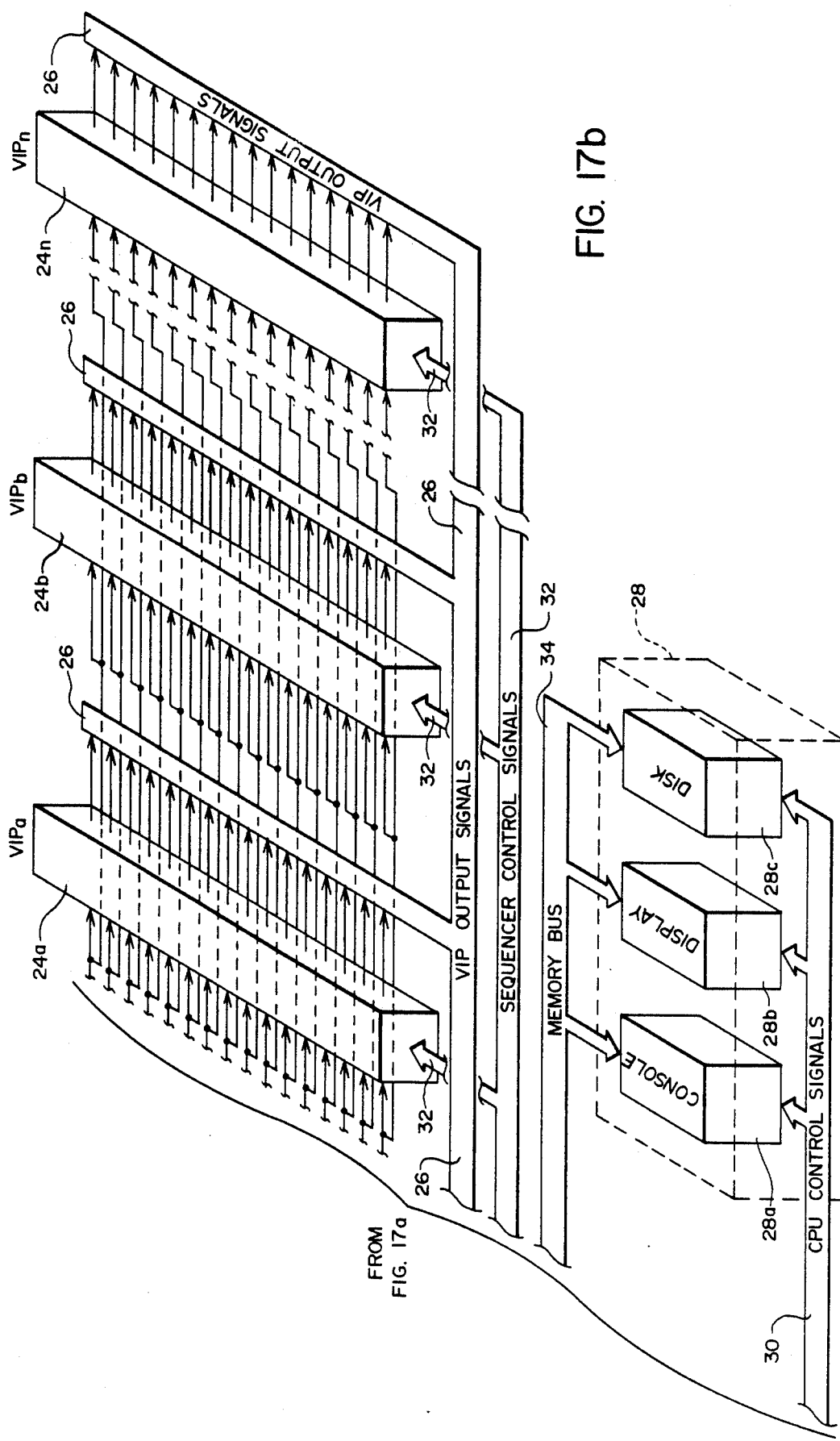

VECTOR IMAGE PROCESSING SYSTEM

BACKGROUND OF THE INVENTION

Technical Field

The present invention relates generally to image processing systems for processing digitally encoded image data derived from a suitable conventional sensor on a high-speed real time basis; and, more particularly, to a Vector Image Processor (hereinafter termed "VIP") and Vector Image Processing System employing a parallel internally pipelined architecture enabling processing of n rows of digitally encoded binary data in the form of an XY array of picture elements (hereinafter referred to as "PIXELS"), and wherein the n PIXELS (where "n" can be any desired whole integer) in each column are shifted sequentially through the VIP in column-by-column internally pipelined form, thereby minimizing the complexity of the processor in terms of size, hardware and attendant expenses, while optimizing processor speed so as to enable performance of specific image processing operations on a real time basis.

To this end, the present invention is directed to a VIP and Vector Image Processing System having a one-dimensional column of n (where "n" is any desired whole integer) parallel processor elements (hereinafter "PES") through which an XY array of digitally encoded PIXEL data is sequentially shifted in column-by-column internally pipelined form and wherein the VIP is programmed to permit a selected one or selected ones of conventional well-known image processing operations such, merely by way of example, as: (i) neighborhood operations (hereinafter generally termed "NEIGHBOR TRANSFORMS")—e.g., spatial filtering operations such as expansion, contraction and thinning used to modify image features and/or measure image characteristics based upon relationships between each PIXEL and its neighbors—typically, NEIGHBOR TRANSFORMS might, for example, include edge or boundary detection, size determination, brightness measurement, etc.—(ii) arithmetic operations (hereinafter generally termed ("ARITHMETIC TRANSFORMS") such as "add", "subtract" and "multiply" for smoothing images, altering brightness levels, and comparing two images one to another or a given image at two spaced points in time; and (iii), logic operations (hereinafter generally termed "LOGIC TRANSFORMS")—e.g., Boolean operations—such as AND, OR, and XOR (inclusive OR) for superimposing images, detecting changes, extracting objects of interest and/or removing unwanted details.

The foregoing representative TRANSFORMS are identified solely for the purpose of indicating exemplary types of processing operations commonly employed in image processing techniques and are not considered to be all inclusive or limiting. The particular processing operations to be carried out are generally well known and conventional, vary widely dependent upon the specific use for which the special purpose image processor is intended; are not critical to the present invention; and, consequently, are not described in detail in the ensuing specification.

The present invention finds particularly advantageous application in such fields as, merely by way of example: blood cell counting; picture enhancement; innumerable industrial applications such as, for example, sorting parts in an assembly line based upon the size of the parts, detection of defective parts, and/or orientation of parts to conform to a particular pattern for permitting subsequent automated machining and/or assembly operations—i.e., robotics; aerial and/or space reconnaissance; target tracking and/or identification; target seeking or location; guidance systems; and, numerous like applications, to name but a few of the possible technical fields within which the invention might find application.

BACKGROUND ART

During the past three decades and continuing into the 1980's, considerable efforts have been devoted in attempts to design image processors suitable for use in a wide variety of technical fields and differing applications. Prior to the advent of the present invention, such efforts have been primarily directed to developing conventional computers programmed for image processing. Unfortunately, however, conventional computers, when programmed for image processing, are extremely inefficient for most high speed applications. This is in part due to: (i) the tremendous volume of digitally encoded data present in a typical two-dimensional XY PIXEL array—for example, a typical image may contain from $10^3$ to $10^7$ PIXELS—and, consequent processing time with conventional computers may require up to several minutes, or even hours, of computational operations; (ii) the desire for operation on a real time basis; and (iii), the specialized nature of image processing algorithms. Consequently, in an effort to overcome these disadvantages, numerous special purpose, single instruction multiple data ("SIMD") image processors have been developed which, in general, fall into one of two distinct categories—viz., (i) a parallel Binary Array Processor (BAP); or (ii), a serial or Pipelined Processor.

BAP architectures have, in turn, generally fallen into one of two categories—viz., (i) a fully parallel processor or a locally parallel processor. Typical examples of fully parallel processors include: (i) the Cellular Logic Image Processor (CLIP); (ii) the Massively Parallel Processor (MPP); and (iii), the SOLOMON Processor. The CLIP, developed by M. J. B. Duff and his associates in the United Kingdom, has progressed through a series of models identified as CLIP I, CLIP II, CLIP III and CLIP IV; and, in CLIP IV, for example, the processor is designed to operate on all PIXELS in a 96×96 PIXEL array simultaneously and, therefore, requires a total of 9,216 PES. The MPP, originally designed by NASA for processing satellite data and, more recently redesigned by Kenneth Batcher at Goodyear Aerospace, has been designed to simultaneously process all PIXELS in an 128×128 PIXEL array and, as a consequence, the MPP requires 16,384 PES.

Fully parallel processors such as the CLIP series, MPP and SOLOMON have a number of disadvantages. In general, they employ fixed hardware construction designed to deal with images of a specific maximum size—e.g., 96×96 in the case of the CLIP IV; 128×128 in the case of the MPP; etc. However, if such fully parallel processors are used to process smaller images, then some (often a large percentage) of their capacity is wasted. If they are used to process larger images, then neighborhood relations are lost at the edges of the processor. This requires special treatment such, for example, as dividing the image frames into segments with boundaries that cut into objects; and, as a consequence, the resulting sliced objects do not permit of accurate spatial filtering operations.

In addition to the foregoing problems, fully parallel processors implemented as single integrated circuits ("ICs") have severe interconnection problems due to the fact that they employ a separate PE for each PIXEL to be processed. Where neighborhood operations are to be performed—and, assuming a 3×3 neighborhood—a fully parallel array processor designed to handle a 16×16 PIXEL image array would require a total of 376 pins just for neighbor communications with other 16×16 ICs. Memory interface requirements further exacerbate this problem. That is, two pins are required for each PE—viz. one for data input and one for data output—in order to perform a single operation for each cycle of the image buffer. Thus, the exemplary 16×16 parallel array processor described above would require an additional 512 pins for high speed operations. A single pin can, of course, be multiplexed, but this will at least halve the speed of operation dependent upon the number of signals multiplexed—i.e., if three signals are multiplexed, the speed of operation will be only one-third the speed of operation for a single signal; four signals multiplexed reduce the speed to one-fourth, etc. In addition to the foregoing communication pins, control and clock pins are also required. Consequently, fully parallel processors tend to be relatively large and complex, highly pin limited, extremely inflexible, and extremely expensive.

A locally parallel processor is, in effect, simply a smaller version of a fully parallel processor, and is designed to analyze only a subsection or window of an overall XY PIXEL image array. Typical examples of locally parallel processors are the Coulter diff3 (a 10×3 PIXEL window) and the Preston-Herron Processor (PHP) which employs an 18×3 PIXEL window. As in the case of a fully parallel processor—e.g., CLIP IV, MPP, SOLOMON, etc.—locally parallel processors have generally required sufficient hardware to simultaneously process all PIXELS in a given XY array (e.g., a 3×10 array in the diff3, or an 18×3 array in the PHP). Thus, in the fully parallel BAP, the XY array of PES is coextensive with the maximum size XY PIXEL image array to be processed and can require up to literally thousands of PES, associated memories, and the necessary hardware interconnections; while locally parallel BAPs, which are designed to include a smaller two-dimensional XY array of PES, still require a large number of associated memories and the necessary hardware interconnections which are mandated by the two-dimensional PE array.

Articles of interest describing the foregoing types of fully parallel and/or locally parallel BAP architecture designs, as well as various advantages and disadvantages thereof, include: *Computer Architectures For Image Processing In The U.S.A.*, Anthony P. Reeves, SIGNAL PROCESSING, Vol. 3, pp. 217-230 (1981), 0165-1684/81/0000-0000, published by North-Holland Publishing Company; and, *A General-Purpose High-Speed Logical Transform Image Processor*, J. M. Herron, J. Farley, K. Preston, Jr., and H. Sellner, IEEE TRANSACTIONS ON COMPUTERS, Vol. C-31, No. 8, pp. 795-800 (August 1982) 0018-9340/82/0800-0795.

A modified version of a conventional BAP is the PYRAMID, which, in a sense, also comprises a locally parallel processor; but, wherein each PE is used to process several PIXELS. A current known PYRAMID design requires a 4×16 tile size wherein each of four PES on a single chip is responsible for sixteen PIXELS with each operation being applied successively to each of sixteen PIXEL rows by four PES operating in parallel. The PYRAMID is constructed by interconnecting tiles to form arrays or levels, with the largest array being the baseplane and with successively smaller arrays being stacked thereabove—hence, the name PYRAMID. It has been suggested that the principal advantage of a pyramidal architecture is that lower resolution images can be processed more rapidly than higher resolution images; and, a pyramidal architecture permits operations at various resolutions with each array or level having 50% of the resolution and 25% of the image area of the array or level immediately therebelow. Unfortunately, however, one of the highly desirable purposes of image processing is the ability to conduct spatial filtering operations such as size measurements and/or comparisons. Since the purpose of spatial filtering is to discriminate between objects having different spatial characteristics, operation at high resolution is highly desirable. Moreover, the time required to move images to progressively higher levels at progressively lower resolutions tends to be a real disadvantage, particularly when working with relatively large pyramidal structures.

Pyramidal architectures have numerous disadvantages in terms of complexity, cost and flexibility. In general, a pyramidal architecture requires one-third more PES than a two-dimensional XY parallel array processor; and, in addition, requires interlevel communication, additional control circuits for each level, and more complex software and microcode to handle multilevel operations. As with the fully parallel array processors discussed above, the PYRAMID is also generally designed to handle images of a fixed maximum size. Consequently, when dealing with smaller images, capacity is wasted; and, when dealing with larger images, spatial filtering operations are either not possible or their accuracy is seriously denigrated unless additional circuitry is provided to allow segments to be overlapped. Pyramidal architectures, by employing shared PES and pin multiplexing, have tended to reduce the interconnection problems inherent in fully parallel processors; but, at a real cost or trade-off in terms of performance which is decreased by a factor of at least sixteen (16) when compared to a fully parallel array processor such, for example, as a 4×16 processor.

In U.S. Pat. No. 4,060,713-Golay, the pantentee discloses a BAP wherein the two-dimensional array of PIXELS are arranged such that every PIXEL in the array, except for the edge PIXELS, is surrounded by six (6) neighboring PIXELS disposed in an hexagonal array. Golay further describes in considerable detail various NEIGHBORHOOD TRANSFORM operations to be performed with respect to each PIXEL on a PIXEL-by-PIXEL basis including, for example, such neighborhood operations as spatial filtering—i.e., expansion, contraction, hole isolation, etc.

In an effort to overcome at least some of the foregoing disadvantages inherent in known BAP designs, computer architects have designed what are known as serial processors or "Pipelined Processors". A well known example of such a Pipelined Processor is the CYTOCOMPUTER developed by Environmental Research Institute of Michigan. An excellent description of Pipelined Processors in general, and the CYTOCOMPUTER in particular, appears in the aforesaid article by Anthony P. Reeves entitled *Computer Architectures For Image Processing In The U.S.A.*, SIGNAL PROCESSING, supra, at pp. 223-225; and, those interested in a detailed description of such processors are referred thereto and to U.S. Pat. Nos. 4,167,728-Sternberg, 4,174,514-Sternberg, 4,290,049-Sternberg et al and 4,301,443-Sternberg et al. Thus, the Sternberg '728 patent describes a Pipelined Processor having a chain of PES with the output of each PE providing the input to the next PE in the pipelined chain. In Sternberg's '514 patent, a Pipelined Processor is disclosed having parallel pipelines wherein each PE operates on a window or subsection of an image with the window contents being brought into position by means of shift registers and a raster scan technique. In the Sternberg et al '049 patent, the patentees describe an image processing technique for selecting the maximum PIXEL value in a 3×3 neighborhood; while the Sternberg et al '443 patent describes a portion of the CYTOCOMPUTER circuit.

The CYTOCOMPUTER serial processor has two primary advantages when compared to a BAP such as those discussed above—viz., it has no pin limitations and it does not require an image buffer memory since it can be connected directly to a sensor. However, the precision of the CYTOCOMPUTER serial processor as currently designed is limited to eight (8) bits, a major disadvantage when working with sensors having dynamic ranges of ten (10) or twelve (12) bits. While the CYTOCOMPUTER can be modified to provide ten (10) or twelve (12) bits of precision, most of the capacity would be wasted when working with binary images. Moreover, the CYTOCOMPUTER has inherent disadvantages in connection with data rates and latency—i.e., the built in time delay resulting from processing data in step-by-step pipeline fashion as measured from the time of entry of a PIXEL into the pipeline through the time of exit thereof. In short, the CYTOCOMPUTER has very limited utility in connection with real time applications; it has too little precision for infra-red sensors and the like; it is incapable of handling the data rate for many of such sensors; it requires too many chips for use with commonly used image processing algorithms; it has limited arithmetic capability; and, it employs a fixed execution sequence; to name but a few of the disadvantages inherent with this type of serial image processor.

Other prior patent disclosures of interest include U.S. Pat. Nos.: 4,224,600—Sellner (a fully parallel microprocessor based BAP suitable for use with binary images and said to be an improvement based on the aforesaid Golay U.S. Pat. Nos. 4,060,713); 4,229,797—Ledley (a high speed video processor employing a video crossbar switch, D/A converters, x/y delay buffers, etc.); 4,309,691-Castleman (a processing system employing multiple cascaded or pipelined general purpose microcomputers); 4,334,241—Kashioka et al (a special purpose pattern matching circuitry); 4,334,274—Augi et al (a special purpose digital circuit employed to determine whether an object or Blob in a digital image lies within a closed boundary); 4,325,085—Gooch (a digital circuit for compressing facsimile data for storage or transmission); 4,143,401—Coviello and 4,258,394—Kennedy (digital circuits for use in edge detection of gray scale images); 4,330,833—Pratt et al (a digital filtering technique for enhancement of digital images); 3,809,902—Cofer et al (a facsimile recorder used to produce a picture of electrolytic cells); 4,302,775—Widergren et al (a digital video compression system); 4,238,768—Mitsuya et al (a special purpose digital circuit for digitally encoding image data for storage or transmission through a data channel); 4,297,727—Ogawa et al (facsimile apparatus employing a microcomputer as a central controller); 4,184,206—Harano (an apparatus for assigning the most accurate value to a PIXEL as the input image is digitized); and, 4,254,467—Davis et al (a vector to raster processor for converting graphics data to a form suitable for plotting or display). Attention is also directed to an article entitled *Architecture For A Digital Programmable Image Processing Element*, Stanley A. White, CONFERENCE: ICASSP 81, PROCEEDINGS OF THE 1981 IEEE INTERNATIONAL CONFERENCE ON ACOUSTICS, SPEECH AND SIGNAL PROCESSING, pp. 658-661 (30 Mar.-1 Apr., 1981).

SUMMARY OF THE INVENTION

An image processing system including special purpose processing hardware and methods for processing digitally encoded binary and gray scale data output from a sensor in a two-dimensional XY PIXEL image array and wherein the system includes a one-dimensional column of n PES (wherein "n" can be any desired whole integer) arranged in parallel for parallel processing of such rows of PIXELS in the two-dimensional array and wherein the columns of PIXELS in the array are relatively fed or shifted in column-by-column fashion through the Vector Image Processor (VIP) of the invention in internally pipelined sequential order; and, wherein the PIXELS in each column are processed in parallel while permitting a NEIGHBORHOOD, ARITHMETIC or LOGIC TRANSFORM to be conducted simultaneously on a plurality of PIXELS in each column.

To this end, and in accordance with one relatively narrow specific embodiment of the invention, the image processing system or VIP of the present invention includes a single PE having: (i) a plurality of latches in a two-dimensional neighborhood array—for example, a two-dimensional AB neighborhood array wherein both "A" and "B" are equal to three (3), thus forming a 3×3 neighborhood array; (ii) a neighborhood functional unit (hereinafter referred to as "NFU"); and (iii), at least one of an arithmetic unit (hereinafter referred to as "AU"), a logic unit (hereinafter referred to as "LU"), or a comosite arithmetic logic unit (hereinafter referred to as "ALU"); and, wherein n rows of digitally encoded PIXEL data (where "n" is equal to the value of "A" in the AB neighborhood array) contained within the two-dimensional PIXEL image array are relatively shifted through the VIP in column-by-column pipelined fashion with n adjacent PIXELS—for example, three (3) adjacent PIXELS—in each horizontal row being processed being shifted into, held for processing in, and shifted out of n—e.g., three (3)—cascaded latches and wherein: (a) the digitally encoded data stored in all nine (9) latches in the AB neighborhood array at any given instant of time is fed to the NFU for performing a selected NEIGHBORHOOD TRANSFORM; or (b), while the digitally encoded PIXEL data in two (2) adjacent latches in a given row containing the particular PIXEL of interest being processed is fed to one of an AU, LU or ALU for performing an ARITHMETIC or LOGIC TRANSFORM.

In a more generalized and practical embodiment of the invention, n PES (where "n" is any desired whole integer greater than "1") are arranged in parallel in a one-dimensional columnar array with each PE including: (i) a plurality of cascaded latches—for example, three (3) latches—in a one-dimensional row; (ii) an NFU; and (iii), at least one of an AU, a LU, or an ALU; and, wherein the NFU is provided with data input from the latches contained in its PE and is simultaneously provided with data input from the latches in the neighboring north and south PES. In this latter more generalized form of the invention, the digitally encoded PIXEL data contained within n rows of data in an XY PIXEL image array is progressively and relatively shifted through the VIP containing n PES in internally pipelined column-by-column fashion for permitting simultaneous parallel processing of n PIXELS in each successive column being processed to permit a NEIGHBORHOOD, ARITHMETIC or LOGIC TRANSFORM.

In those instances where the value "X" in the two-dimensional XY PIXEL image array is greater than the value "n" for the number of PES contained within the VIP, adjacent strips each containing "n" rows of PIXEL image data are successively processed by the VIP; and, in such instances, the VIP is provided with edge memories for inputting digitally encoded data representative of: (i) either the northernmost image border or boundary, or the southernmost row of digitally encoded PIXEL data in the adjacent northern strip; and, (ii), either the southernmost image border or boundary or the northernmost row of digitally encoded PIXEL data in the bordering southern strip, so as to permit spatial filtering of data at the northern and southern edges of each strip of digitally encoded data being processed. The VIP system of the present invention further permits of external pipelining of a plurality of VIPs with the digitally encoded data output from one VIP being input to the next adjacent downstream VIP for conducting a further processing operation thereon.

More specifically, it is a general aim of the present invention to provide a highly simplified image processing system architecture which overcomes the disadvantages inherent in conventional BAP and serial, or pipelined, image processing architectures and which is capable of performing any selected preprogrammed NEIGHBORHOOD, ARITHMETIC or LOGIC operation on a two-dimensional digitally encoded PIXEL image array on a real time basis while employing only a minimal amount of hardware that can be packaged in an optionally sized configuration at minimal expense. Stated differently, it is a general objective of the invention to provide a special purpose image processor for handling computationally expensive tasks which would otherwise place too great a load on a conventional computer or Central Processing Unit (CPU) due to: (i) the tremendous volume of data in typical digitally encoded two-dimensional XY PIXEL image arrays; and (ii), the specific nature of image processing algorithms; yet, wherein the special purpose image processor is characterized by its ability to carry out its image processing functions on a real time basis.

In one of its more important aspects, it is an object of the present invention to provide a Vector Image Processor (VIP) employing a one-dimensional columnar array of n parallel PES for permitting a preprogrammed processing operation on digitally encoded PIXEL data oriented in a two-dimensional XY PIXEL image array in parallel internally pipelined fashion, yet which does not require shift registers, microprocessors, video crossbar switches, D/A converters, and/or similar hardware employed in conventional types of images processing systems.

A more specific object of the invention is the provision of a VIP having a plurality of n parallel bit-serial synchronous PES under the control of a general purpose counter so as to permit handling of image processing functions on a real time basis.

Yet another object of the present invention is the provision of a Vector Image Processor (VIP) comprising a hybrid parallel/pipelined architecture, and, more specifically, a parallel internally pipelined architecture which may, optionally, be configured as a parallel internally and externally pipelined architecture.

In another of its important aspects, it is an object of the invention to provide a special purpose image processing system characterized by its high speed real time operational characteristics and its ability to process digitally encoded image data derived from any suitable sensor such as a video image derived from a TV sensor, an imaging IR sensor, a laser radar, or any other sensor capable of generating digitally encoded video image data in a two-dimensional XY array of discrete PIXELS and wherein the two-dimensional XY array is relatively shifted through the VIP in column-by-column internally pipelined fashion.

In another of its more specific aspects, it is an object of the invention to provide a VIP characterized by its simplicity and having a one-dimensional columnar array—i.e., a vector—of PES characterized by their flexibility and their ability to handle a two-dimensional XY PIXEL image array in parallel internally pipelined fashion—viz., wherein a plurality of rows of digitally encoded image data in the form of PIXELS are fed in parallel column-by-column internally pipelined fashion through the VIP which serves to process the data employing bit-serial arithmetic wherein each PIXEL is fed as a stream of one or more bits of any desired length, and which is capable of handling digitally encoded binary and/or gray scale data with equal ease.

In another of its more detailed aspects, it is an object of the invention to provide a special purpose VIP characterized by its ability to perform well known image processing operations such as: noise filtering; spatial filtering—i.e., detection of size, shape and brightness or contrast of an object, target or "Blob" of interest; pattern matching; superimposition of two images; detection of image changes; extraction of objects of interest; removal of unwanted details; modification of image features; measurement of image characteristics by NEIGHBORHOOD TRANSFORMS such as expansion, contraction or the like based upon the relationships between each PIXEL of interest and its nearest neighboring PIXELS—e.g., its eight (8) surrounding PIXELS in a two-dimensional $3\times3$ neighborhood or its six (6) surrounding PIXELS in a Golay-type neighborhood.

In yet another of its more detailed aspects, the invention provides for a VIP comprising a one-dimensional columnar array of PES wherein each PE processes a single PIXEL at a time and which, therefore, requires very little circuitry, thus enabling implementation of up to on the order of sixty-four (64) or more PES on a single integrated circuit (IC).

A further general aim of the present invention is the provision of a special purpose one-dimensional columnar VIP employing a plurality of parallel PES wherein each scan of a two-dimensional XY PIXEL image array serves to perform a single processing operation—which may comprise a NEIGHBORHOOD TRANSFORM, an ARITHMETIC TRANSFORM, or a LOGIC TRANSFORM such as a Boolean logic operation—over an entire two-dimensional XY PIXEL image array permitting multiple processing operations to be conducted by processing such digitally encoded image representative binary and/or gray scale data through: (i) a series of externally pipelined VIPs; (ii) iteratively through a single VIP; and/or (iii) iteratively through n externally pipelined VIPS; thereby allowing desired trade-offs between speed and complexity so as to meet specific operating requirements.

A further objective of the invention is the provision of an image processing system which permits the processor to rapidly scan an overall two-dimensional XY image of digitally encoded binary and/or gray scale PIXEL data to locate objects or areas of interest, and to then isolate on segments of the overall image and conduct a desired NEIGHBORHOOD, ARITHMETIC or LOGIC processing operation thereon, all on a real time basis.

DESCRIPTION OF THE DRAWINGS

These and other objects and advantages of the present invention will become more readily apparent upon reading the following detailed description and upon reference to the attached drawings, in which:

FIG. 7 is a line drawing representative of a fragmentary XY PIXEL image array depicted in diagrammatic format and defining an object of "Blob" formed by forty-one centrally located PIXELS having binary values or binary thresholded values of "1" surrounded by a plurality of PIXELS having binary values or binary thresholded values of "0" indicative of the absence of a target, object or Blob of interest;

FIG. 8 is a diagrammatic line drawing representative of a typical 3×3 PIXEL neighborhood wherein the centermost PIXEL "E" may be considered representative of any given PIXEL in the particular XY PIXEL image array being processed—e.g., the XY PIXEL image array shown in FIG. 7;

FIGS. 9a and 9b are diagrammatic line drawings representative of 3×3 PIXEL neighborhoods and here indicative of an algorithm that may be employed during an exemplary neighborhood functional operation wherein a given object or Blob is horizontally eroded for purposes of determining the height thereof;

FIGS. 10a through and including 10c are respectively representative of the first, second and third operational stages performed in accordance with the algorithm in an horizontal erosion process to determine the height of the Blob depicted in FIG. 7;

FIGS. 11a and 11b are similar to FIG. 9a and 9b, respectively, but are here illustrative of an algorithm that may be employed in a vertical erosion process to determine the width of a particular object or Blob;

FIGS. 12a through 12d are similar to FIGS. 10a through 10c, but are here illustrative of the first, second, third and fourth operational stages performed in accordance with an algorithm for determining the width of the object or Blob depicted in FIG. 7;

Figure 1:
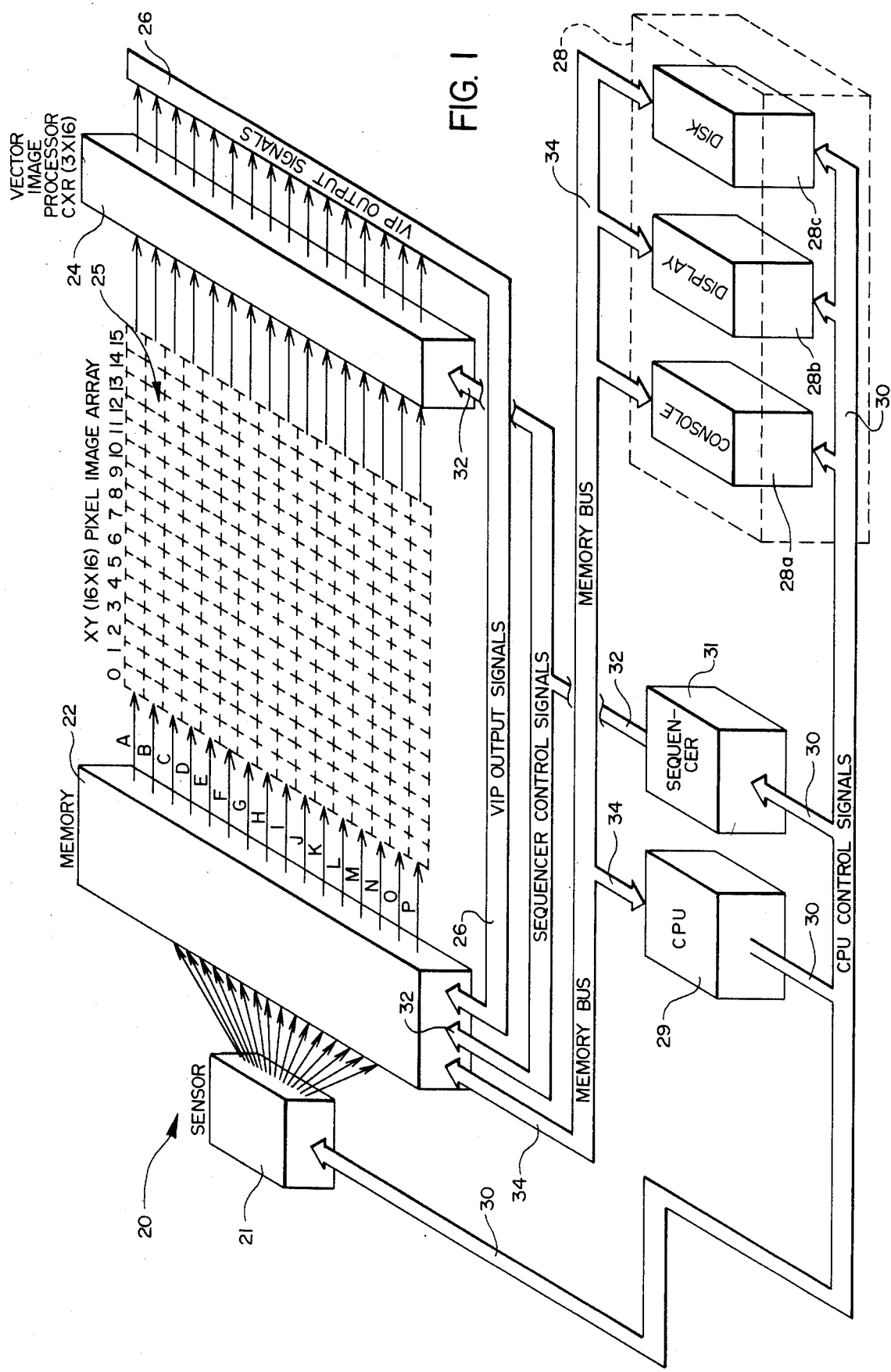
FIG. 1 is a three-dimensional block-and-line drawing in highly simplified diagrammatic form, here illustrating an image processing system of the type including: (i) a suitable Sensor for detecting targets or other image type objects and inputting digitized data representative thereof into the image processing system; (ii) a Central Processing Unit ("CPU"); (iii) a Memory; (iv) one or more peripherals such, for example, as a Console, Display and/or Disk; (v) a Vector Image Processor ("VIP") embodying features of the present invention; and (vi), a Sequencer; it being understood that the broken line representation of the two-dimensional XY PIXEL image array here shown is an imaginary diagrammatic pictorial representation provided solely for purposes of clarity and to facilitate an understanding of the invention and is, therefore, to be distinguished from the other hardware components shown in solid lines.

While the invention is susceptible of various modifications and alternative forms, specific embodiments thereof have been shown by way of example in the drawings and will herein be described in detail. It should be understood, however, that it is not intended to limit the invention to the particular forms disclosed; but, on the contrary, the intention is to cover all modifications, equivalents and alternatives falling within the spirit and scope of the invention as expressed in the appended claims.

DETAILED DESCRIPTION

Before turning to the drawings and to a detailed description of the invention and a typical environment within which it fines particularly advantageous application, and in an effort to facilitate an understanding of the ensuing description, it should be noted than an exemplary two-dimensional XY PIXEL image array is commonly referred to as having "X" horizontal rows of PIXEL data disposed in "Y" vertical columns, wherein "X" and "Y" may have any whole integer value—for example, XY arrays having 8×8 ... 16×16 ... 32×32 ... 96×96 ... 128×128 ..., etc. configurations. While the invention is not, in any sense, limited to any particular size array, those skilled in the art will appreciate that typical sensors of the type commonly employed in conjunction with image processing systems will commonly output a video image containing a tremendous volume of digitally encoded binary and/or gray scale data in a two-dimensional XY PIXEL image array containing, merely by way of example, from $10^3$ to $10^7$ PIXELS disposed in horizontal rows and vertical columns. However, it will be understood that references in the ensuing specification and claims to "row" and/or "column" are not to be considered as limiting but, rather, have been set out simply to facilitate an understanding of the invention since the Vector Image Processor ("VIP") of the invention is equally applicable to processing, in parallel, horizontal rows of PIXELS in internally pipelined column-by-column form, and to processing, in parallel, vertical columns of PIXELS in internally pipelined row-by-row form. In the first instance, the Vector Image Processor of the invention would comprise a one-dimensional columnar array of parallel processing elements ("PES"); whereas in the latter instance, it would comprise a one-dimensional row of parallel processing elements ("PES"). Moreover, in either case, the particular number of processing elements ("PES") employed may vary widely dependent namely upon design and/or cost considerations, operating speed requirements, anticipated maximum image size, etc.; and, indeed, there may be any desired number of processing elements ranging from one (1) to one hundred twenty-eight (128), or even significantly more.

It will also be understood that terms such as top ("north"), bottom ("south"), left ("west"), and right ("east") have been used herein simply for purposes of facilitating an understanding of the invention; and, such terms have not been used in a limiting sense.

It will further be understood by those skilled in the art that the particular TRANSFORM employed—viz., a NEIGHBORHOOD TRANSFORM, an ARITHMETIC TRANSFORM or a LOGIC TRANSFORM—will, for the most part, be quite conventional and may vary widely dependent upon the particular environment within which the invention is employed. Consequently, while exemplary NEIGHBORHOOD TRANSFORMS for detecting edges and/or sizes of objects of interest will be described herein in some detail, such description is solely for purposes of facilitating an understanding of the invention and has been set forth in the area of neighborhood logic operations as contrasted with arithmetic operations ("add", "subtract", "multiply") and logic operations (AND, OR, XOR) simply because it is believed that neighborhood logic operations may not enjoy as widespread familiarity among persons skilled in the art pertaining to computer architecture as arithmetic and/or logic operations. Nevertheless, all of such operations and the algorithms for performing the same are believed to be well known to persons knowledgeable in the art pertaining to image processing; and, therefore, will not be exhaustively described in detail herein.

Those interested in ascertaining further details of such logic and/or arithmetic image processing operations and algorithms are referred, for example, to such discussions as are set forth in the aforesaid articles by: Herron et al, IEEE TRANSACTIONS ON COMPUTERS, Vol. C-31, No. 8, pp. 795-800 (August, 1982); Reeves, SIGNAL PROCESSING, Vol.3, pp. 217-230 (1981); and, White, CONFERENCE: ICASSP 81, PROCEEDINGS OF THE 1981 IEEE INTERNATIONAL CONFERENCE ON ACOUSTICS, SPEECH AND SIGNAL PROCESSING, Atlanta, Ga. (Mar. 30-Apr. 1, 1981); all of which have been more fully identified above; as well as the following additional articles: *Pattern Detection and Recognition,* Unger, PROCEEDINGS OF THE IRE, p. 737 (1959); *Feature Extraction,* Goley, and *Hexagonal Pattern Transformers,* Preston, Jr., IEEE TRANSACTIONS ON COMPUTERS, Vol. C-20, No. 9 (September, 1971); *The Texture Analyzer,* JOURNAL OF MICROSCOPY, Vol. 95, Part II, pp. 349–356 (April, 1972); *Random Sets And Integral Geometry,* G. Matheron, Wiley (1975); *Integral Geometry As A Tool In Pattern Perception,* Albert B. J. Novikoff, PRINCIPLES OF SELF-ORGANIZATION, edited by Von Foerstn and Zopf, Pergamon Press (1962); and *Stereology And Structuring Elements,* JOURNAL OF MICROSCOPY, Vol. 95, Part I, pp. 93–103 (February, 1972). Reference may also be had to the descriptions set forth in the aforesaid U.S. Pat. Nos. 4,060,713—M. J. E. Golay; 4,224,600—Sellner; 4,167,728—Sternberg; and, 4,174,514—Sternberg. It will be understood that the foregoing bibliography of articles and patents is by no means exhaustive.

Finally, to facilitate readibility of the ensuing description, reference will hereinafter be made to the following acronyms which are, or will be, quite familiar to persons skilled in computer architecture and/or image processing techniques:

ALU—an arithmetic logic unit;
AU—an arithmetic unit—e.g., an adder/subtractor/multiplier;
BAP—a binary array processor—either fully or locally parallel;
CPU—a central processing unit;
EPROM—an erasable programmable read only memory;
FLIR—a forward looking infra-red sensor;
IC—an integrated circuit;
LU—a logic unit—e.g., a Boolean logic device;
NFU—a neighborhood functional unit;
PE—a processing element;
PIXEL—a digitally encoded picture element;
PLA—a programmable logic array;
PROM—a programmable read only memory;
RAM—a random access memory;
ROM—a read only memory;
SAR—a synthetic aperture radar sensor;
SIMD—a single instruction multiple data processor;
SLA—a storage logic array; and,
VIP—a Vector Image Processor embodying features of the present invention.

A. The Environment Of The Invention

Turning now to the drawings, there has been illustrated in FIG. 1, in highly diagrammatic, block-and-line form, an exemplary image processing system, generally indicated at 20, comprising a Sensor 21, a video image buffer Memory 22 for receiving digitally encoded binary and/or gray scale image representative PIXEL data from the Sensor 21; and, a one-dimensional image processor, here a VIP 24 embodying features of the invention for processing, in internally pipelined column-by-column format, the "X" rows of PIXEL data output from the Memory 22 in the form of a two-dimensional XY PIXEL image array which is here generally illustrated in highly diagrammatic, pictorially imaginary form at 25. In the exemplary image processing system 20 shown in FIG. 1, the two-dimensional XY PIXEL image array comprises a 16×16 array having sixteen (16) horizontal "X" rows of PIXELS labelled as rows "A" through "P" from north to south, and sixteen (16) vertical "Y" columns of PIXELS labelled as columns "0" through "15" from west to east. As shown, the processed data is output from the VIP in parallel row format and sequentially in internally pipelined column-by-column format and is fed to the image buffer Memory 22 via a VIP output signal three-state bus 26.

As is quite conventional with the illustrative type of image processing system 20 here shown—except, of course, for the inclusion of the exemplary VIP 24 embodying the invention—the system 20 may include one or more peripherals 28 such, for example, as a Console 28a, a Display 28b and/or a Disk Memory 28c, all under the control of a host CPU 29 which provides control signals via bus 30 to the Sensor 21, peripherals 28a, 28b and/or 28c, and a Sequencer 31. In the illustrative image processing system 20, Sequencer 31 provides control signals for the image buffer Memory 22 and the VIP 24 under the control of CPU 29 via signal bus 32; it being understood by those skilled in the art that the particular control, clock and similar signals, and the timing thereof, will vary widely dependent upon the environment within which the image processing system 20 is to be employed and the particular operational instructions desired by the user/programmer; and, since such control, clock and similar signals, as well as the programming thereof, are completely conventional and form no part of the present invention except for enabling the continuous operational mode whereby the digitally encoded data is shifted through the system and processed, they will not be further detailed herein. Finally, the exemplary image processing system 20 includes a three-state Memory bus 34 which serves to provide data/communication paths coupling the image buffer Memory 22, one or more peripherals 28a–28c, and CPU 29 together.

In the exemplary image processing system 20 illustrated environmentally in FIG. 1, it will be understood that the particular details of the Sensor 21 are not critical to the present invention and will vary widely dependent upon the particular field and environment within which the system 20 is employed. Thus, the Sensor 21 may comprise a FLIR, an imaging infra-red (IR) sensor, a sonic or laser radar, a SAR, a TV sensor, or any similar sensor characterized by its ability to output a video image on a real time basis and in the form of digitally encoded PIXEL data in a two-dimensional PIXEL image array 25. And, as previously indicated, such sensors will typically output a two-dimensional XY PIXEL image array containing on the order of from $10^3$ to $10^7$ discrete PIXELS. Similarly, the image buffer Memory 22, peripherals 28, CPU 29 and Sequencer 31 are entirely conventional in construction and mode of operation and may be programmed as required and/or desired to meet the various operational parameters and objectives set for the image processing system 20. Accordingly, such components are not described in greater detail in the ensuing description.

B. Image Arrays/Neighborhoods/TRANSFORMS General Information

Figure 2:
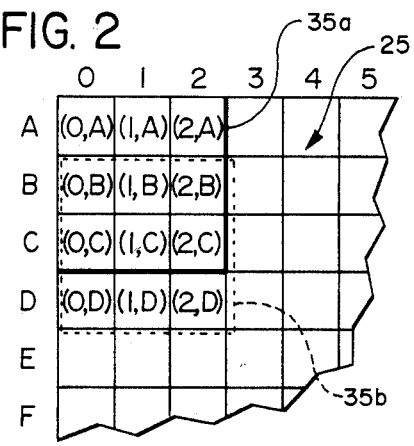
FIG. 2 is a fragmentary block-and-line drawing depicting—in highly diagrammatic, somewhat imaginary pictorial format—a typical two-dimensional XY PIXEL image array suitable for processing in accordance with the present invention, here particularly illustrating a plurality of typical overlapping two-dimensional AB (here, 3×3) PIXEL neighborhoods.

Referring now to FIG. 2, there has been illustrated, in pictorially imaginary form, a fragmentary portion of a typical two-dimensional XY PIXEL image array 25 here comprising fragmentary portions of vertical columns identified as "0" through "5" and horizontal rows identified as "A" through "F". Thus, any given PIXEL may be identified by its "X" and "Y" coordinate addresses, thereby enabling entry into, storage within, and/or withdrawal from comparable address positions in Memory 22 (FIG. 1). As shown in FIG. 2, the illustrative PIXELS describe a series of overlapping AB neighborhoods—for example, the 3×3 neighborhood 35a circumscribed by the relatively heavy solid line surrounding PIXEL locations (0,A) through (2,A), (0,B) through (2,B), and (0,C) through (2,C); and, the overlapping 3×3 neighborhood 35b circumscribed by the broken line surrounding PIXEL locations (0,B) through (2,B), (0,C), through (2,C), and (0,D) through (2,D). In like manner, other overlapping 3×3 neighborhoods (not shown) can be readily defined by any selected group of nine (9) neighboring PIXELS located at the intersections of any three adjacent vertical columns and any three adjacent intersecting horizontal rows.

It has been found that for most special purpose image processing applications, it is highly advantageous to employ 3×3 neighborhoods since PES embodying the invention can be readily implemented with a single data input terminal, six (6) neighbor input terminals (the two additional neighbor input terminals being derived from the data input terminal), six (6) neighbor output terminals, and a single data output terminal together with the necessary control and clock terminals; thereby enabling implementation of up to on the order of sixty-four (64) or more PES on a single IC. However, as will become apparent as the ensuing description proceeds, the invention is not limited to use with 3×3 PIXEL neighborhoods, but, rather, it can be employed with Golay Surrounds—a seven (7) PIXEL neighborhood wherein each PIXEL of interest has six (6) immediate neighbors; 2×2 neighborhoods; 5×5 neighborhoods; etc. Of course, as the neighborhoods increase in size, considerably more interconnections are required since each PIXEL of interest has considerably more neighbors— for example, in a 5×5 neighborhood, the centermost PIXEL of interest has twenty four (24) neighbors, thus significantly increasing the number of PE interconnections required.

Figure 3:
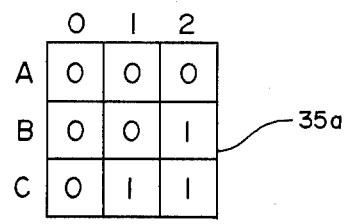
FIG. 3 is a highly diagrammatic drawing representative of an exemplary 3×3 AB PIXEL neighborhood wherein the nine (9) PIXELS illustrated have, or may have been threshold to have, binary values of either "0" or "1", here particularly illustrating an arrangement wherein the binary values of the PIXELS in the "A" horizontal row and in the "0" vertical column are such that they respectively define the upper (hereinafter referred to as "north") and left (hereinafter referred to as "west") boundaries or borders of an image.

As is conventional with SIMD image processors including BAPs (both fully parallel and locally parallel) and/or Pipelined Processors, the PIXEL data may be digitally encoded binary and/or gray scale data—indeed, the VIP 24 (FIG. 1) of the present invention can function equally well with either and/or both types of digitally encoded bits. However, for many spatial filtering operations and the like, it may be preferable to work with digitally encoded binary data having, or thresholded to have, a binary value of "0" ("False") or "1" ("True"). For example, in edge or boundary detection with respect to objects, or "Blobs", of interest, the presence of a binary "0" value is indicative of the absence of a Blob of interest; whereas the presence of a binary "1" value is indicative of the presence of a Blob of interest. Considering, for example, the 3×3 neighborhood 35a shown in FIG. 2, and assuming that the nine (9) PIXELS defining such neighborhood have, or have been thresholded to have, binary values of "0" or "1" as shown in FIG. 3, then it will be observed that a Blob of interest—i.e., as indicated by binary values of "1"—appears at PIXEL locations (2,B), (1,C) and (2,C), while all other PIXELS in the 3×3 neighborhood 35a have binary values of "0" indicating the absence of a Blob of interest. Thus, the presence of PIXELS (0,A) through (2,A) having binary values of "0" in row "A" will provide neighbor data for the associated PE (not shown in FIG. 3) indicative that row "A" defines the north boundary or border of the object within that 3×3 neighborhood, such object being defined by PIXEL locations (2,B), (1,C) and (2,C). Similarly, the presence of PIXELS having binary values of "0" at all PIXEL locations in column "0" provides neighbor data for the associated PE indicating that column "0" defines the west border or boundary of the object within that 3×3 neighborhood. The algorithms for enabling the foregoing edge detection computations are completely conventional and well known to persons skilled in the art; and, therefore, will not be described herein.

Figure 4:
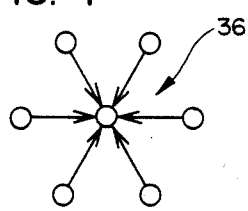
FIG. 4 is a diagrammatic line drawing representative of a typical PIXEL image array known as a "Golay Surround", an array which may also be processed utilizing equipment and processes embodying features of the present invention.
Figure 5:
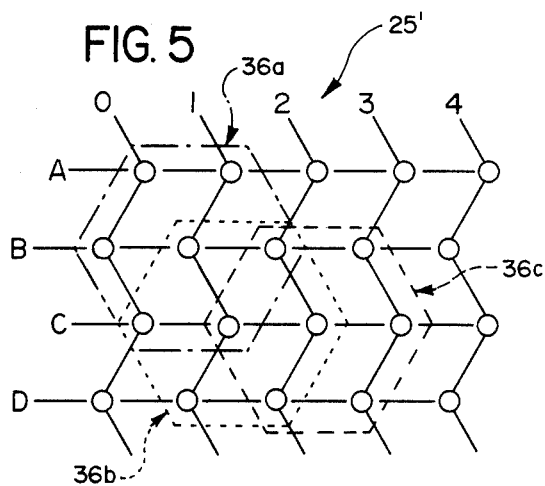
FIG. 5 is a diagrammatic line drawing representative of a plurality of overlapping neighboring Golay Surrounds which may, for purposes of an understanding of the invention, be considered to also define a two-dimensional XY PIXEL image array wherein at least one of either the horizontal rows or the vertical columns of PIXELS—here the vertical columns "0" through "4"—are offset to define saw-tooth shaped lines.

Turning next to FIG. 4, there has been illustrated a conventional PIXEL neighborhood, generally indicated at 36, more commonly known in the art as a "Golay Surround". See, e.g., U.S. Pat. No. 4,060,713 issued to M. J. E. Golay for a more complete description of NEIGHBORHOOD TRANSFORMS involving the use of Golay Surrounds. Suffice it to say that a typical Golay Surround 36 is defined by a centermost PIXEL of interest surrounded by six (6) PIXELS configured in an hexagonal array—i.e., the neighborhood 36 comprises a total of seven (7) PIXELS. As will be more clearly evident upon inspection of FIG. 5, a fragmentary portion of a PIXEL image array 25' has been illustrated wherein the array is defined by a plurality of overlapping Golay Surround neighborhoods, three of which are shown at 36a, 36b, and 36c. For purposes of the present invention, the PIXEL image array 25' shown in FIG. 5 may be considered the full equivalent of the rectilinear two-dimensional XY PIXEL image array 25 depicted in FIGS. 1 and 2; and, it may be processed by the VIP 24 (FIG. 24) of the present invention in the same fashion as the PIXEL image array 25. Thus, the PIXEL image array 25' depicted fragmentarily in FIG. 4 is defined by discrete PIXELS located at the intersections of parallel, linear, horizontal rows "A" through "D" and parallel, saw-tooth-shaped, vertical columns "0" through "4"; and, therefore, the array 25' also comprises a two-dimensional XY PIXEL image array.

Figure 6:
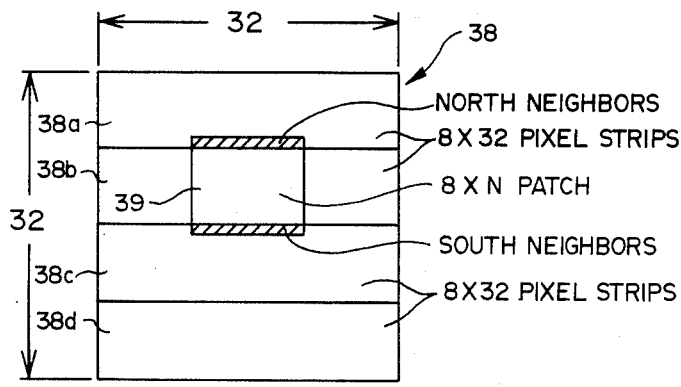
FIG. 6 is a diagrammatic block-and-line drawing here representative of an exemplary two-dimensional XY (32×32) PIXEL image array defined by four adjacent 8×32 PIXEL strips and illustrating also a typical 8×N patch (where "N" can be any desired integer representative of the number of vertical columns of PIXELS to be processed)

To further facilitate an understanding of the present invention, it will be understood by those skilled in the art that the image processor employed—here a VIP 24 (FIG. 1) embodying the invention—does not necessarily have to be configured to have a PE for each and every row in a typical two-dimensional XY PIXEL image array. For example, and as best shown in FIG. 6, a given two-dimensional XY PIXEL image array 38 can be processed by sequentially scanning discrete adjacent strips of PIXELS wherein each strip consists of n rows of PIXELS (where "n" is equal to the number of PES in the VIP—not shown in FIG. 6—and, wherein "n" may be equal to any desired whole integer). Thus, the exemplary XY PIXEL image array 38 depicted in FIG. 6 comprises a 32×32 array consisting of four (4) adjacent horizontal strips 38a, 38b, 38c and 38d with each strip being 8×32. This illustrative form of PIXEL image array assumes, therefore, that the VIP to be employed will comprise a one-dimensional columnar processor including eight (8) parallel PES together with associated north and south Memories for inputting north and south border data enabling the equipment to carry out NEIGHBORHOOD TRANSFORMS on the northernmost and southernmost rows of PIXELS in each such strip.

Thus, when processing the illustrative 32×32 array 38 shown in FIG. 6, the PIXEL data contained in the eight (8) rows of PIXELS defining the northernmost strip 38a will be fed to, and shifted relatively through, a one-dimensional VIP (not shown) embodying the features of the invention having north and south border Memories and eight (8) parallel PES, with the VIP scanning and analyzing the PIXELS contained within the strip 38a from edge-to-edge (e.g., from west-to-east) followed by sequential edge-to-edge scanning of the eight (8) rows of PIXEL data contained within each of strips 38b, 38c and 38d. A first processing operation programmed into the VIP might, for example, comprise a rapid scan of the overall XY PIXEL image array 38 in strip-by-strip internally pipelined format to locate areas and/or objects of interest, followed by a second, and perhaps one or more additional, processing operation(s) in a localized area where an object of interest has been detected, here shown as an 8×N patch 39 located centrally within strip 38b. It will be appreciated as the ensuing description proceeds that when the VIP 24 (FIG. 1) comprises a one-dimensional processor having sixteen (16) parallel PES, the 32×32 array 38 shown in FIG. 6 would consist of only two (2) strips, each 16×32. Similarly, if the VIP 24 includes only four (4) PES arranged in a one-dimensional columnar array, then the image array 38 depicted in FIG. 6 would be defined by eight (8) adjacent 4×32 strips.

As previously indicated, the various ARITHMETIC TRANSFORMS and LOGIC TRANSFORMS (such as Boolean logic operations) employed in image processing techniques are completely conventional and well known to persons skilled in the art; and, therefore, they will not be further described herein. However, while NEIGHBORHOOD TRANSFORMS are also generally known in the art, they are believed to be less widely understood—albeit, that they have been described in some detail in, for example, the aforesaid U.S. Pat. No. 4,060,713 issued to M. J. E. Golay, the aforesaid Sternberg patents, and numerous of the aforesaid literature references, to name but a few of available published TRANSFORM descriptions. Therefore, to insure that NEIGHBORHOOD TRANSFORM operations of the type referred to in the present detailed description will have real meaning to the leader, one typical NEIGHBORHOOD TRANSFORM that can be performed will be described hereinbelow—viz., a spatial filtering termed "contraction" or "erosion" as might be employed to determine the size of an object or Blob of interest.

Thus, referring to FIG. 7, there has been illustrated, in pictorially imaginary form, a fragmentary portion of a two-dimensional XY PIXEL image array 25 containing a plurality of PIXELS disposed in horizontal rows and vertical columns wherein the PIXELS have, or have been thresholded to have, binary values of "0" ("False") or "1" ("True"). As here shown by way of example, it will be noted that forty-one (41) of the centrally located PIXELS, here respectively numbered "1" through "41", define a Blob 40 or object of interest—i.e., these forty-one (41) numbered PIXELS have binary values of "1", while all other surrounding PIXELS have binary values of "0" indicative of the absence of significant object data. It will further be assumed that the image processing system 20 (FIG. 1) has been programmed such that once a Blob of interest—e.g. Blob 40—has been detected, at least one ensuing processing operation will be to determine the size of the Blob. To accomplish this, each PIXEL of interest within the horizontal and vertical boundaries of the Blob 40 is processed or analyzed based upon its relation with its neighboring PIXELS. Thus, as shown in FIG. 8, each PIXEL of interest to be processed is identified as "E" and its relation to each of the eight (8) neighboring PIXELS "A" through "D" and "F" through "I" is determined in accordance with algorithms for detecting the size of the Blob 40. One such algorithm—viz., an "erosion" or "contraction" algorithm for determining the height of the Blob 40—has been pictorially illustrated in FIGS. 9a and 9b where the PIXEL E of interest is shown as being located adjacent the north boundary in FIG. 9a as indicated by the binary value "0" in the three north neighbors and as being located adjacent the south boundary in FIG. 9b as indicated by the binary value "0" in the three south neighbors, it being understood that the values "X" are "I don't cares". The height detection or "horizontal erosion" algorithm pictorially depicted in FIGS. 9a and 9b can be expressed as follows:

$$E=\overline{ABC}+\overline{GHI} \qquad [\text{EQ. I}]$$

and, is designed to cause the Blob 40 to undergo a series of contractions which will eventually cause the Blob 40 to disappear; with the number of contractions or Steps required to make the Blob disappear providing an indication of the size of the Blob.

Smaller objects or Blobs will, of course, disappear before larger objects or Blobs and, consequently, when the size of any given Blob is known, the contraction process can be halted before the Blob of interest disappears, at which point smaller Blobs will have already disappeared; and, the Blob of interest can then again be enlarged through a series of "expansion" or "dilation" steps (not described herein, but which are completely conventional) to restore the Blob of interest to its original size and, if desired, the Blob can be restored, at least approximately, to a shape similar to its original shape by "masking"—i.e., ANDing—the processed Blob with the original Blob. However, the smaller objects will not be restored since they have been removed from the image.

Thus, in processing the Blob 40 depicted in FIG. 7 in accordance with the algorithm of Equation I and as depicted in FIGS. 9a and 9b, the first Step as shown by comparison of FIGS. 7 and 10a results in elimination of those PIXELS numbered "1" through "5", "12" and "13" adjacent the upper or northern boundary (FIGS. 7 and 9a) and those PIXELS numbered "14", "21", "22", "39", "40" and "41" adjacent the lower or southern boundary (FIGS. 7 and 9b), since, in each instance, the eliminated PIXEL is bounded by three northern or three southern neighbors having binary values of "0" ("False"). Similarly, during Step 2 (Cf., FIGS. 10a and 10b), those PIXELS numbered "6" through "11" are eliminated by virtue of the fact that their northern boundary neighbors have binary values of "0"; and, PIXELS "36" through "38" are eliminated by virtue of the fact that their three southern neighbors also have binary values of "0". In Step 3 (Cf., FIGS. 10b and 10c), the upper boundary portion of the "horizontal erosion" algorithm (FIG. 9a) serves to eliminate PIXELS "15" through "20", while the lower boundary portion of the algorithm (FIG. 9b) serves to eliminate PIXELS "32" through "35". Finally, in Step 4 (not shown), the "horizontal erosion" algorithm of Equation I and FIGS. 9a and 9b serves to eliminate all remaining PIXELS numbered "23" through "31". Thus, the entire "contraction" or "horizontal erosion" process defined by the algorithm of Equation I requires four (4) Steps in the exemplary instance, with each Step removing all PIXELS in the north and south rows of the Blob 40 having three northern or southern neighbors with binary values of "0", thereby establishing that the height of the original Blob 40 is eight (8) PIXELS—i.e., four Steps×two PIXEL rows/Step.

To determine the width of the Blob 40, a similar "contraction" process known as "vertical erosion" is performed; and, the algorithm for this operation is pictorially illustrated in FIGS. 11a and 11b and is defined by the following equation:

$$E = \overline{\overline{ADG} + \overline{CFI}}$$ [EQ. II]

Thus, as shown in FIG. 11a, the "vertical erosion" algorithm of Equation II serves to eliminate the left or westernmost PIXELS whose neighboring boundary PIXELS have binary values of "0"; and, as shown in FIG. 11b, those right or easterly PIXELS having neighbors with binary values of "0" will be eliminated. Thus, in Step 1 (Cf., FIGS. 7 and 12a) the westerly PIXELS "5", "14", "27", "36" and "40" and the easterly PIXELS "13", "22", "31", "35" and "39" are eliminated; in Step 2 (Cf., FIGS. 12a and 12b) the westerly PIXELS "6", "15", "32" and "41" and the easterly PIXELS "12", "21", "30", "34" and "38" are eliminated; in Step 3 (Cf., FIGS. 12b and 12c) the westerly PIXELS "1", "7", "16", "23" and "37" and the easterly PIXELS "11", "20", "33" and "37" are eliminated; and, in Step 4 (Cf., FIGS. 12c and 12d) the westerly PIXELS "2", "8", "17", "24" and "28" and the easterly PIXELS "4", "10", "19" and "26" are eliminated; thus leaving only a single vertical column containing PIXELS "3", "9", "18", "25" and "29". Such remaining PIXELS are eliminated during Step 5 (not illustrated) by that portion of the "vertical erosion" algorithm pictorially illustrated in FIG. 11a; and, consequently, the successive Steps of the algorithm as set forth in Equation II and FIGS. 11a and 11b are indicative of a Blob 40 having an original width of nine (9) PIXELS.

Knowing that the Blob 40 of FIG. 7 has a height of eight (8) PIXELS and a width of nine (9) PIXELS, the image processing system 20 (FIG. 1) is now capable of proceeding with any additional desired computational processing operation. For example, the image can be again "contracted" or "eroded" to eliminate all objects having a height less than eight (8) PIXELS and all objects having a width less than nine (9) PIXELS; and, thereafter, it can be "expanded" or "dilated" to its original size (and, if desired, to a shape approximating its original shape) so as to eliminate from the image all objects smaller than Blob 40.

VECTOR IMAGE PROCESSOR AND METHOD OF PROCESSING IN ACCORDANCE WITH THE INVENTION

Figure 13:
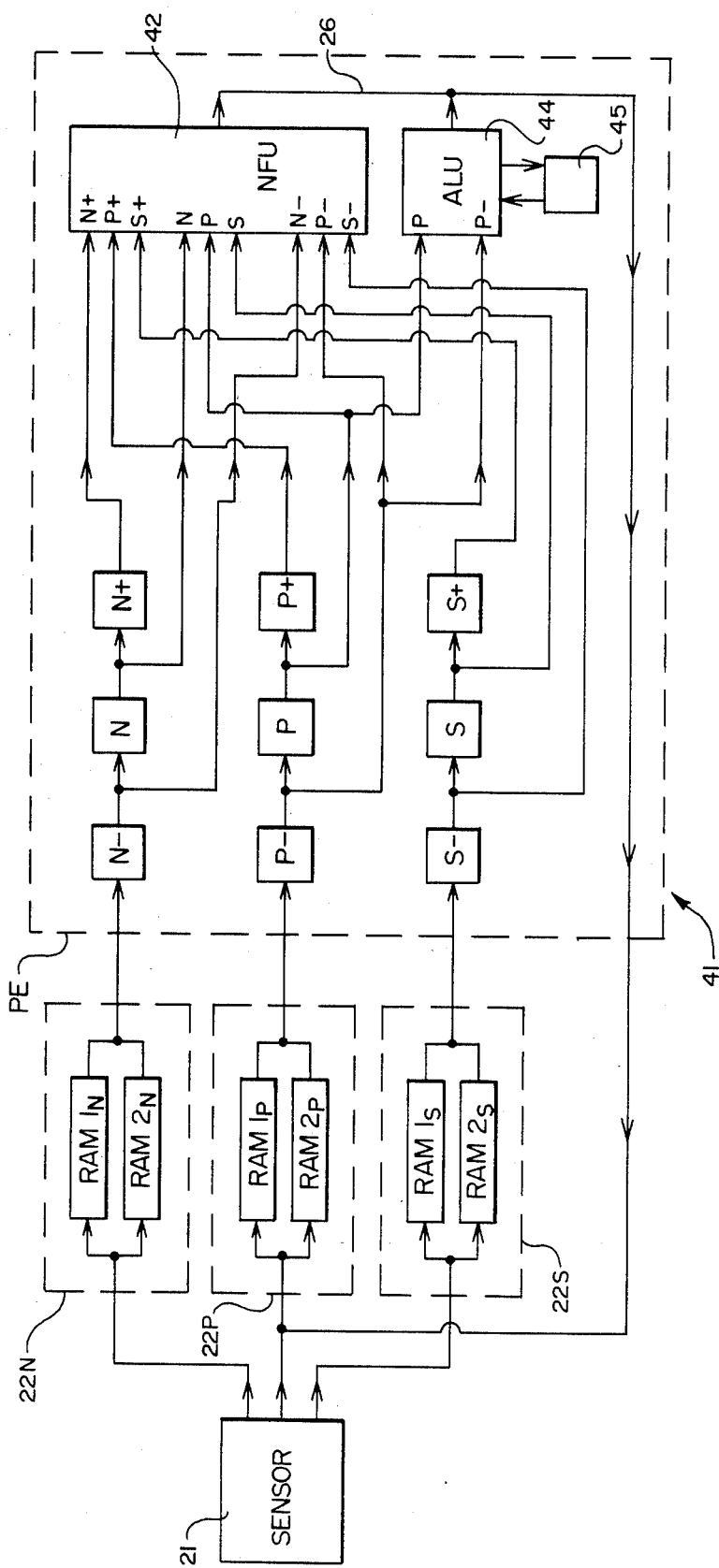
FIG. 13 is a highly diagrammatic block-and-line diagram, with parts removed for purposes of clarity, here depicting a single exemplary processor element ("PE") embodying features of the present invention and suitable for use in carrying out the methods of the present invention.

In accordance with the present invention, methods and apparatus in the form of a special purpose Vector Image Processing System are provided wherein the VIP 24 (FIG. 1) or the modified VIP shown generally at 41 in FIG. 13 comprise a one-dimensional columnar array of n PES (where "n" can be any whole integer; and, where the PES are disposed in parallel in those instances where "n" is "2" or more) and wherein n rows of PIXEL data contained within a two-dimensional XY PIXEL image array—e.g., the array 25 shown by way of example in FIG. 1—are fed to, and relatively shifted through, the VIP 24 (or the VIP 41) which serves to process each PIXEL of interest in internally pipelined column-by-column form and, in those instances where "n" is greater than "1", wherein the "n" PIXELS in each column are processed in parallel.

C. Single PE VIP Embodiment

To this end, and as best illustrated by reference to FIG. 13, a modified form of VIP, generally indicated at 41, has been shown as comprising a single processing element PE wherein all hardware components and interconnections are implemented on a single IC. As here shown, the processing element PE is fed with digitally encoded data originally derived from a Sensor 21 and stored in Memories 22N, 22P and 22S (i.e., specific Memory locations in the image buffer Memory 22 shown in block form in FIG. 1) at address positions corresponding to the XY address positions of the two dimensional XY PIXEL image array—e.g., the array 25 of FIG. 1. Data contained within the Memories 22N, 22P and 22S is, upon command by the Sequencer (not shown in FIG. 13, but identical to the Sequencer 31 depicted in FIG. 1) under the control of a host CPU 29, shifted in parallel and in internally pipelined column-by-column form through three parallel sets of cascaded latches (N−, N, N+), (P−, P, P+) and (S−, S, S+) which form part of the exemplary processing element PE. It will be understood by those skilled in the art that such latches may simply take the form of shift register stages of D-type flip flops of completely conventional construction and which need not be further described in detail herein.

Assuming, for example, that the VIP 41 of FIG. 13 is being used to process the 16×16 PIXEL image array 25 as shown in FIG. 1, and assuming further that the VIP 41 scans the rows of PIXELS sequentially from west to east within each row and scans the rows sequentially from north to south with such sixteen rows hereinbelow being termed rows "A" through "P", then during scanning of row "A"—viz., the northernmost row of PIXELS—the digitally encoded bits corresponding to the sixteen (16) PIXELS contained within row "A" will be stored in the Memory 22P associated therewith; the digitally encoded bits corresponding to the sixteen (16) PIXELS contained within the adjacent southerly row "B" will be stored in the south Memory 22S; and, digitally encoded bits representative of the north boundary (not shown) of the PIXEL image array 25 in FIG. 1 will be stored in north Memory 22N. In addition, although not shown in FIG. 1 or 13, it will be understood by those skilled in the art that memory locations will be provided in Memory 22 (FIG. 1) for storage of digitally encoded data bits representative of the east, west and south boundaries of the two-dimensional XY PIXEL image array 25.

Thus, the arrangement is such that the VIP 41 (FIG. 13) is configured to process the digitally encoded PIXEL data in the two-dimensinoal XY PIXEL image array—e.g., the array 25 of FIG. 13—on a PIXEL-by-PIXEL basis commencing with row "A" and sequentially proceeding through rows "B" through "n" (in FIG. 1, row "n" is row "P"). To this end, upon the first shift command emanating from the Sequencer 31 (FIG. 1), digitally encoded data is shifted from the Memories 22N, 22P and 22S into respective ones of the latches N−, P− and S−; and, such data is representative of the western boundary of the image—i.e., the contents of latch N− will be data representative of the western edge of the northern boundary; and, the contents of latches P− and S− will be the data representative of the western boundaries of rows "A" and "B" respectively. Upon the second shift command, the data stored in latches N−, P− and S− is shifted, in parallel, into respective ones of latches N, P and S; while digitally encoded data representative of the north boundary of the westernmost column—e.g., column "0" (FIG. 1)—in the two-dimensional XY PIXEL image array is shifted into latch N−, and digitally encoded data representative of the westernmost column "0" PIXELS in rows "A" and "B" is respectfully shifted into latches P− and S−. Upon the third shift command emanating from the Sequencer 31 (FIG. 1): the data stored in latches N, P and S is respectively shifted to the N+, P+ and S+ latches; data in the N−, P− and S− latches is respectively shifted into the N, P and S latches; and, data representative of the north boundary and second most westerly column—e.g., column "1" (FIG. 1)—of PIXELS in row "A" and "B" is respectively shifted into latches N−, P− and S−.

The processing element PE is now enabled by the Sequencer 31 under control of the CPU 29 (FIG. 1) for conducting its first NEIGHBORHOOD, ARITHMETIC or LOGIC TRANSFORM through suitable control enable signals shown only diagrammatically in FIG. 1—it being understood, of course, that the processing element PE could also have been enabled by the Sequencer 31 to perform an ARITHMETIC or LOGIC TRANSFORM in the interval between the second and third shift commands. Assuming, for example, that a NEIGHBORHOOD TRANSFORM is to be conducted, and recognizing that the westernmost PIXEL of the northernmost row in the two-dimensional XY PIXEL image array of FIG. 1—viz., PIXEL (0,A)—is now stored in latch P, it will be appreciated that data representative of the eight neighboring PIXEL positions are stored in latches N−, N, N+, P−, P+, S−, S and S+; and, all such data is input to the correspondingly labeled terminals of an NFU 42 mounted on processing element PE.

Those skilled in the art will appreciate that the particular design of the NFU 42 can vary widely dependent upon the type(s) of NEIGHBORHOOD TRANSFORM(S) to be performed; and, the particular logic circuits and/or designs employed are not critical to the present invention. Thus, the NFU 42 may comprise, for example: (i) a logic network of gates such as NAND, OR or AND gates or the like; (ii) look-up tables in the form of PLAs or SLAs; (iii) a ROM; (iv) a PROM; (v) an EPROM; etc.; and, since such logic devices are well known to persons skilled in the art, they are not described in detail herein. However, regardless of the specific logic circuitry employed, upon completion of the selected preprogrammed NEIGHBORHOOD TRANSFORM, the NFU 42 provides an output signal which is fed via three-state bus 26 to the input for Memory 22P in readiness for the next computational processing operation to be performed on row "A" PIXELS— viz., processing of PIXEL (1,A). To accomplish this, the next shift command emanating from the Sequencer 31 (FIG. 1) serves to shift north boundary data and PIXEL data for rows "A" and "B" one step to the right as viewed in FIG. 13, thus shifting the digitally encoded data for PIXEL (1,A) into latch P in readiness for the next PIXEL processing operation. This cycle is repeated until all PIXELS in row "A" have been processed in internally pipelined fashion; and, thereafter the VIP 41 is sequenced by Sequencer 31 (FIG. 1) to sequentially process the PIXELS in all remaining rows in the PIXEL image array 25 (FIG. 1) in PIXEL-by-PIXEL internally pipelined fashion.

Alternatively, if the processing element PE is commanded to perform an ARITHMETIC TRANSFORM —e.g., "add", "subtract" or "multiply"—or a LOGIC TRANSFORM—e.g., AND, OR, XOR—suitable command input signals from the Sequencer 31 (FIG. 1) are provided so that the digitally encoded data in latch P− and latch P (the latter containing the PIXEL data of interest) is fed to an appropriate logic unit, herein illustratively depicted as an ALU 44, which may include a suitable "carry" or "borrow" register 45 in the form of a D-type flip flop or the like. Once again, such ALUs are completely conventional and may be implemented in a wide variety of ways including suitable gates, ROMs or the like; and, the particular constructional details are not critical to the invention and can, and will, vary dependent solely upon the arithmetic or logic operations which they have been designed to perform. Upon completion of its computational operation, the ALU 44 provides an output signal which is again fed over the three-state bus 26 to the input of Memory 22P; and, thereafter, the VIP 41 is sequenced in precisely the manner described above for NEIGHBORHOOD TRANSFORMS.

It will be observed upon inspection of FIG. 13 that each of the Memories 22N, 22P and 22S includes a pair of parallel RAMS—viz., Memory 22N includes RAM $1_N$ and RAM $2_N$; Memory 22P includes RAM $1_P$ and RAM $2_P$; and Memory 22S includes RAM $1_S$ and RAM $2_S$. As a consequence of this optional construction, the operational speed of the VIP 41 is effectively doubled since data may be "read into" one RAM in each pair while data is simultaneously being "read out" of the other RAM in each pair.

Thus, it will be appreciated that the particular embodiment of the VIP 41 depicted in FIG. 13 provides an extremely simple vector image processing device including a one-dimensional processing element PE for processing one PIXEL at a time; wherein all of the PIXELS within a given two-dimensional XY PIXEL image array are sequentially processed in internally pipelined format; and, wherein provision is made for inputting data representative of the north, south, east and west boundaries of the image so that neighborhood operations can be performed with regard to each and every PIXEL, including those located at the boundaries of the two-dimensional XY PIXEL image array.

D. Parallel PE VIP Embodiment

While the single PE VIP 41 illustrated in FIG. 13 and described above comprises an operational special purpose image processing system suitable for use in certain highly specialized applications—e.g., with relatively small sized two-dimensional PIXEL image arrays—for most image processing applications employing typical two-dimensional PIXEL image arrays having on the order of from $10^3$ to $10^7$ PIXELS, the specific VIP embodiment of FIG. 13 does not present a practical approach to image processing on a real time basis. However, the general conceptual approach included in the processing system shown by way of example in FIG. 13 is equally applicable to special purpose image processing systems for processing such relatively large two-dimensional XY PIXEL image arrays on a high speed real time basis provided only that the VIP is configured to process digitally encoded PIXEL image data in a plurality of rows on a simultaneous parallel, but internally pipelined, basis.

Figure 14A:
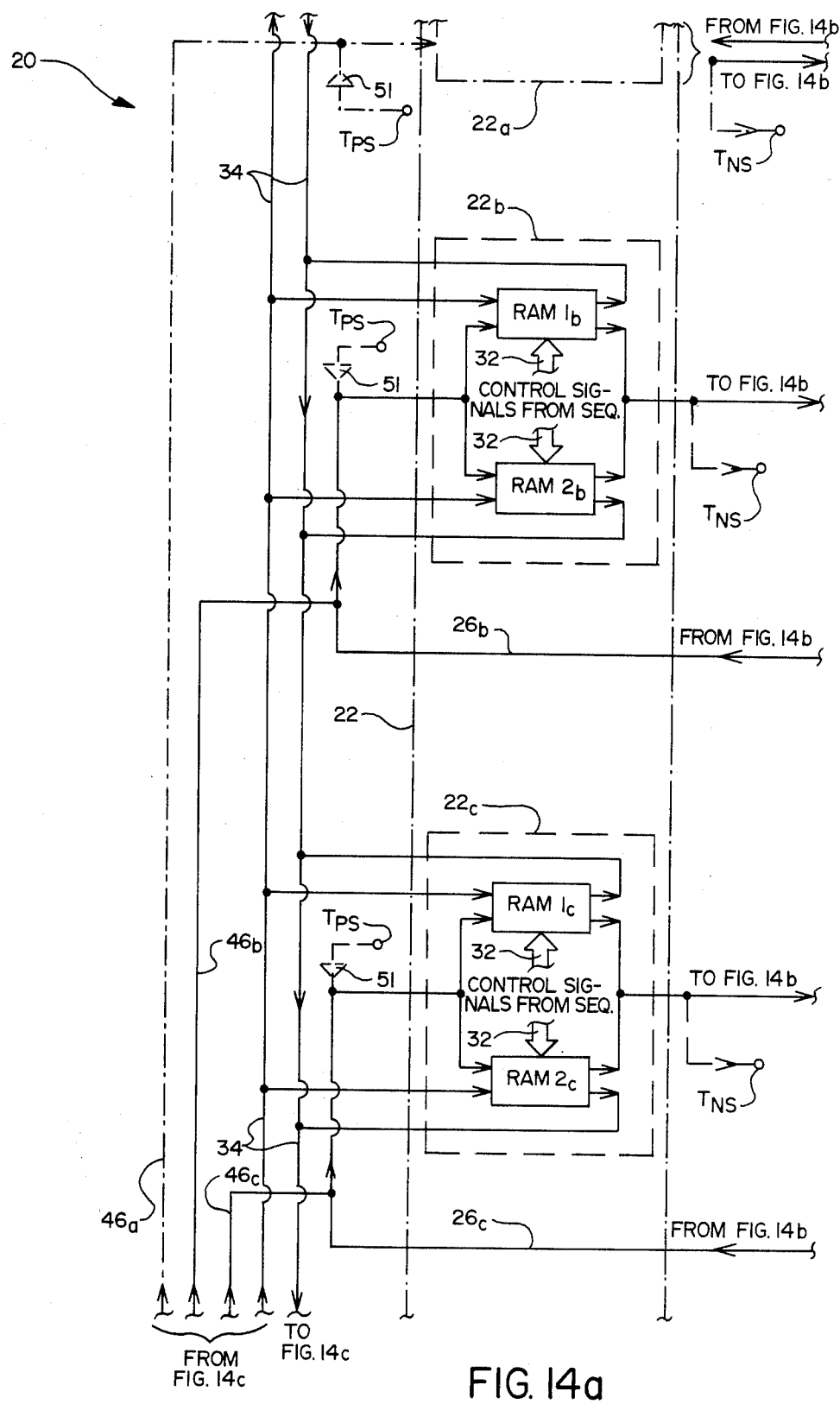
FIGS. 14a, 14b, 14c, and 14d are somewhat more detailed block-and-line drawings which, when placed in side-by-side (FIGS. 14a and 14b; and, FIGS. 14c and 14d) and top-to-bottom (FIGS. 14a and 14c; and, FIGS. 14b and 14d) relation and viewed conjointly, respectively portray the upper left quadrant (FIG. 14a), upper right quadrant (FIG. 14b), lower left quadrant (FIG. 14c), and lower right quadrant (FIG. 14d) of an overall image processing system incorporating an exemplary Vector Image Processor (VIP) embodying features of the present invention, such exemplary VIP having n processor elements ("PES") where "n" can be any whole integer and is here shown as comprising anywhere from three (3) to six (6), or more, processor elements ("PES")

To this end, and in accordance with one of the more general important aspects of the invention, a Vector Image Processing System including a VIP 24 of the type shown in FIG. 1 is provided with a plurality of identical PES oriented in a one-dimensional columnar parallel array with each PE characterized by its ability to process a single PIXEL at a time and multiple PIXELS in a given row of PIXELS in internally pipelined format; yet, wherein each PIXEL may be analyzed utilizing a NEIGHBORHOOD TRANSFORM including neighborhood relations between the particular PIXEL undergoing analysis and all of its neighbors in a given two-dimensional AB neighborhood array. To accomplish this, and as best illustrated by reference to FIGS. 14a through 14d when placed in side-by-side relation (FIGS. 14a and 14b; and, FIGS. 14c and 14d) and in top-to-bottom relation (FIGS. 14a and 14c; and, FIGS. 14b and 14d) and considered conjointly, an image processing system 20 of the type illustrated in FIG. 1 in block-and-line form has been depicted in considerably greater detail. As here shown, the image processing system 20 includes a Sensor 21 (FIG. 14c) for detecting and inputting digitally encoded data via input lines $46_a$ through $46_n$ to an image buffer Memory 22 (FIGS. 14a, 14c) containing parallel memory devices $22_a$ through $22_n$ which respectively output such data, on command by a Sequencer 31 under the control of a host CPU 29 (FIG. 14c), to respective ones of a plurality of identical processing elements $PE_a$ through $PE_n$ (FIGS. 14c and 14d). For purposes of understanding the invention, it will be understood that the flow of digitally encoded data from the Sensor 21 through any given one of the Memories $22_a$ through $22_n$ and its associated processing element—e.g., the associated one of processing elements $PE_a$ through $PE_n$—is identical; and, therefore, an operational description of one such data flow path should suffice for an understanding of the overall system 20. Accordingly, the ensuing description will, for the most part, be confined to the flow of digitally encoded data from Sensor 21 (FIG. 14c) over input line $46_c$ (FIGS. 14c and 14a) to Memory $22_c$ (FIGS. 14a) and, thereafter, through processing element $PE_c$ (FIG. 14b).

Thus, images sensed by the Sensor 21 (FIG. 14c) are converted by the Sensor—which, in some instances (e.g., an RS-170 T.V. camera) would employ intervening external digitizers and image format converters (i.e., raster to column of "N")—to digitally encoded PIXEL data and output from the Sensor via output lines $46_a$ through $46_n$ in the form of a two-dimensional XY PIXEL image array (such, for example, as the array 25 shown in FIG. 1) which is input to XY address locations in Memory 22—e.g., PIXELS in rows "A", "B" and "C" are input to respective ones of Memories $22_a$, $22_b$, $22_c$ (FIG. 14a), and PIXELS in rows "D" and "E" through "n" (where "n" is row "H" in an 8×8 array, and row "P" in a 16×16 array, etc.) are input to respective ones of Memories $22_d$ through $22_n$ (FIG. 14c). Considering data input to Memory $22_c$ in the exemplary form of the invention here illustrated, such data is input to proper "Y" address locations—e.g., "Y" equal "1" . . . "Y" equals "n"—in one of a pair of parallel RAMs—viz., RAM $1_C$ or RAM $2_C$—dependent upon which of the two RAMs has been enabled by Sequencer 31 to receive data input. That is, Memory $22_c$ is configured such that digitally encoded data is being "read into" one of RAM $1_C$ and RAM $2_C$ while previously "read in" data is being simultaneously "read out" of the other of the two RAMs.

The arrangement is such that upon emanation of the first shift command from Sequencer 31 (FIG. 14c), data stored in the memory addresses in Memories $22_a$ through $22_n$, including data stored in the Memory 22 (FIG. 1) representative of northern, western and southern boundary data, is simultaneously shifted, in parallel, into respective ones of the first stage latches in each of the processing elements $PE_a$ through $PE_n$—i.e., digitally encoded western boundary data for rows "B" and "C" of the PIXEL image array 25 (FIG. 1) is shifted into respective ones of latches B1 and C1 (FIG. 14b), and western boundary data for row "D" is shifted into latch D1 (FIG. 14d). Upon the second shift command from Sequencer 31, the data stored in latches B1, C1 and D1 is respectively shifted into latches B2, C2 and D2; while, at the same time, digitally encoded data representative of the PIXELS (0,B), (0,C) and (0,D) in rows B, C and D of column "0" (FIG. 1) is shifted into respective ones of latches B1, C1 and D1. At this point, the system can be enabled by the Sequencer to perform an ARITHMETIC or LOGIC TRANSFORM (or other "point-wise" operations which do not require or employ edge or neighbor data) on column "0" data in latches B1, C1 and D1 (and, of course, on column "0" data in latches A1 and E1 through N1). On the third shift command emanating from Sequencer 31, the contents of latches B2, C2 and D2 are respectively shifted into latches B3, C3 and D3; the contents of latches B1, C1 and D1 are respectively shifted into latches B2, C2 and D2; and, PIXEL data representative of PIXELS (1,B), (1,C) and (1,D) is respectively shifted into latches B1, C1 and D1. The VIP 24 is now in readiness to conduct its first neighborhood processing operation (or a first or second arithmetic or logic processing operation) upon command from Sequencer 31 since the data stored in latches B2, C2 and D2 is the digitally encoded PIXEL data corresponding to PIXELS (0,B), (0,C) and (0,D) located in the westernmost column "0" of PIXELS in the PIXEL image array 25 (FIG. 1)—it being understood that the corresponding latches A2 and E2 through N2 (not shown) have also been loaded with digitally encoded data representative of the remaining PIXELS in column "0".

Figure 14B:
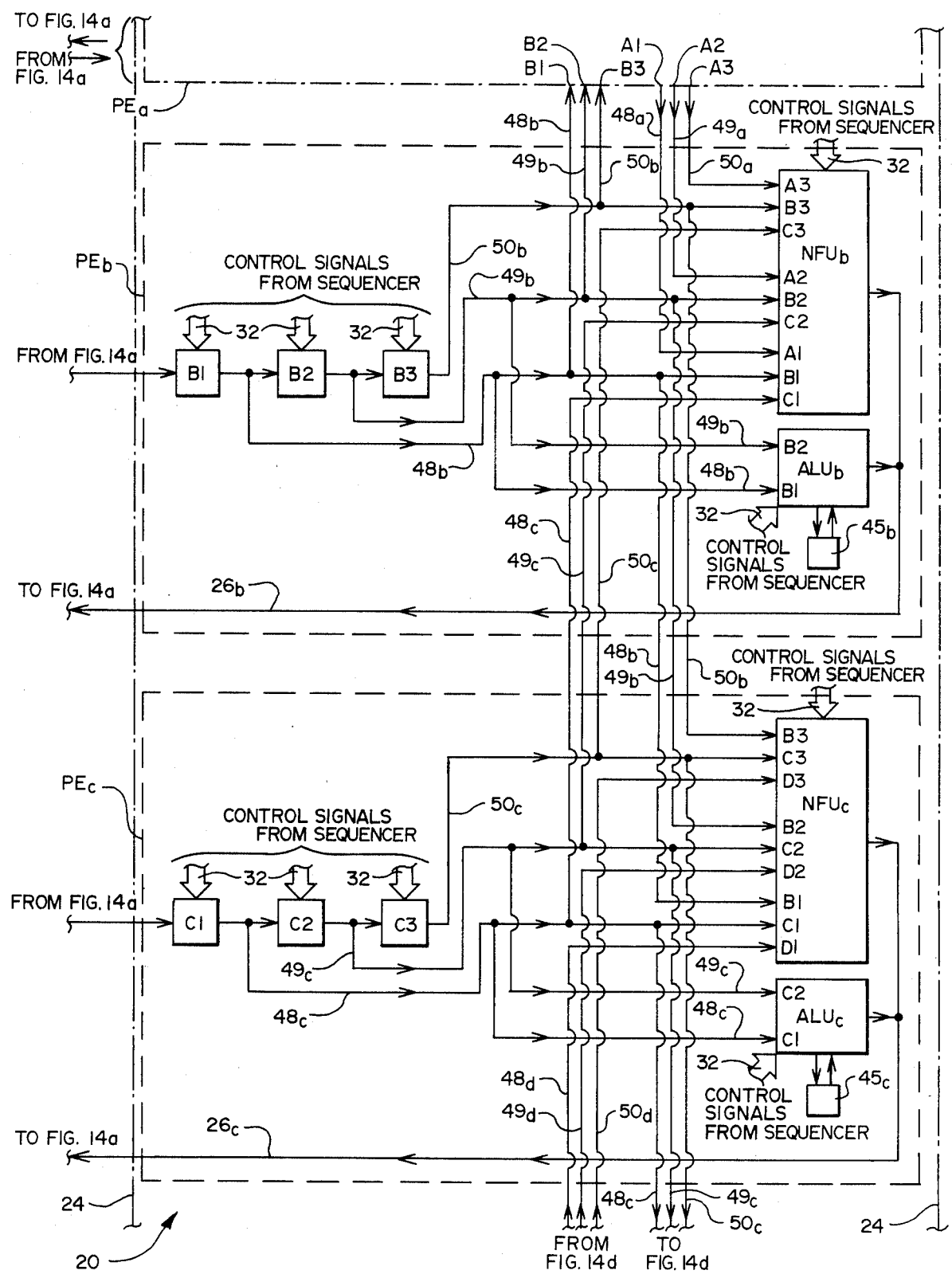
Figure 14C:
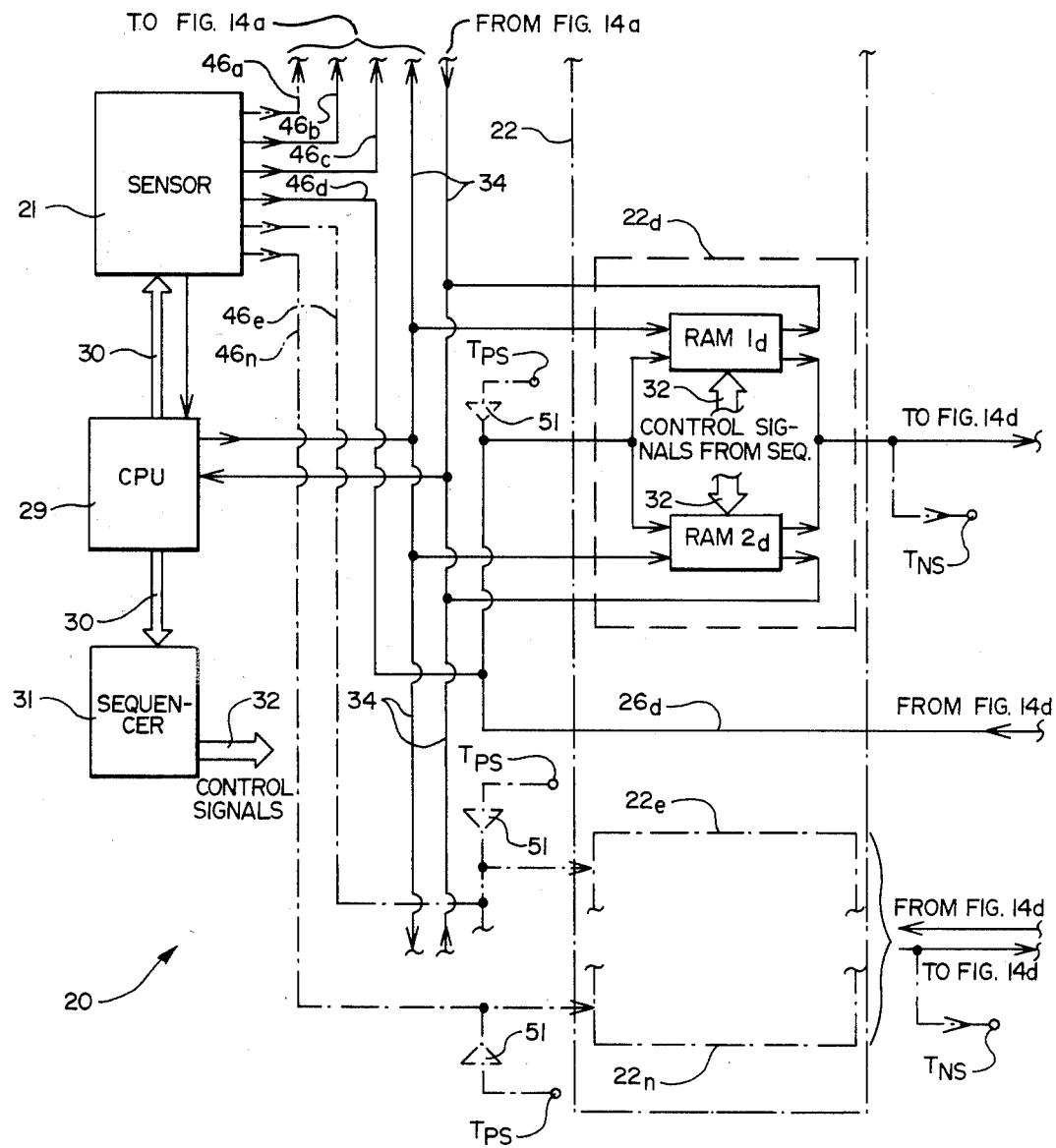
Figure 14D:
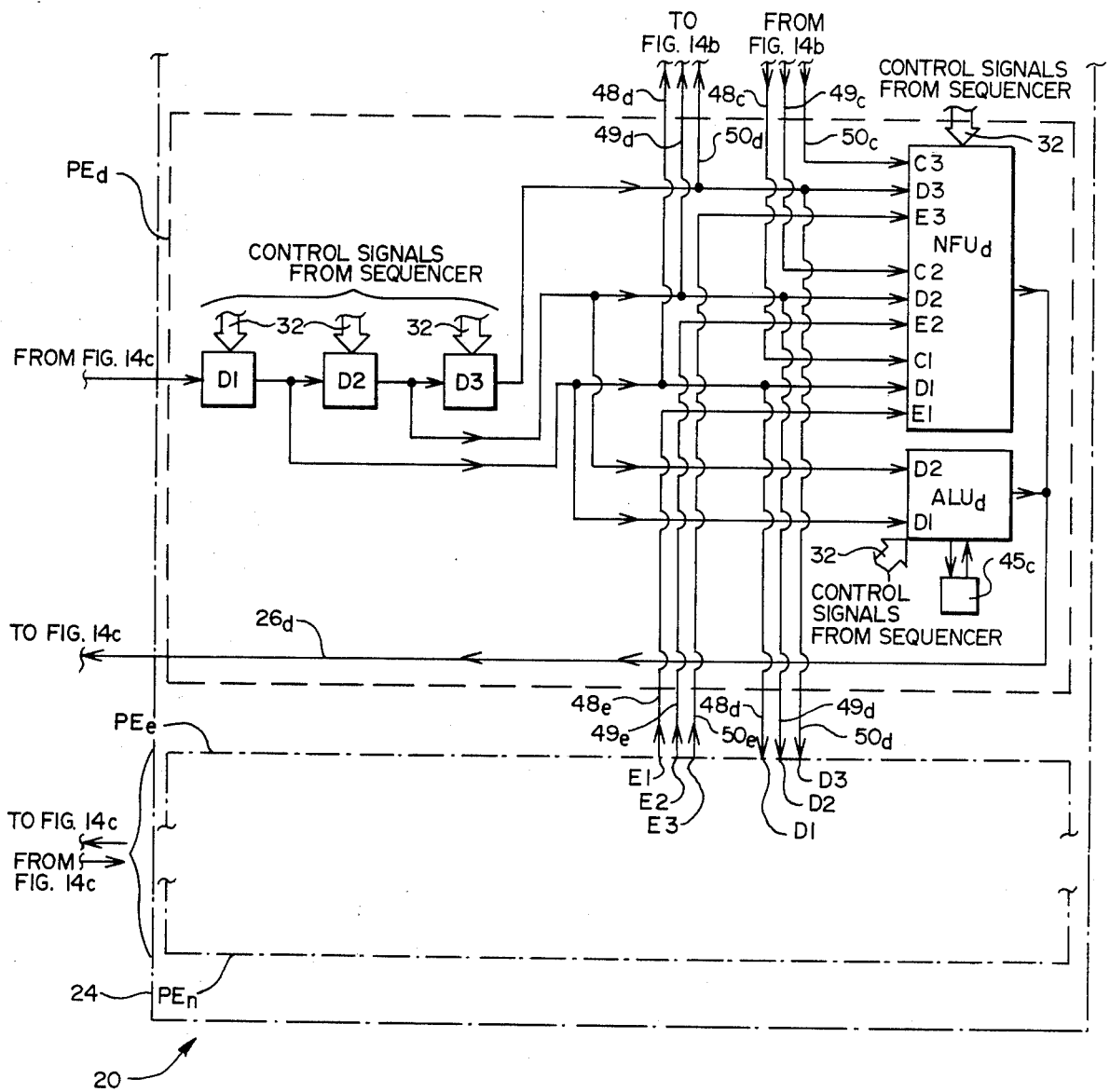

As best shown in FIGS. 14b and 14d, it will be noted that each processing element—e.g., $PE_b$, $PE_c$ and $PE_d$—includes a neighborhood functional unit $NFU_b$, $NFU_c$ and $NFU_d$, each of which is identical to the NFU 42 previously described in connection with the embodiment of the invention shown in FIG. 13. Similarly, each processing element also includes an arithmetic logic unit—e.g., $ALU_b$, $ALU_c$ and $ALU_d$—each of which is identical to the ALU 44 shown in FIG. 13, with each logic unit including a "carry" or "borrow" register $45_b$, $45_c$ and $45_d$, respectively. The digitally encoded PIXEL data stored in, for example, latches C1, C2 and C3 in processing element $PE_c$ is transmitted via lines $48_c$, $49_c$ and $50_c$ to respective ones of terminals C1, C2 and C3 in neighborhood functional unit $NFU_c$; and, simultaneously, to the correspondingly labelled input terminals of the north and south neighborhood functional units $NFU_b$ and $NFU_d$, respectively, in the adjacent north and south processing elements $PE_b$ and $PE_d$. That is, the data in latches C1, C2 and C3 not only provides data input to $NFU_c$ in $PE_c$ but, additionally, provides south neighbor inputs to $PE_b$ on the north and north neighbor inputs to $PE_d$ on the south. Similarly, the north neighbor data in latches B1, B2 and B3 in processor element $PE_b$ provides north neighbor input via lines $48_b$, $49_b$ and $50_b$ to terminals B1, B2 and B3 on $NFU_c$; while south neighbor data in latches D1, D2 and D3 in processor element $PE_d$ provides south neighbor input via lines $48_d$, $49_d$ and $50_d$ to terminals D1, D2 and D3 on $NFU_c$. At the same time, data stored in latches C1 and C2 is input via lines $48_c$ and $49_c$ to terminals C1 and C2, respectively, in $ALU_c$.

The arrangement is such that upon command from Sequencer 31 (FIG. 14c), either $NFU_c$ or $ALU_c$ is enabled to perform a computational processing operation—e.g., a NEIGHBORHOOD TRANSFORM by $NFU_c$; or, either an ARITHMETIC TRANSFORM or a LOGIC TRANSFORM by $ALU_c$—on the data present on its respective input terminals; and, the result of that computational processing operation is transmitted to Memory $22_c$ via three-state bus $26_c$. At the same time, identical computational processing operations are conducted and processed in parallel by each of $PE_a$, $PE_b$ and $PE_d$ through $PE_n$ with respect to the data stored in their respective latches and in the latches for their northern and southern neighbors. On the next shift command emanating from Sequencer 31, the contents of all latches are shifted one column to the right as viewed in the drawings and latches B1, C1 and D1 are loaded with digitally encoded PIXEL data for PIXELS (2,B), (2,C) and (2,D). The system is now ready to perform a computational processing operation on the new contents of latches A2 through N2—viz., digitally encoded data representative of those PIXELS in n rows of PIXELS in column "1" (FIG. 1). The foregoing operational cycle is repeated on an internally pipelined column-by-column basis until all PIXELS in the n rows being processed have been analyzed.

Thus, it will be appreciated that the embodiment of the invention illustrated in FIGS. 14a through 14d permits processing of a two-dimensional XY PIXEL image array data on a plurality of PIXELS simultaneously and in parallel—viz., on all PIXELS in a given column for the n rows undergoing analysis—which all such PIXELS in adjacent columns being processed sequentially in internally pipelined format; thereby enabling relatively large two-dimensional XY PIXEL image arrays to be processed on a high speed real time basis while employing a selected one of a NEIGHBORHOOD TRANSFORM, an ARITHMETIC TRANSFORM, or a LOGIC TRANSFORM.

As will be described in greater detail below, the Vector Image Processing System shown by way of example in FIGS. 14a through 14d can also be configured to permit external pipelining through a plurality of cascaded identical VIPs. To enable this, provision is made for conveying the data output from Memory locations $22_b$, $22_c$ and $22_d$ not only to their respective latches on associated ones of processor elements $PE_b$, $PE_c$ and $PE_d$ in the VIP 24 shown in FIGS. 14b and 14d, but, also, to the inputs of comparable PES in downstream identical pipelined VIPs (not shown in FIGS. 14a through 14d, but described below in connection with FIGS. 17a and 17b). To this end, each Memory device—e.g., Memory devices $22_b$, $22_c$ and $22_d$—is provided with an output terminal $T_{NS}$ (FIGS. 14a, 14d) for the next stage or adjacent downstream pipelined VIP (not shown). Similarly, data from the preceding stage or adjacent upstream pipelined VIP (not shown) may be accessed at terminal $T_{PS}$ for selective input to Memory devices $22_b$, $22_c$ and $22_d$. Any suitable and conventional three-state buffer 51 may be provided to insure that data in any given stage in the pipeline is prevented from being transmitted to any preceding or upstream pipeline stage.

E. North/South Boundary Data

In the foregoing description of the invention pertaining to the use of a single PE internally pipelined VIP 41 of the type shown in FIG. 13, there has been described in some detail a process and hardware for inputting neighbor data for each PIXEL being analyzed irrespective of wehther that neighbor data relates to a neighboring PIXEL in the two-dimensional XY PIXEL image array 25 or whether it relates to boundary data indicative of operation on a row or column at the north/south or east/west boundary of the array. Similarly, a brief description has been set forth hereinabove with respect to the treatment of boundary data when the VIP 24 comprises a one-dimensional columnar array of PES equal in number to the number of horizontal row of digitally encoded PIXEL data in a two-dimensional XY PIXEL image array—e.g., the array 25 of FIG. 1. However, as previously indicated, a VIP embodying features of the present invention may also be employed to process two-dimensional XY PIXEL image arrays which contain up to a significantly greater number of horizontal rows of PIXEL data than the number of parallel one-dimensional PES in the VIP—for example, an image processing system wherein the VIP includes a one-dimensional array of eight (8) parallel PES, and the two-dimensional PIXEL image array is a 32×32 array as shown generally at 52 in FIG. 15.

Thus, as here shown, the 32×32 PIXEL image array 52 is comprised of four (4) adjacent strips of PIXELS identified in the drawing as Strip Nos. 1 through 4, with each Strip comprising an 8×32 array containing eight (8) row of PIXELS with thirty-two (32) PIXELS per row. That is, Strip No. 1 includes rows "A" through "H"; Strip No. 2 includes rows "I" through "P"; Strip No. 3 includes rows "Q" through "X"; and Strip No. 4 includes rows "Y" through "FF". In this instance, the VIP, generally indicated at 54 in FIG. 15, comprises a one-dimensional array of eight (8) parallel processing element $PE_a$ through $PE_h$ and devices indicated at NB and SB for inputting north boundary data and south boundary data, respectively. As the ensuing description proceeds, it will be understood that when the VIP 54 is processing Strip No. 3, for example, north boundary or border data comprises the PIXEL data in the southernmost row in Strip No. 2—viz., row "P"—while south boundary or border data comprises the PIXEL data in the northernmost row in Strip No. 4—viz., row "Y". Similarly, when processing Strip No. 1, north border data comprises digitally encoded boundary data in Memory 22 (FIG. 1) and south border data comprises the PIXEL data in the northernmost row of Strip No. 2—viz., row "I".

Thus, referring to FIGS. 16a and 16b conjointly, there has been illustrated a VIP 54 including north and south boundary inputs and which is otherwise identical to the VIP 24 previously described in connection with FIGS. 14a through 14d—albeit that many structural details shown in FIGS. 14a through 14d have been eliminated from FIGS. 16a and 16b simply for purposes of clarity such, for example, as the arithmetic logic units (ALUs) and the interconnection and output lines relating thereto. FIGS. 16a and 16b have further been drawn to illustrate a one-dimensional columnar VIP 54 having n PES; but, consistent with FIG. 15, the ensuing description will assume that the VIP 54 includes eight (8) processing elements and, therefore, that the processing elements shown as $PE_{n-1}$ and $PE_n$ are, in actuality, $PE_g$ and $PE_h$.

Figure 15:
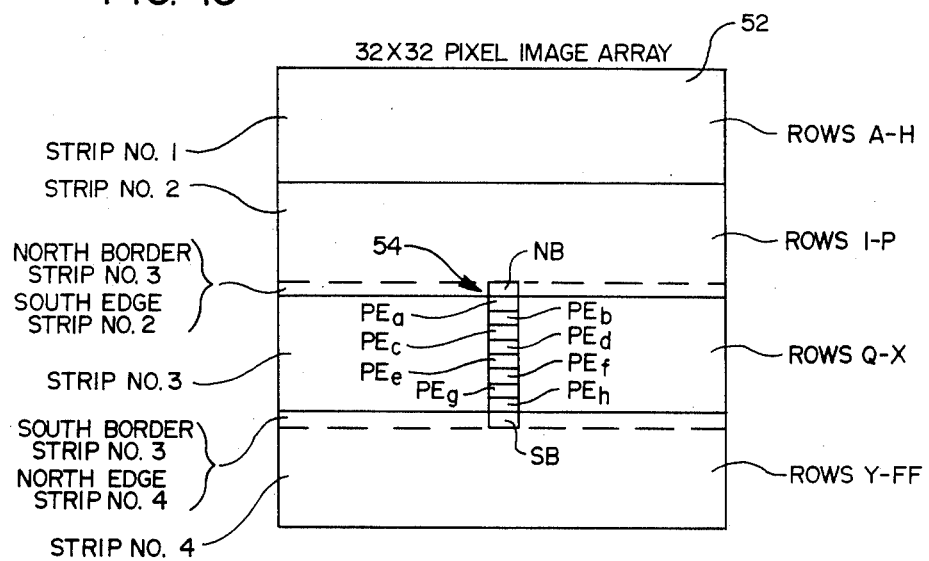
FIG. 15 is a diagrammatic block-and-line drawing, somewhat similar to FIG. 6 and again representative of an exemplary IX (32×32) PIXEL image array defined by four adjacent 8×32 PIXEL strips, but here depicting the PIXEL data being processed by an exemplary Vector Image Processor ("VIP") including eight (8) parallel processor elements $PE_a$–$PE_h$ in conjunction with north and south border memories, with the VIP here shown during processing of data in the third strip from the top of the two-dimensional XY PIXEL image array and with the north border memory providing north neighbor inputs to the northernmost processor element $PE_a$ from the neighboring PIXELS in the southernmost row of PIXELS in the neighboring north or second strip, while the south border memory provides south neighbor inputs to the southernmost processor element $PE_h$ from the neighboring PIXELS in the northernmost row of PIXELS in the neighboring south or fourth strip.
Figure 16A:
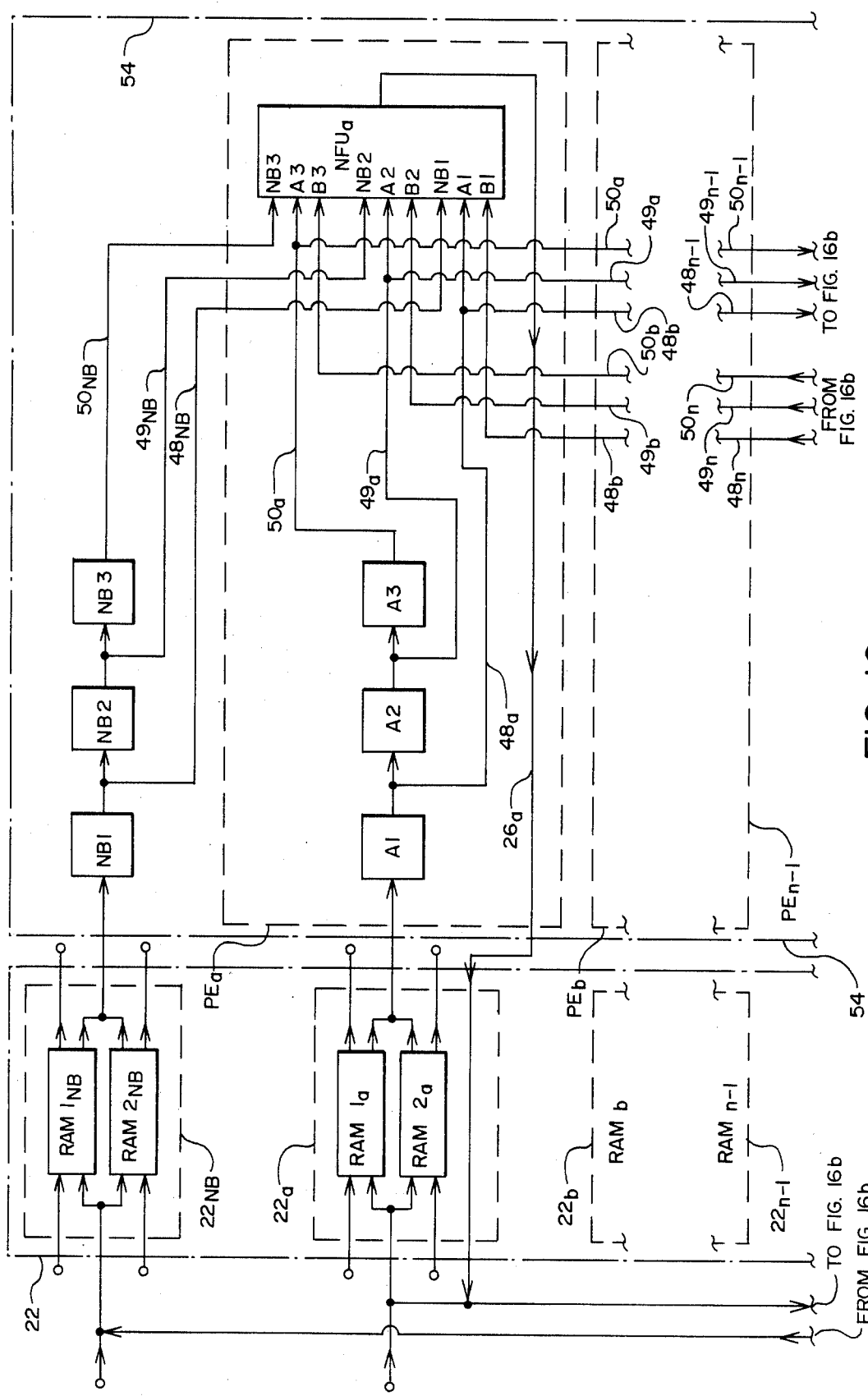
FIGS. 16a and 16b, when placed in top-to-bottom relation and considered conjointly, comprise a highly diagrammatic block-and-line drawing, somewhat similar to FIGS. 14a through 14d, but, in considerably less detail and with parts removed for purposes of clarity, here showing a Vector Image Processor ("VIP") embodying features of the invention and employing n processor elements—for example, eight (8) processor elements $PE_a$–$PE_h$ as shown in FIG. 15—and the interconnections employed in an exemplary form of the invention suitable for providing north and south border inputs to respective ones of the northernmost and southernmost processor elements from respective ones of the southernmost and northernmost rows of PIXELS in the neighboring north and south PIXEL strips, respectively; and, FIGS. 17a and 17b, when placed in side-by-side relation and considered conjointly, comprise a highly diagrammatic three-dimensional block-and-line drawing somewhat similar to FIG. 1, but here illustrating a plurality of Vector Image Processors ("VIPs") embodying features of the present invention configured in externally pipelined format.
Figure 16B:
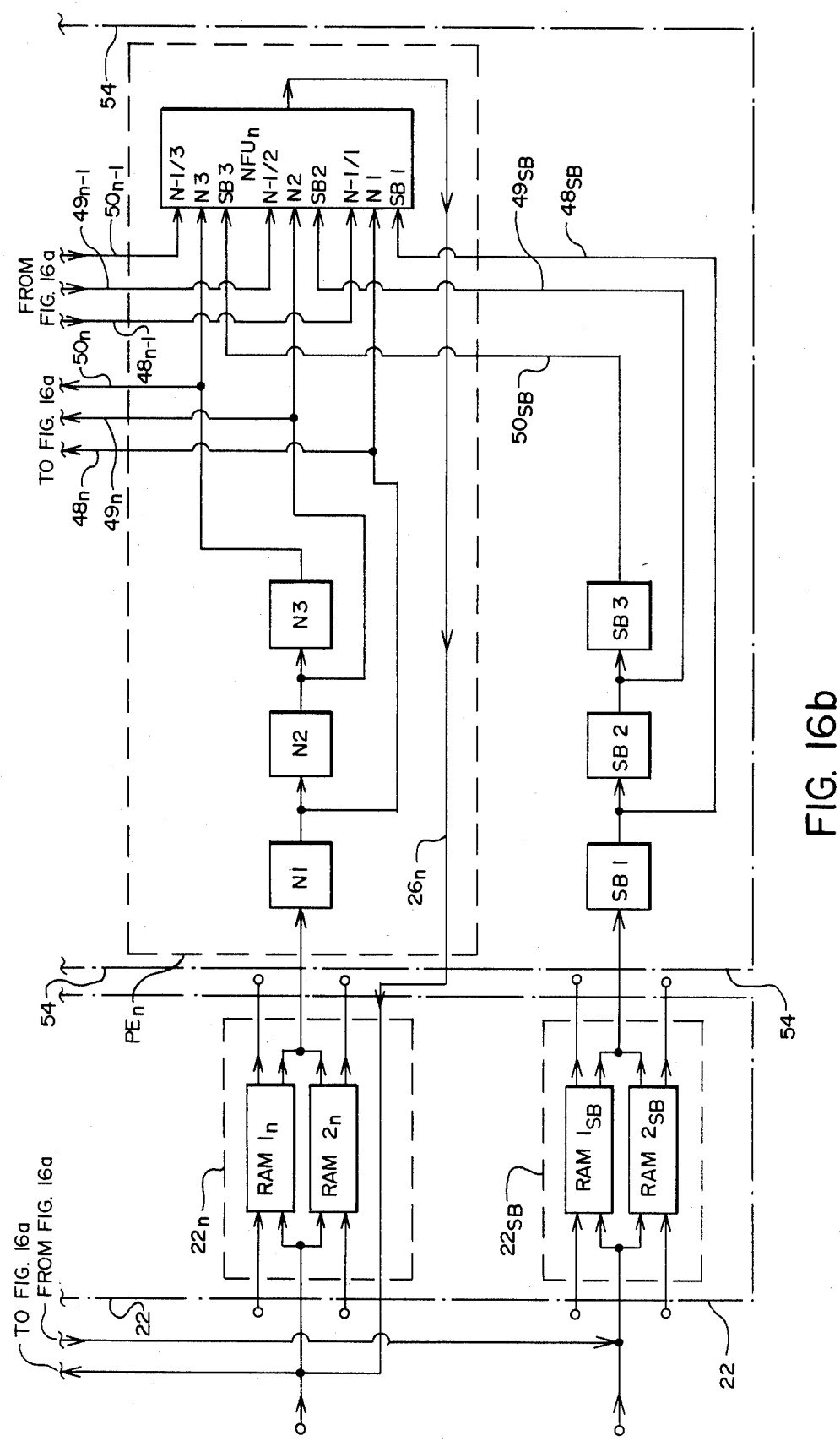

With the foregoing in mind, and assuming that the VIP 54 is processing the eight (8) rows "A" through "H" in Strip No. 1, it will be appreciated that Memory devices $22_{NB}$ initially contains digitally encoded data representative of the north boundary of the two-dimensional 32×32 PIXEL image array 52 shown in FIG. 15; and, such data is shifted sequentially into and through latches NB1, NB2 and NB3 in precisely the same manner as previously described for data input to the PES shown in FIGS. 14a through 14d. Consequently, on the first, second and third shift commands emanating from the Sequencer 31 (FIG. 1): (i) digitally encoded data representative of north boundary locations will be shifted into latches NB1, NB2 and NB3; (ii) the digitally encoded data representative of the PIXELS in columns "1" and "0" and western boundary data will be shifted into respective ones of the latches associated with processor elements $PE_a$ through $PE_n$—i.e., the PIXEL data at such columns and boundary locations for rows "A" through "H"; and (iii), the digitally encoded data for columns "1" and "0" and western boundary data for row "I"—viz., the northernmost row in Strip No. 2 and, therefore, the row containing south neighbor inputs for $PE_n$ (herein, $Pe_h$)—will be shifted into latches SB1, SB2 and SB3. In this instance, however, data output on the three-state bus $26_n$ for $NFU_n$—i.e., the southernmost row "H" in Strip No. 1—is not only input to Memory location $22_n$ but, additionally, is input to Memory location $22_{NB}$ containing northern boundery data. As a consequence, when the VIP 54 is commanded by the Sequencer 31 to shift to Strip No. 2, the north boundary Memory location $22_{NB}$ will contain digitally encoded data at the appropriate address positions corresponding to the thirty-two (32) PIXELS in row "H"—viz., the southernmost row in Strip No. 1 and, consequently, the row containing north boundary information for row "I" in Strip No. 2. Similarly, data from the northermost processing element $PE_a$ may be fed via three-state bus $26_a$ to not only Memory location $22_a$ but, additionally, to the south border Memory location $22_{SB}$—thereby enabling the VIP to be shifted from Strip No. 2 in a northerly direction to reprocess Strip No. 1 should the need arise since, under these conditions, the data stored in the south border Memory $22_{SB}$ wil be the digitally encoded data for the PIXEL positions in row "I" which is, in fact, the southern boundary data required for $PE_n$ when processing row "H" in Strip No. 1.

Thus, there has hereinabove been described a simple, yet highly effective, system for inputting required north and south boundary data to the VIP 54 when the VIP is configured to process sequential strips of PIXEL data as herein defined; and, of course, it will be understood that such an arrangement for inputting north and south boundary data is equally applicable to Vector Image Processing Systems embodying the invention and of the type shown in FIGS. 1 and 14a-14d where the VIP 24 includes a one-dimensional columnar array of PES equal in number to the number of rows of PIXEL data in a two-dimensional XY PIXEL image array 25.

F. External Pipelining

Figure 17A:
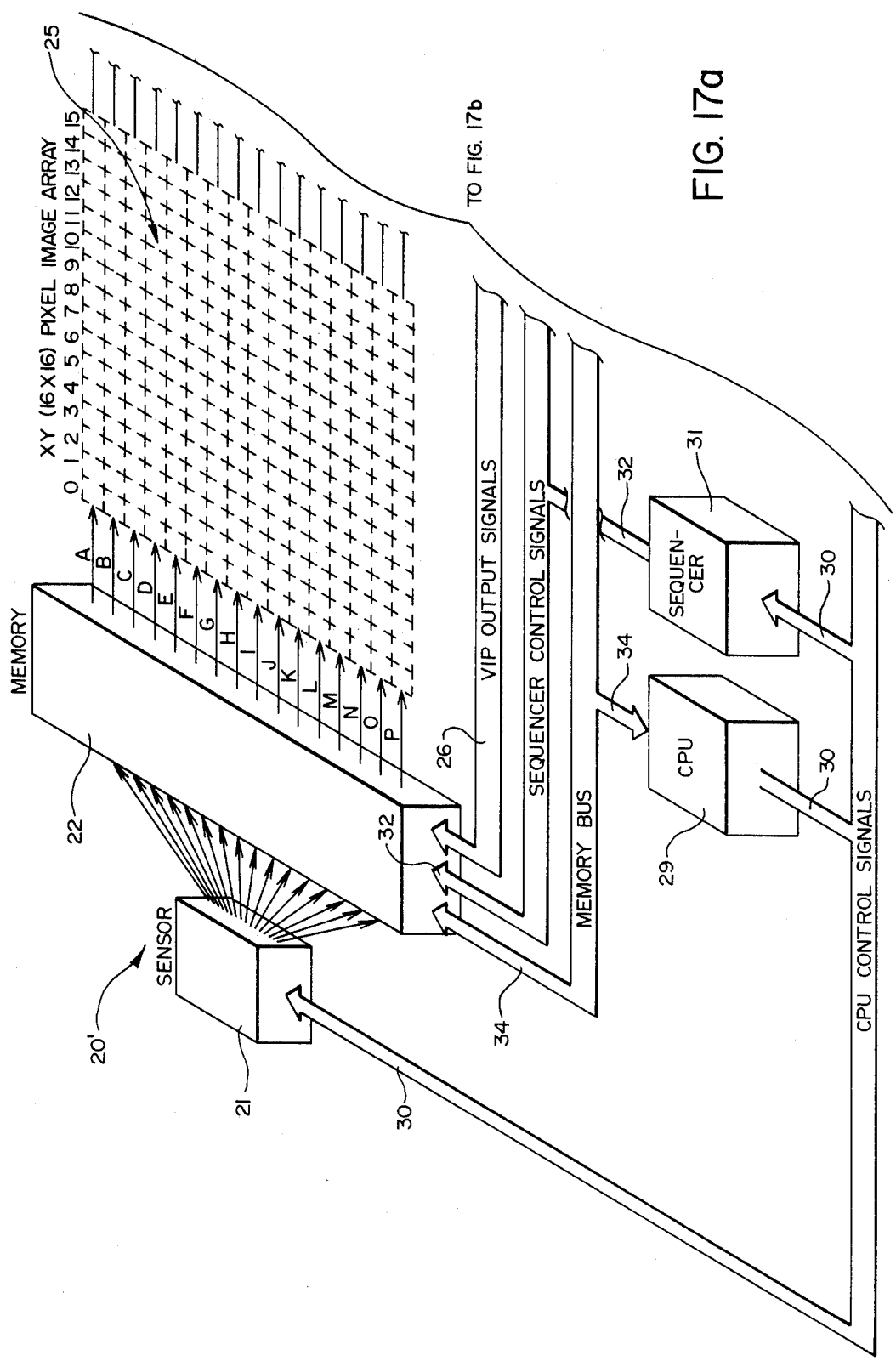

As indicated in preceding portions of the present specification—particularly, that portion dealing with the embodiment of the invention illustrated in FIGS. 14a through 14d—VIPs embodying the features of the present invention are configured as one-dimensional columnar arrays of n parallel PES wherein rows of digitally encoded PIXEL data are processed in parallel for one column at a time, and wherein columns of PIXEL data are processed in internally pipelined fashion; yet, wherein the VIP can be configured to optionally permit external pipelining. One form of an exemplary externally pipelined Vector Image Processing System, generally indicated at 20', has been illustrated in FIGS. 17a and 17b. Thus, as here shown, the processing system 20' is identical to the processing system 20 shown in FIG. 1 except that the single VIP 24 shown in FIG. 1 has been replaced by n VIPs here identified as $VIP_a$, $VIP_b$ . . . $VIP_n$, respectively designated by the reference numbers $24_a$, $24_b$ . . . $24_n$, it being understood that the pipelined system 20' may include two (2) VIPs, three (3) VIPs as shown, or any desired additional number of VIPs. As illustrated, the image processing system 20' of FIGS. 17a and 17b operates in precisely the same fashion as the system 20 shown in FIG. 1, except that in this instance, digitally encoded data representative of a two-dimensional XY PIXEL image array 25 (FIG. 17a) is simultaneously input to each of the pipelined VIPs—viz., $VIP_a$, $VIP_b$ . . . $VIP_n$ as shown in FIG. 17b; and, consequently, two, three or more different processing operations may be conducted simultaneously with the data output from each pipelined VIP being returned to the Memory 22 via three-state bus 26.

Although not shown in the drawings, those skilled in the art will appreciate that numerous other pipelined configurations may be employed without departing from the spirit and scope of the invention as described herein and as expressed in the appended claims. For example, the data output from $VIP_a$ (FIG. 17b) may be fed directly to $VIP_b$ rather than being returned via bus 26 to the Memory 22; and, in similar fashion, each VIP in the pipeline may feed its output directly to the next downstream VIP, with the final VIP in the pipeline—viz., $VIP_n$—returning its output via three-state bus 26 to Memory 22. Such an arrangement is known in the art as a "Systolic" pipelined image processing system.

Alternatively, each of the VIPs shown in FIG. 17b may, if desired, be provided with its own Memory. Such an arrangement would have many possible applications. For example, assuming that each of the VIPs includes sixteen (16) PES, then three of such VIPs could be provided to handle all rows of a 48×48 PIXEL image array in parallel internally pipelined form. Or, if desired, suitably pipelined VIPs can each be commanded to perform a series of different processing operations on essentially the same PIXEL data output from the Sensor 21.

Thus, those skilled in the image processing art will appreciate that there has herein been described a special purpose image processing system, and hardware therefor, enabling the user to process two-dimensional XY PIXEL image arrays with a Vector Image Processing System—i.e., the processing of digitally encoded image representative PIXELS in a two-dimensional XY PIXEL image array by processing n rows of PIXELS in parallel and n columns of PIXELS in internally pipelined form. Since each PE is configured to process only one PIXEL at a time, the pin requirements for each such PE are minimized. Thus, each single PE IC requires a maximum of one (1) data input pin, six (6) neighbor input pins (assuming a 3×3 neighborhood operation), control and clock input pins, one (1) data output pin, and six (6) neighbor output pins; yet, the VIP is capable of performing not only LOGIC and ARITHMETIC TRANSFORMS; but, in addition, NEIGHBOR TRANSFORMS. And, of course, implementation of two or more PES on a single IC requires the addition of only two (2) pins per PE for full speed operation since all control pins, power pins, etc., are common to all PES. Consequently, a sixteen (16) PE chip or IC might have twenty (20) control and power pins, thirty-two (32) data I/O pins, and no neighbor pins except for two (2) pins to provide north and south border inputs—i.e., a total of only fifty-four (54) pins as contrasted with conventional chips which often require in excess of two hundred (200) pins. Since the VIP of the present invention provides for input of boundary data in essentially the same fashion as input of neighbor data, the VIP can be used to process virtually any sized two-dimensional XY PIXEL image array without loss of neighbor relations at the edges of the image. Moreover, the simplicity of the system readily permits of implementation of up to on the order of sixty-four (64), or more, PES on a single IC. The arrangement is such that VIP systems of the type herein described are characterized by their versatility and flexibility, and permit of ease of packaging in compact, lightweight packages which readily permit of use in various field installations where image processing is desired, but which have heretofore been incapable of practical implementation.

What is claimed is:

1. The method of processing a two-dimensional XY PIXEL image array containing discrete bits of digitally encoded PIXEL data oriented in "X" rows and "Y" columns, and including a multiplicity of overlapping two-dimensional AB neighborhoods, where "A" and "B" can have any desired whole integer value greater than "1", and wherein each two-dimensional AB neighborhood includes a PIXEL to be processed and data bits representative of neighbor PIXELS and any boundary data bits adjacent the PIXEL to be processed; said method comprising the steps of:

(a) shifting n rows of digitally encoded PIXEL data, where "n" is any whole integer, in column-by-column sequential internally pipelined order through a one-dimensional columnar array of n processing element(s) each including:
      (i) a plurality of serially cascaded interconnected latches equal in number to the value of "A" in the two-dimensional AB neighborhood for storing a plurality of discrete bits of digitally encoded data intermediate successive data shifts; and,
      (ii) a neighborhood functional processing unit for performing a NEIGHBORHOOD TRANSFORM processing operation;
   (b) conveying the digitally encoded data stored in one of the serially cascaded interconnected latches in each of the n processing element(s) and corresponding to each PIXEL to be processed to the neighborhood functional processing unit on that processing element;
   (c) conveying digitally encoded data representative of all neighbor PIXELS and boundary data contained within each two-dimensional AB neighborhood to the neighborhood functional processing unit in each of the n processing element(s);
   (d) performing a computational NEIGHBORHOOD TRANSFORM processing operation on the digitally encoded PIXEL data for each PIXEL being analyzed at a given instant of time in the neighborhood functional processing unit in each of the n processing element(s); and,
   (e) outputting digitally encoded data representative of the results of each computational NEIGHBORHOOD TRANSFORM processing operation on each PIXEL being processed, with all PIXELS in a given "Y" column of PIXELS and in the n rows being processed in parallel in those instances where n is greater than "1", and with all PIXELS in each of the n rows being processed in internally pipelined sequential order.

2. The method of processing a two-dimensional XY PIXEL image array containing discrete bits of digitally encoded PIXEL data oriented in "X" rows and "Y" columns, and including a multiplicity of overlapping two-dimensional AB neighborhoods, where "A" and "B" can have any desired whole integer value greater than "1", and wherein each two-dimensional AB neighborhood includes a PIXEL to be processed and data bits representative of neighbor PIXELS and any boundary data bits located adjacent the PIXEL to be processed; said method comprising the steps of:

(a) shifting n rows of digitally encoded PIXEL data, where "n" is any whole integer, in column-by-column sequential internally pipelined order through a one-dimensional columnar array of n processing element(s) each including:
      (i) a plurality of serially cascaded interconnected latches equal in number to the value of "A" in the two-dimensional AB neighborhood for storing a plurality of discrete bits of digitally encoded data intermediate successive data shifts;
      (ii) a neighborhood functional processing unit for performing a NEIGHBORHOOD TRANSFORM processing operation; and,
      (iii) one of an arithmetic processing unit, a logic unit or an arithmetic logic unit for performing one of an ARITHMETIC TRANSFORM processing operation or a LOGIC TRANSFORM processing operation;
   (b) conveying the digitally encoded data stored in one of the serially cascaded interconnected latches in each of the n processing element(s) and corresponding to each PIXEL to be processed to the neighborhood functional processing unit on that processing element;
   (c) conveying digitally encoded data representative of all neighbor PIXELS and boundary data contained within each two-dimensional AB neighborhood to the neighborhood functional processing unit in each of the n processing element(s);
   (d) conveying digitally encoded data stored in one of the serially cascaded interconnected latches in each of the n processing elements and corresponding to each PIXEL to be processed, and digitally encoded data stored in an adjacent one of the serially connected latches to the one of the arithmetic processing unit, logic unit or arithmetic logic unit on that processing element;
   (e) performing one of a computational NEIGHBORHOOD TRANSFORM processing operation, a computational ARITHMETIC TRANSFORM processing operation, or a computational LOGIC TRANSFORM processing operation on the digitally encoded PIXEL data for each PIXEL being analyzed at a given instant of time in either the neighborhood functional processing unit or the one of the arithmetic processing unit, logic unit or arithmetic logic unit in each of the n processing element(s); and, (f) outputting digitally encoded data representative of the results of each computational TRANSFORM processing operation on each PIXEL being processed, with all PIXELS in a given "Y" column of PIXELS and in the n rows being processed in parallel in those instances where n is greater than "1", and with all PIXELS in each of the n rows being processed in internally pipelined sequential order.

3. The method as set forth in claims 1 or 2 wherein the PIXEL data pits are processed using bit-serial arithmetic.

4. The method as set forth in claims 1 or 2 wherein n is greater than "1", and the n processing elements are bit-serial synchronous processing elements.

5. The method as set forth in claims 1 or 2 wherein each two-dimensional AB neighborhood array is a 3×3 array.

6. The method as set forth in claims 1 or 2 wherein each two-dimensional AB neighborhood array is a Golay Surround.

7. The method as set forth in claims 1 or 2 wherein n is greater than "2", and wherein the digitally encoded data in the northernmost one of the n processing elements provides north neighbor inputs to the neighborhood functional unit on the adjacent southern processing element, the digitally encoded data in the southernmost one of the n processing elements provides south neighbor input to the neighborhood functional unit on the adjacent northern processing element, and wherein the digitally encoded data in all intermediate ones of the n processing elements provides north neighbor input to the neighborhood functional unit on the adjacent south processing element and south neighbor input to the neighborhood functional unit on the adjacent north processing element.

8. The method as set forth in claim 7 wherein north and south border memories provide north and south neighbor inputs respectively to the neighborhood functional units on respective ones of the northernmost and southernmost ones of the n processing elements.

9. The method as set forth in claims 1 or 2 wherein n is greater than "1" and is a whole integer fraction of "X", and wherein the two-dimensional XY PIXEL image array is processed by processing successive strips each including n rows of digitally encoded PIXEL data with such rows being processed in parallel internally pipelined order and with such strips being processed in series.

10. An image processing system for processing a two-dimensional XY array of digitally encoded PIXEL data bits disposed in "X" rows "A", "B", "C" ... "$X_n$" and "Y" columns "0", "1", "2" ... "$Y_n$" wherein said array contains discrete PIXEL data bits, and for performing NEIGHBORHOOD TRANSFORM processing operations on each PIXEL data bit in said two-dimensional XY array based on the relation of the value of each PIXEL data bit to the value of its northern, southern, eastern and western neighbors in a two-dimensional AB neighborhood array containing "A" columns and "B" rows where "A" and "B" have equal integer values greater than "1"; said image processing system comprising, in combination:

(a) a sensor for detecting image data and outputting such data in the form of a two-dimensional XY array of digitally encoded PIXEL data bits;

(b) a memory having XY address locations for storing said two-dimensional XY array of digitally encoded PIXEL data bits and boundary address locations for storing digitally encoded data bits representative of the northern, southern, eastern and western boundaries of said XY array;

(c) a vector image processor comprising n processing element(s) wherein "n" can be any whole integer value and wherein said n processing elements are disposed in parallel in those instances where "n" is greater than "1", said n processing element(s) each including:
   (i) m serially cascaded interconnected latches where the value of "m" is equal to the value of "A" in said two-dimensional AB neighborhood array; and,
   (ii) a neighborhood functional unit having a first group m, a second group m', and a third group m" of input terminals and an output terminal, said neighborhood functional unit being programmed to perform selected NEIGHBORHOOD TRANSFORM processing operations on digitally encoded data presented on its input terminals upon receipt of a compute command signal;

(d) m north and south serially cascaded interconnected boundary latches for receiving digitally encoded data bits stored in said memory boundary address locations representative of north and south boundary locations corresponding to each column of PIXEL data bits to be processed and corresponding to the eastern and western boundaries of said two-dimensional XY array;

(e) means for coupling said m serially cascaded interconnected latches on each of said n processing elements to:
   (i) said first group m of input terminals on said neighborhood functional unit on that particular one of said n processing elements;
   (ii) said second group m' of input terminals on said neighborhood functional unit on any immediately adjacent northern one of said n processing elements; and,
   (iii) said third group m" of input terminals on said neighborhood functional unit on any immediately adjacent southern one of said n processing elements;

(f) means for coupling said m north serially cascaded boundary latches to said third group m" of input terminals on said neighborhood functional unit on the northernmost one of said n processing elements;

(g) means for coupling said m south serially cascaded boundary latches to said second group m' of input terminals on said neighborhood functional unit on the southernmost one of said n processing elements; and, (h) means for generating a series of programmed shift and compute command signals and for transmitting such signals to: (i) said memory XY and boundary address locations; (ii) said m serially cascaded interconnected latches on each of said n processing elements; (iii) said m north serially cascaded interconnected boundary latches; (iv) said m south serially cascaded interconnected boundary latches; and (v), said neighborhood functional units on each of said n processing elements, for inputting shift command signals thereto, and for inputting compute command signals to each of said neighborhood functional units on each of said n processing elements; whereby each shift command signal input to: (i) n of said memory XY address locations; (ii) said memory boundary address locations; (iii) said m serially cascaded latches on said n processing elements; (iv) said m north and south serially cascaded interconnected boundary latches; and (v), said neighborhood functional units on each of said n processing elements, serves to shift: (a) n of said "X" rows of digitally encoded PIXEL data bits stored in n adjacent ones of said memory XY address locations where "n" is equal to the number "n" of said processing elements; (b) boundary data bits in said boundary address locations corresponding to shifted PIXEL data bits; and (c), data bits stored in all of said latches and presented on said first, second and third groups m, m' and m" of input terminals of each of said neighborhood functional units on each of said n processing elements by one column position so as to shift n of said "X" rows of digitally encoded PIXEL data bits successively through respective ones of said m serially cascaded latches on each of said n processing elements in column-by-column internally pipelined order and for simultaneously shifting digitally encoded north and south boundary data bits through said m north and south serially cascaded boundary latches in column-by-column internally pipelined order whereby m digitally encoded PIXEL data bits, m bits of north boundary data for each of said n processing elements, and m bits of south boundary data for each of said n processing elements are successively and simultaneously presented on said first, second and third groups m, m' and m" of input terminals of said neighborhood functional units on each of said n processing elements; and, each compute command signal input to said neighborhood functional unit on each of said n processing elements serves to initiate a NEIGHBORHOOD TRANSFORM processing operation with the results of each of said n operations being output from said n processing elements on the next succeeding shift command signal and being input to the associated ones of said memory XY address locations.

11. An image processing system for processing a two-dimensional XY array of digitally encoded PIXEL data bits disposed in "X" rows "A", "B", "C" ... "$X_n$" and "Y" columns "0", "1", "2" ... "$Y_n$" wherein said array contains discrete PIXEL data bits, and for performing a selected one of an ARITHMETIC TRANSFORM or LOGIC TRANSFORM processing operation with respect to two adjacent PIXELS in a given row, or a NEIGHBORHOOD TRANSFORM processing operation on each PIXEL data bit in said two-dimensional XY array based on the relation of the value of each PIXEL data bit to the value of its northern, southern, eastern and western neighbors in a two-dimensional AB neighborhood array containing "A" columns and "B" rows where "A" and "B" have equal integer values greater than "1"; said image processing system comprising, in combination:
(a) a sensor for detecting image data and outputting such data in the form of a two-dimensional XY array of digitally encoded PIXEL data bits;
(b) a memory having XY address locations for storing said two-dimensional XY array of digitally encoded PIXEL data bits and boundary address locations for storing digitally encoded data bits representative of the northern, southern, eastern and western boundaries of said XY array;
(c) a vector image processor comprising n processing element(s) wherein "n" can be any whole integer value and wherein said n processing elements are disposed in parallel in those instances where "n" is greater than "1", said n processing element(s) each including:
 (i) m serially cascaded interconnected latches where the value of "m" is equal to the value of "A" in said two-dimensional AB neighborhood array;
 (ii) a neighborhood functional unit having a first group m, a second group m', and a third group m" of input terminals and an output terminal, said neighborhood functional unit being programmed to perform selected NEIGHBORHOOD TRANSFORM processing operations on digitally encoded data presented on its input terminals upon receipt of a compute command signal; and,
 (iii) one of an arithmetic processing unit, a logic unit or an arithmetic logic unit having a pair of input terminals and an output terminal and programmed to perform a selected ARITHMETIC and/or LOGIC TRANSFORM processing operation on digitally encoded data presented on its input terminals upon receipt of a compute command signal;
(d) m north and south serially cascaded interconnected boundary latches for receiving digitally encoded data bits stored in said memory boundary address locations representative of north and south boundary locations corresponding to each column of PIXEL data bits to be processed and corresponding to the eastern and western boundaries of said two-dimensional XY array;
(e) means for coupling said m serially cascaded interconnected latches on each of said n processing elements to:
 (i) said first group m of input terminals on said neighborhood functional unit on that particular one of said n processing elements;
 (ii) said second group m' of input terminals on said neighborhood functional unit on any immediately adjacent northern one of said n processing elements; and,
 (iii) said third group m" of input terminals on said neighborhood functional unit on any immediately adjacent southern one of said n processing elements;
(f) means for coupling said m north serially cascaded boundary latches to said third group m" of input terminals on said neighborhood functional unit on the northernmost one of said n processing elements;
(g) means for coupling said m south serially cascaded boundary latches to said second group m' of input terminals on said neighborhood functional unit on the southernmost one of said n processing elements;
(h) means for coupling two of said m serially cascaded interconnected latches on each of said n processing elements to respective ones of said pair of input terminals on the one of said arithmetic processing unit, logic unit or arithmetic logic unit on that particular one of said n processing elements; and, (i) means for generating a series of programmed shift and compute command signals and for transmitting such signals to: (i) said memory XY and boundary address locations; (ii) said m serially cascaded interconnected latches on each of said n processing elements; (iii) said m north serially cascaded interconnected boundary latches; (iv) said m south serially cascaded interconnected boundary latches; (v) said neighborhood functional units on each of said n processing elements; and (vi), said one of said arithmetic processing unit, logic unit or arithmetic logic unit on each of said n processing elements, for inputting shift command signals thereto, and for inputting compute command signals to one only of said neighborhood functional unit or said one of said arithmetic processing unit, logic unit or arithmetic logic unit on each of said n processing elements; whereby each shift command signal input to: (i) n of said memory XY address locations; (ii) said memory boundary address locations; (iii) said m serially cascaded latches on said n processing elements; (iv) said m north and south serially cascaded interconnected boundary latches; (v) said neighborhood functional units on each of said n processing elements; and (vi), said one of said arithmetic processing unit, logic unit or arithmetic logic unit on each of said n processing elements, serves to shift: (a) n of said "X" rows of digitally encoded PIXEL data bits stored in n adjacent ones of said memory XY address locations where "n" is equal to the number "n" of said processing elements; (b) boundary data bits in said boundary address locations corresponding to shifted PIXEL data bits; and (c), data bits stored in all of said latches and presented on said first, second and third groups m, m' and m" of input terminals of each of said neighborhood functional units and on said pair of input terminals on said one of said arithmetic processing unit, logic unit or arithmetic logic unit on each of said n processing elements by one column position so as to shift n of said "X" rows of digitally encoded PIXEL data bits successively through respective ones of said m serially cascaded latches on each of said n processing elements in column-by-column internally pipelined order and for simultaneously shifting digitally encoded north and south boundary data bits through said m north and south serially cascaded boundary latches in column-by-column internally pipelined order whereby m digitally encoded PIXEL data bits, m bits of north boundary data for each of said n processing elements, and m bits of south boundary data for each of said n processing elements are successively and simultaneously presented on said first, second and third groups m, m' and m" of input terminals on said neighborhood functional units on each of said n processing elements, and PIXEL data bits in two of said m serially cascaded interconnected latches on each of said n processing elements are successively and simultaneously presented on said pair of input terminals on said one of said arithmetic processing unit, logic unit or arithmetic logic unit on that particular one of each of said n processing elements; and each compute command signal is input to one only of said neighborhood functional unit or said one of said arithmetic processing unit, said logic unit or said arithmetic logic unit on each of said n processing elements and serves to initiate a selected one of a NEIGHBORHOOD, ARITHMETIC or LOGIC TRANSFORM processing operation with the results of each of said n operations being output from said n processing elements on the next succeeding shift command signal and being input to the associated ones of said memory XY address locations.

12. An image processing system as set forth in claims 10 or 11 wherein said n processing elements are bit-serial processing elements.

13. An image processing system as set forth in claim 10 wherein n is greater than "1".

14. An image processing system as set forth in claim 11 wherein n is greater than "1".

15. An image processing system as set forth in claims 13 or 14 wherein said n processing elements are bit-serial synchronous processing elements.

16. An image processing system as set forth in claims 10, 11, 13 or 17 wherein each said two-dimensional AB neighborhood array is a 3×3 array and m is equal to "3".

17. An image processing system as set forth in claims 10, 11, 13 or 14 wherein each said two-dimensional AB neighborhood array is a Golay Surround.

18. An image processing system as set forth in claims 10 or 11 wherein n is greater than "2" and wherein the digitally encoded data in said m serially cascaded interconnected latches of the northernmost one of said n processing elements provides north neighbor inputs to said third group m" of input terminals on said neighborhood functional unit on the adjacent southern processing element, the digitally encoded data in said m serially cascaded interconnected latches of the southernmost one of said n processing elements provides south neighbor inputs to said second group m' of input terminals on said neighborhood functional unit on the adjacent northern processing element, and wherein the digitally encoded data in said m serially cascaded interconnected latches of all intermediate ones of said n processing elements provides north neighbor inputs to said third group m" of input terminals on said neighborhood functional unit on the adjacent southern processing element and south neighbor inputs to said second group m" of input terminals on said neighborhood functional unit on the adjacent north processing element.

19. An image processing system as set forth in claim 18 wherein data output from the northernmost and southernmost ones of said n processing elements is also input to said south and north boundary address locations respectively in said memory.

20. An image processing system as set forth in claims 10 or 11 wherein n is greater than "1" and is a whole integer fraction of "X", and further including means for shifting adjacent strips of said two-dimensional XY PIXEL image array each including n rows of PIXEL data relatively through said vector image processor in parallel row internally pipelined column-by-column order with said strips being processed in series.

21. An image processing system as set forth in claims 10 or 11 wherein n is on the order of up to about "64" and wherein all of said n processing elements, said m north and south boundary latches, and said coupling means are formed on a single integrated circuit.

22. In an image processing system for the type employing: (i) a sensor for detecting image data and outputting such data in the form of a two-dimensional XY array of digitally encoded PIXEL data bits disposed in "X" rows "A", "B", "C" . . . "$X_n$" and "Y" columns "0", "1", "2" ... "$Y_n$" wherein said array contains discrete PIXEL data bits and wherein said two-dimensional XY array includes a plurality of overlapping two-dimensional AB neighborhood arrays for each and every PIXEL location in the XY array where "A" and "B" have equal integer values greater than "2"; (ii) a memory having XY address locations for storing said two dimensional XY array of digitally encoded PIXEL data bits and boundary address locations for storing digitally encoded data bits representative of the northern, southern, eastern and western boundaries of said XY array: (iii) a special purpose image processor; (iv) a host central processing unit coupled to the memory and to the special purpose image processor; and (v), a sequencer controlled by the central processing unit for inputting shift command signals to the memory and both shift command signals and compute command signals to the special purpose image processor; the improvement in said special purpose image processor comprising, in combination:

(a) means for shifting n of said "X" rows of digitally encoded PIXEL data bits through said special purpose image processor in parallel and in column-by-column stepwise internally pipelined order where "n" is any whole integer greater than "2";

(b) means for storing n two-dimensional AB neighborhood arrays each including a particular PIXEL data bit in one of the n "X" rows and all neighboring PIXEL and boundary data bits in the preselected two-dimensional AB array during periods intermediate successive data shift signals;

(c) means for performing a NEIGHBORHOOD TRANSFORM processing operation on all data bits in each of the n stored two-dimensional AB arrays; whereby said two-dimensional XY array of PIXEL data bits is processed in parallel row and internally pipelined column-by-column order; and (d) n processing elements and wherein said means for storing n two-dimensional AB neighborhood arrays comprises n sets of m serially cascaded interconnected latches where "m" is less then "n" and with one such set formed on each of said n processing elements whereby the centermost one of said m latches on any given one of said n processing elements contains the PIXEL data bits to be analyzed by that processing element during a NEIGHBORHOOD TRANSFORM and wherein that processing element comprises the centermost one of m of said n processing elements, and wherein all latches in said n processing elements surrounding the centermost one of said m latches on said given one of said n processing elements provide neighbor inputs to that one of said n processing elements containing said centermost one of said m latches.

23. In an image processing system of the type employing: (i) a sensor for detecting image data and outputting such data in the form of a two-dimensional XY array of digitally encoded PIXEL data bits disposed in "X" rows "A", "B", "C" ... "$X_n$" and "Y" columns "0", "1", "2" ... "$Y_n$" wherein said array contains discrete PIXEL data bits and wherein said two-dimensional XY array includes a plurality of overlapping two-dimensional AB neighborhood arrays for each and every PIXEL location in the XY array where "A" and "B" have equal integer values greater than "2"; (ii) a memory having XY address locations for storing said two-dimensional XY array of digitally encoded PIXEL data bits and boundary address locations for storing digitally encoded PIXEL data bits and boundary address locations for storing digitally encoded data bits representative of the northern, southern, eastern and western boundries of said XY array; (iii) a special purpose image processor; (iv) a host central processing unit coupled to the memory and to the special purpose image processor; and (v), a sequencer controlled by the central processing unit for inputting shift command signals to the memory and both shift command signals and compute command signals to the special purpose image processor; the improvement in said special purpose image processor comprising, in combination:

(a) means for shifting n of said "X" rows of digitally encoded PIXEL data bits through said special purpose image processor in parallel and in column-by-column stepwise internally pipelined order where "n" is any whole integer greater than "2";

(b) means for storing n two-dimensional AB neighborhood arrays each including a particular PIXEL data bit in one of the n "X" rows and all neighboring PIXEL and boundary data bits in the preselected two-dimensional AB array during periods intermediate successive data shift signals;

(c) means for performing a selected one of:
  (i) a NEIGHBORHOOD TRANSFORM processing operation on all data bits in each of the n stored two-dimensional AB arrays; or,
  (ii) one only of an ARITHMETIC TRANSFORM and a LOGIC TRANSFORM processing operation with respect to each PIXEL data bit being analyzed in each of said n "X" rows and an adjacent PIXEL data bit in one of said n "X" rows;

whereby said two-dimensional XY array of PIXEL data bits is processed in parallel row and internally pipelined column-by-column order; and (d) n processing elements and wherein said means for storing n two-dimensional AB neighborhood arrays comprises n sets of m serially cascaded interconnected latches where "m" is less than "n" and with one such set formed on each of said n processing elements whereby the centermost one of said m latches on any given one of said n processing elements contains the PIXEL data bits to be analyzed by that processing element during a NEIGHBORHOOD TRANSFORM and wherein that processing element comprises the centermost one of m of said n processing elements, and wherein all latches in said n processing elements surrounding the centermost one of said m latches on said given one of said n processing elements provide neighbor inputs to that one of said n processing elements containing said centermost one of said m latches.

24. The improvement in a special purpose image processor as set forth in claim 22 or 23 wherein said two-dimensional AB neighborhood array is a 3×3 array, m is "3", and each of said n processing elements provides north neighbor inputs to its neighbor processing element on the south and south neighbor inputs to its neighbor processing element on the north.

25. The improvement in a special purpose image processor as set forth in claim 24 further including north and south sets of three serially cascaded latches for respectively storing north and south boundary data bits output from said memory boundary address locations in column-by-column pipelined order and where said north set provides north neighbor inputs to the northernmost one of said n processing elements and said south set provides south neighbor inputs to the southernmost one of said n processing elements.

26. The improvement in a special purpose image processor as set forth in claim 25 wherein n is on the order of up to about "64" and wherein said means for storing n two-dimensional AB neighborhood arrays, said means for performing a processing operation, and said north and south sets of boundary data latches are formed on a single integrated circuit.

27. A one-dimensional columnar vector image processor for use in processing digitally encoded PIXEL data bits contained within a multiplicity of two-dimensional AB neighborhood arrays in parallel row, internally pipelined, column-by-column order and for use with an image processing having: (i) a sensor for outputting a two-dimensional XY video image having PIXELS oriented in "X" rows "A", "B", "C" ... "$X_n$" and "Y" columns "0", "1", "2" ... "$Y_n$"; (ii) a memory for receiving data from said sensor and containing XY address locations for storage of said PIXEL data bits and boundary address locations for storage of data bits representative of the north, south, east and west boundaries of said two-dimensional XY video image; (iii) a central processing unit coupled to said sensor and said memory; and (iv), a sequencer controlled by said central processing unit and coupled to said memory and said vector image processor for inputting data shift command signals thereto and for inputting compute command signals to said vector image processor for initiating a computational processing operation; said vector image processor comprising, in combination:
  (a) n processing elements disposed in parallel where "n" is any whole integer greater than "1", each of said n processing elements including:
    (i) a series of m serially cascaded interconnected latches where the value of "m" is equal to the value of "A" in said two-dimensional AB neighborhood array;
    (ii) a neighborhood functional unit having a first group m, a second group m', and a third group m" of input terminals and an output terminal, said neighborhood functional unit being programmed to perform selected NEIGHBORHOOD TRANSFORM processing operations on digitally encoded data presented on its input terminals upon receipt of a compute command signal; and,
    (iii) one of an arithmetic processing unit, a logic unit or an arithmetic logic unit having a pair of input terminals and an output terminal, said one of said arithmetic processing unit, logic unit or arithmetic logic unit being programmed to perform one of an ARITHMETIC TRANSFORM or a LOGIC TRANSFORM processing operation on digitally encoded data presented on its input terminals upon receipt of a compute command signal;
  (b) m north and south serially cascaded interconnected boundary latches for receiving digitally encoded data bits stored in said memory boundary address locations representative of north and south boundary locations corresponding to each column of PIXEL data bits to be processed and corresponding to the eastern and western boundaries of said two-dimensional XY array;
  (c) means for coupling said m serially cascaded interconnected latches on each of said n processing elements to:
    (i) said first group m of input terminals on said neighborhood functional unit on that particular one of said n processing elements;
    (ii) said second group m' of input terminals on said neighborhood functional unit on any immediately adjacent northern one of said n processing elements; and,
    (iii) said third group m" of input terminals on said neighborhood functional unit on any immediately adjacent southern one of said n processing elements;
  (d) means for coupling said m north serially cascaded boundary latches to said third group m" of input terminals on said neighborhood functional unit on the northernmost one of said n processing elements;
  (e) means for coupling said m south serially cascaded boundary latches to said second group m' of input terminals on said neighborhood functional unit on the southernmost one of said n processing elements; and,
  (f) means for coupling said one of said m serially cascaded interconnected latches containing the particular PIXEL data bit to be processed and an adjacent one of said m serially cascaded interconnected latches on each of said n processing elements to respective ones of said pair of input terminals of said one of said arithmetic processing unit, logic unit or arithmetic logic unit on each of said n processing elements;
  whereby each shift command signal generated by the sequencer and input to said vector image processor serves to shift all PIXEL data bits and all boundary data bits in each of said two-dimensional AB neighborhoods by one column position and where each compute command signal transmitted by the sequencer to said vector image processor serves to initiate a computational operation in either said neighborhood logic unit or in the one of said arithmetic processing unit, logic unit or arithmetic logic unit on each of said n processing elements for initiating a selected one of a NEIGHBORHOOD TRANSFORM, an ARITHMETIC TRANSFORM, or a LOGIC TRANSFORM.

28. A one-dimensional columnar vector image processor as set forth in claim 27 wherein said n processing elements are bit-serial synchronous processing elements.

29. A one-dimensional columnar vector image processor as set forth in claim 27 wherein each said two-dimensional AB neighborhood array is a 3×3 array and "m" is equal to "3".

30. A one-dimensional columnar vector image processor as set forth in claim 27 wherein each said two-dimensional AB neighborhood array is a Golay Surround.

31. A one-dimensional columnar vector image process as set forth in claim 27 wherein data output from the southernmost one of said n processing elements is input to said north boundary address location in said memory.

32. A one-dimensional columnar vector image process as set forth in claim 27 wherein data output from the northernmost one of said n processing elements is input to said south boundary address location in said memory.

33. A one-dimensional columnar vector image processor as set forth in claim 31 wherein data output from the northernmost one of said n processing elements is input to said south boundary address location in said memory.

34. A one-dimensional column vector image processor as set forth in claim 27 wherein n is on the order of up to about "64" and wherein all of said n processing elements, said boundary latches, and said coupling means are formed on a single integrated circuit.

35. A processing element for use in a vector image processing system of the type employed in processing discrete digitally encoded PIXEL data bits in a video image comprising a multiplicity of overlapping two-dimensional AB neighborhood arrays in a two-dimensional XY PIXEL image array oriented in "X" rows and "Y" columns and containing PIXELS in internally pipelined column-by-columns order upon receipt of shift and compute command signals from a suitable command source, said processing element comprising, in combination:

(a) a support;

(b) means defining a plurality of n serially cascaded interconnected latches mounted on said support where "n" is equal to the number of PIXEL data bits and boundary data bits located in a horizontal row in each of said two-dimensional AB neighborhood arrays;

(c) input terminal means mounted on said support and coupled to the upstream one of said plurality of n serially cascaded interconnected latches for sequentially inputting successive discrete digitally encoded PIXEL data bits in a given "X" row to said n serially cascaded latches;

(d) a neighborhood functional unit mounted on said support for performing preprogrammed NEIGHBORHOOD TRANSFORM processing operations, said neighborhood functional unit having 3n input terminals and an output terminal;

(e) means for coupling each of said n serially cascaded latches to respective ones of a first group of n of said 3n input terminals on said neighborhood functional unit;

(f) means defining n first input terminals on said support for inputting n discrete bits of digitally encoded data from n north neighbors corresponding in column "Y" position to the digitally encoded data bits in each of said n serially cascaded latches, said n first input terminal defining means being coupled to respective ones of a second group of n of said 3n input terminals on said neighborhood functional unit;

(g) means defining n second input terminals on said support for inputting n discrete bits of digitally encoded data from n south neighbors corresponding in column "Y" position to the digitally encoded data bits in said n serially cascaded latches, said n second input terminal defining means being coupled to respective ones of a third group of n of said 3n input terminals on said neighborhood functional unit;

(h) means defining n first output terminals on said support and respectively coupled to said n serially cascaded latches for outputting the digitally encoded PIXEL data bits stored in said n latches to a neighboring north processing element;

(i) means defining n second output terminals on said support and respectively coupled to said n serially cascaded latches for outputting the digitally encoded PIXEL data bits stored in said n latches to a neighboring south processing element;

(j) means defining a command input terminal formed on said support and coupled to each of said n latches and to said neighborhood functional unit for shifting data stored therein by one column position upon receipt of a shift command signal and for initiating a NEIGHBORHOOD TRANSFORM processing operation with respect to data on the input terminals of said neighborhood functional unit upon receipt of a compute command signal; and, (k) an output terminal on said support coupled to said output terminal on said neighborhood functional unit for outputting digitally encoded data from said neighborhood functional unit representative of the computational result of said NEIGHBORHOOD TRANSFORM processing operation;

whereby as PIXEL data bits are shifted into and through said n serially cascaded latches on said processing element in successive PIXEL-by-PIXEL order, a NEIGHBORHOOD TRANSFORM processing operation is conducted on each and every PIXEL stored in a given one of said n serially cascaded latches with each said PIXEL data bit being processed based upon its relation to all neighboring PIXEL data bits and boundary data bits in said AB neighborhood.

36. A processing element for use in a vector image processing system of the type employed in processing discrete digitally encoded PIXEL data bits in a video image comprising an multiplicity of overlapping two-dimensional AB neighborhood arrays in a two-dimensional XY PIXEL image array oriented in "X" rows and "Y" columns and containing PIXELS in internally pipelined column-by-column order upon receipt of shift and compute command signals from a suitable command source, said processing element comprising, in combination:

(a) a support;

(b) means defining a plurality of n serially cascaded interconnected latches mounted on said support where "n" is equal to the number of PIXEL data bits and boundary data bits located in a horizontal row in each of said two-dimensional AB neighborhood arrays;

(c) input terminal means mounted on said support and coupled to the upstream one of said plurality of n serially cascaded interconnected latches for sequentially inputting successive discrete digitally encoded PIXEL data bits in a given "X" row to said n serially cascaded latches;

(d) a neighborhood functional unit mounted on said support for performing preprogrammed NEIGHBORHOOD TRANSFORM processing operations, said neighborhood functional unit having 3n input terminals and an output terminal;

(e) means for coupling each of said n serially cascaded latches to respective ones of a first group of n of said 3n input terminals on said neighborhood functional unit;

(f) means defining n first input terminals on said support for inputting n discrete bits of digitally encoded data from n north neighbors corresponding in column "Y" position to the digitally encoded data bits in each of said n serially cascaded latches, said n first input terminal defining means being coupled to respective ones of a second group of n of said 3n input terminals on said neighborhood functional unit;

(g) means defining n second input terminals on said support for inputting n discrete bits of digitally encoded data from n south neighbors corresponding in column "Y" position to the digitally encoded data bits in said n serially cascaded latches, said n second input terminal defining means being coupled to respective ones of a third group of n of said 3n input terminals on said neighborhood functional unit;

(h) means defining n first output terminals on said support and respectively coupled to said n serially cascaded latches for outputting the digitally encoded PIXEL data bits stored in said n latches to a neighboring north processing element;

(i) means defining n second output terminals on said support and respectively coupled to said n serially cascaded latches for outputting the digitally encoded PIXEL data bits stored in said n latches to a neighboring south processing element;

(j) means defining one of an arithmetic processing unit, a logic unit or an arithmetic logic unit on said support for performing a selected one of a preprogrammed ARITHMETIC or LOGIC TRANSFORM, said one unit having a pair of input terminals and an output terminal;

(k) means for coupling two adjacent ones of said n serially cascaded latches, including that latch containing PIXEL data bits for the particular PIXEL being analyzed in each of said n processing elements, to respective ones of said pair of input terminals on said one unit;

(l) means defining a command input terminal formed on said support and coupled to each of said n latches and to said neighborhood functional unit and to said one of said arithmetic processing unit, logic unit or arithmetic logic unit for shifting data stored therein by one column position upon receipt of a shift command signal and for initiating one only of a NEIGHBORHOOD, ARITHMETIC or LOGIC TRANSFORM processing operation with respect to data on the input terminals of one only of said neighborhood functional unit or said one of said arithmetic processing unit, said logic unit or said arithmetic logic unit upon receipt of a compute command signal; and, (m) an output terminal on said support coupled to said output terminal on said neighborhood functional unit and to said output terminal on said one of said arithmetic processing unit, said logic unit or said arithmetic logic unit for outputting digitally encoded data from one only of said units representative of the computational result of said NEIGHBORHOOD, ARITHMETIC or LOGIC TRANSFORM processing operation; whereby as PIXEL data bits are shifted into and through said n serially cascaded latches on each of said n processing elements in successive PIXEL-by-PIXEL order, a NEIGHBORHOOD, ARITHMETIC or LOGIC TRANSFORM processing operation is conducted on each and every PIXEL stored in a given one of said n serially cascaded latches and wherein each NEIGHBORHOOD TRANSFORM conducted with respect to each said PIXEL data bit being processed is based upon that PIXEL data bit's relation to all neighboring PIXEL data bits and boundary data bits in said AB neighborhood.

37. A processing element as set forth in claims 35 or 36 wherein each said two-dimensional AB array is a 3×3 array and "n" is "3".

38. A processing element as set forth in claims 35 or 36 wherein each said two-dimensional AB array is a Golay Surround, said n serially cascaded interconnected latches are three in number, said n first and second input terminals are each two in number and are coupled to respective ones of four input terminals on said neighborhood functional unit, and said n first and second output terminals are each two in number.

39. A vector image processor for use in processing digitally encoded PIXEL data bits contained within a multiplicity of two-dimensional 3×3 neighborhood arrays in parallel row, internally pipelined, column-by-column order and for use with an image processing system having: (i) a sensor for outputting a two-dimensional XY video image having PIXELS oriented in "X" rows "A", "B", "C" ... "$X_n$" and "Y" columns "0", "1", "2" ... "$Y_n$"; (ii) a memory for receiving data from said sensor and containing XY address locations for storage of said PIXEL data bits and boundary address locations for storage of data bits representative of the north, south, east and west boundaries of said two-dimensional XY video image; (iii) a central processing unit coupled to said sensor and said memory; and (iv), a sequencer controlled by said central processing unit and coupled to said memory and said vector image processor for inputting data shift command signals thereto and for inputting compute command signals to said vector image processor for initiating a computational processing operation; said vector image processor comprising, in combination:

(a) a processing element having:
 (i) three (3) serially cascaded interconnected latches P−, P and P+;
 (ii) a neighborhood functional unit for performing programmed NEIGHBORHOOD TRANSFORM processing operations and having nine (9) input terminals P−, P, P+, N−, N, N+, S−, S and S+ and an output terminal; and,
 (iii) means for transmitting the data contained in respective ones of said latches P−, P and P+ at any given instant of time to respective ones of said input terminals P−, P and P+ on said neighborhood functional unit;

(b) a series of three (3) serially cascaded interconnected latches N−, N or N+;

(c) a series of three (3) serially cascaded interconnected latches S−, S and S+;

(d) means for transmitting data contained in respective ones of said latches N−, N, N+, S−, S and S+ at any given instant of time to respective ones of said input terminals N−, N, N+, S−, S and S+ on said neighborhood functional unit;

(e) means for coupling said latch P− to the memory for receiving data stored in said XY address locations for a given "X" row in column-by-column pipelined order upon generation of shift command signals by the sequencer;

(f) means for coupling said output terminal on said neighborhood functional unit to the memory for inputting data to the appropriate XY address locations therein for data output from a given processing operation upon generation of shift command signals by the sequencer;

(g) means for coupling said latches N− and P− to the memory for receiving north and south boundary data, respectively, stored in north and south boundary address locations for each of said "X" rows in column-by-column pipelined order upon generation of shift command signals by the sequencer;

(h) means for transmitting data shift command signals generated by the sequencer and coupled to the memory to all of said latches and to said neighborhood functional unit for causing data contained therein to be shifted one column position for each data shift command signal; and, (i) means for transmitting a compute command signal generated by the sequencer to said neighborhood functional unit for initiating a NEIGHBORHOOD TRANSFORM processing operation;

whereby said "X" rows of data in said XY array are processed in sequential column-by-column and row-by-row order.

40. A vector image processor for use in processing digitally encoded PIXEL data bits contained within a multiplicity of two-dimensional 3×3 neighborhood arrays in parallel row, internally pipelined, column-by-column order and for use with an image processing system having: (i) a sensor for outputting a two-dimensional XY video image having PIXELS oriented in "X" rows "A", "B", "C" ... "$X_n$" and "Y" columns "0", "1", "2" ... "$Y_n$"; (ii) a memory for receiving data from said sensor and containing XY address locations for storage of said PIXEL data bits and boundary address locations for storage of data bits representative of the north, south, east and west boundaries of said two-dimensional XY video image; (iii) a central processing unit coupled to said sensor and said memory; and (iv), a sequencer controlled by said central processing unit and coupled to said memory and said vector image processor for inputting data shift command signals thereto and for inputting compute command signals to said vector image processor for initiating a computational processing operation; said vector image processor comprising, in combination:

(a) a processing element having:
  (i) three (3) serially cascaded interconnected latches P−, P and P+;
  (ii) a neighborhood functional unit for performing programmed NEIGHBORHOOD TRANSFORM processing operations and having nine (9) input terminals P−, P, P+, N−, N, N+, S−, S and S+ and an output terminal;
  (iii) one of an arithmetic processing unit, a logic unit or an arithmetic logic unit for performing one of programmed ARITHMETIC or LOGIC TRANSFORM processing operations and having a pair of input terminals P− and P and an output terminal; and,
  (iv) means for transmitting the data contained in respective ones of said latches P−, P and P+ at any given instant of time to respective ones of said input terminals P−, P and P+ on said neighborhood functional unit and to respective ones of said input terminals P− and P on said one of said arithmeic processing unit, said logic unit or said arithmetic logic unit;

(b) a series of three (3) serially cascaded interconnected latches N−, N and N+;

(c) a series of three (3) serially cascaded interconnected latches S−, S and S+;

(d) means for transmitting data contained in respective ones of said latches N−, N, N+, S−, S and S+ at any given instant of time to respective ones of said input terminals N−, N, N+, S−, S and S+ on said neighborhood functional unit;

(e) means for coupling said latch P− to the memory for receiving data stored in said XY address locations for a given "X" row in column-by-column pipelined order upon generation of shift command signals by the sequencer;

(f) means for coupling said output terminals on said neighborhood functional unit and said one of said arithmetic processing unit, logic unit or arithmetic logic unit to the memory for inputting data to the appropriate XY address locations therein for data output from a given processing operation upon generation of shift command signals by the sequencer;

(g) means for coupling said latches N− and P− to the memory for receiving north and south boundary data, respectively, stored in north and south boundary address locations for each of said "X" rows in column-by-column pipelined order upon generation of shift command signals by the sequencer;

(h) means for transmitting data shift command signals generated by the sequencer and coupled to the memory to all of said latches and to both said neighborhood functional unit and said one of said arithmetic processing unit, logic unit or arithmetic logic unit for causing data contained therein to be shifted one column position for each data shift command signal; and, (i) means for transmitting a compute command signal generated by the sequencer to one of said neighborhood functional unit or said one of said arithmetic processing unit, said logic unit or said arithmetic logic unit for initiating one only of a NEIGHBORHOOD, ARITHMETIC or LOGIC TRANSFORM processing operation; whereby said "X" rows of data in said XY array are processed in sequential column-by-column and row-by-row order.

41. A vector image processor as set forth in claims 39 or 40 wherein said latches N−, N, N+, S−, S and S+, all of said coupling means and said transmitting means are mounted on said processing element.

42. The method of processing a two-dimensional XY PIXEL image array containing discrete bits of digitally encoded PIXEL data oriented in "X" rows and "Y" columns, and including a multiplicity of overlapping AB neighborhoods, where at least one of "A" and "B" has any desired whole integer value greater than "1", and wherein each AB neighborhood includes a PIXEL to be processed and data bits representative of neighbor PIXELS, said method comprising the steps of:

(a) shifting n rows of digitally encoded PIXEL data, where "n" is any whole integer, in column-by-column sequential internally pipelined order through a one-dimensional columnar array of n processing element(s) each including:
  (i) latch means equal in number to the value of "A" in the AB neighborhood for storing a plurality of discrete bits of digitally encoded data intermediate successive data shifts, and wherein the latch means comprises serially cascaded interconnected latches in those instances where "A" is greater than "1"; and, (ii) a neighborhood functional processing unit for performing a NEIGHBORHOOD TRANSFORM processing operation;

(b) conveying the digitally encoded data stored in the latch means in each of the n processing element(s) and corresponding to each PIXEL to be processed to the neighborhood functional processing unit on that processing element;

(c) conveying digitally encoded data representative of all neighbor PIXELS contained within each AB neighborhood to the neighborhood functional processing unit in each of the n processing element(s);

(d) performing a computational NEIGHBORHOOD TRANSFORM processing operation on the digitally encoded PIXEL data for each PIXEL being analyzed at a given instant of time in the neighborhood functional processing unit in each of the n processing element(s); and, (e) outputting digitally encoded data representative of the results of each computational NEIGHBORHOOD TRANSFORM processing operation on each PIXEL being processed, with all PIXELS in a given "Y" column of PIXELS and in the n rows being processed in parallel in those instances where n is greater than "1", and with all PIXELS in each of the n rows being processed in internally pipelined sequential order.

43. The method of processing a two-dimensional XY PIXEL image array containing discrete bits of digitally encoded PIXEL data oriented in "X" rows and "Y" columns, and including a multiplicity of overlapping AB neighborhood, where at least one of "A" and "B" has any desired whole integer value greater than "1", and wherein each AB neighborhood includes a PIXEL to be processed and data bits representative of neighbor PIXELS; said method comprising the steps of:

(a) shifting n rows of digitally encoded PIXEL data, where "n" is any whole integer, in column-by-column sequential internally pipelined order through a one-dimensional columnar array of n processing element(s) each including:

(i) latch means equal in number to the value of "A" in the AB neighborhood for storing a plurality of discrete bits of digitally encoded data intermediate successive data shifts, and wherein the latch means comprises serially cascaded interconnected latches in those instances where "A" is greater than "1";

(ii) a neighborhood functional processing unit for performing a NEIGHBORHOOD TRANSFORM processing operation; and, (iii) one of an arithmetic processing unit, a logic unit or an arithmetic logic unit for performing one of an ARITHMETIC TRANSFORM processing operation or a LOGIC TRANSFROM processing operation;

(b) conveying the digitally encoded data stored in the latch means in each of the n processing element(s) and corresponding to each PIXEL to be processed to the neighborhood functional processing unit on that processing element;

(c) conveying digitally encoded data representative of all neighbor PIXELS contained within each AB neighborhood to the neighborhood functional processing unit in each of the n processing element(s);

(d) conveying digitally encoded data stored in the latch means in each of the n processing elements and corresponding to each PIXEL to be processed, and digitally encoded data stored in an adjacent one of the latch means to the one of the arithmetic processing unit, logic unit or arithmetic logic unit on that processing element;

(e) performing one of a computational NEIGHBORHOOD TRANSFROM processing operation, a computational ARITHMETIC TRANSFORM processing operation, or a computational LOGIC TRANSFORM processing operation on the digitally encoded PIXEL data for each PIXEL being analyzed at a given instant of time in either the neighborhood functional processing unit or the one of the arithmetic processing unit, logic unit or arithmetic logic unit in each of the n processing element(s); and, (f) outputting digitally encoded data representative of the results of each computational TRANSFORM processing operation on each PIXEL being processed, with all PIXELS in a given "Y" column of PIXELS and in the n rows being processed in parallel in those instances where n is greater than "1", and with all PIXELS in each of the n rows being processed in internally pipelined sequential order.

44. The method as set forth in claims 42 or 43 wherein the PIXEL data bits are processed using bit-serial arithmetic.

45. The method as set forth in claims 42 or 43 wherein n is greater than "1", and the n processing elements are bit-serial synchronous processing elements.

46. The method as set forth in claims 42 or 43 wherein each AB neighborhood array is a two-dimensional $3 \times 3$ array.

47. The method as set forth in claims 42 or 43 wherein each AB neighborhood array is a Golay Surround.

48. The method as set forth in claims 42 or 43 wherein n is greater than "2", and wherein the digitally encoded data in the northernmost one of the n processing elements provides north neighbor inputs to the neighborhood functional unit on the adjacent southern processing element, the digitally encoded data in the southernmost one of the n processing elements provides south neighbor input to the neighborhood functional unit on the adjacent northern processing element, and wherein the digitally encoded data in all intermediate ones of the n processing elements provides north neighbor input to the neighborhood functional unit on the adjacent south processing element and south neighbor input to the neighborhood functional unit on the adjacent north processing element.

49. The method as set forth in claim 48 wherein north and south border memories provide north and south neighbor inputs respectively to the neighborhood functional units on respective ones of the northernmost and southernmost ones of the n processing elements.

50. The method as set forth in claims 42 or 43 wherein n is greater than "1" and is a whole integer fraction of "X", and wherein the two-dimensional XY PIXEL image array is processed by processing successive strips each including n rows of digitally encoded PIXEL data with such rows being processed in parallel internally pipelined order and with such strips being processed in series.

51. An image processing system for processing a two-dimensional XY array of digitally encoded PIXEL data bits disposed in "X" rows "A", "B", "C" ... "$X_n$," and "Y" columns "0", "1", "2" ... "$Y_n$," wherein said array contains discrete PIXEL data bits, and for performing NEIGHBORHOOD TRANSFORM processing operations on each PIXEL data bit in said two-dimensional XY array based on the relation of the value of each PIXEL data bit to the value of its immediately adjacent neighbors in an AB neighborhood array containing "A" columns and "B" rows where at least one of "A" and "B" has an integer value greater than "1"; said image processing system comprising, in combination:

(a) a sensor for detecting image data and outputting such data in the form of a two-dimensional XY array of digitally encoded PIXEL data bits;

(b) a memory having XY address locations for storing said two-dimensional XY array of digitally encoded PIXEL data bits;

(c) a vector image processor comprising n processing element(s) wherein "n" can be any whole integer value and wherein said n processing elements are disposed in parallel in those instances where "n" is greater than "1", said n processing element(s) each including:

(i) m latch means where the value of "m" is equal to the value of "A" in said AB neighborhood array and where said m latch means comprise m serially cascaded interconnected latches in those instances where "A" and "m" are greater than "1"; and, (ii) a neighborhood functional unit having a first group m, a second group m', and a third group m" of input terminals and an output terminal, said neighborhood functional unit being programmed to perform selected NEIGHBORHOOD TRANSFORM processing operations on digitally encoded data presented on its input terminals upon receipt of a compute command signal;

(d) means for coupling said m latch means on each of said n processing elements to:

(i) said first group m of input terminals on said neighborhood functional unit on that particular one of said n processing elements;

(ii) said second group m' of input terminals on said neighborhood functional unit on any immediately adjacent northern one of said n processing elements; and, (iii) said third group m" of input terminals on said neighborhood functional unit on any immediately adjacent southern one of said n processing elements; and, (e) means for generating a series of programmed shift and compute command signals and for transmitting such signals to: (i) said memory XY address locations; (ii) said m latch means on each of said n processing elements; and, (iii), said neighborhood functional units on each of said n processing elements, for inputting shift command signals thereto, and for inputting compute command signals to each of said neighborhood functional units on each of said n processing elements;

whereby each shift command signal input to: (i) n of said memory XY address locations; (ii) said m latch means on said n processing elements; and (iii), said neighborhood functional units on each of said n processing elements, serves to shift: (a) n of said "X" rows of digitally encoded PIXEL data bits stored in n adjacent ones of said memory XY address locations where "n" is equal to the number "n" of said processing elements; and (b), data bits stored in all of said latch means and presented on said first, second and third groups m, m' and m" of input terminals of each of said neighborhood functional units on each of said n processing elements by one column position so as to shift n of said "X" rows of digitally encoded PIXEL data bits successively through respective ones of said m latch means on each of said n processing elements in column-by-column internally pipelined order whereby m digitally encoded PIXEL data bits are presented on said first, second and third groups m, m' and m" of input terminals of said neighborhood functional units on each of said n processing elements; and, each compute command signal input to said neighborhood functional unit on each of said n processing elements serves to initiate a NEIGHBORHOOD TRANSFORM processing operation with the results of each of said n operations being output from said n processing elements on the next succeeding shift command signal and being input to the associated ones of said memory XY address locations.

52. An image processing system for processing a two-dimensional XY array of digitally encoded PIXEL data bits disposed in "X" rows "A", "B", "C" ... "$X_n$," and "Y" columns "0", "1", "2" ... "$Y_n$," wherein said array contains discrete PIXEL data bits, and for performing a selected one of an ARITHMETIC TRANSFROM or LOGIC TRANSFORM processing operation with respect to two adjacent PIXELS in a given row, or a NEIGHBORHOOD TRANSFORM processing operation on each PIXEL data bit in said two-dimensional XY array based on the relation of the value of each PIXEL data bit to the value of its immediately adjacent neighbors in an AB neighborhood array containing "A" columns and "B" rows where at least one of "A" and "B" has an integer value greater than "1"; said image processing system comprising, in combination:

(a) a sensor for detecting image data and outputting such data in the form of an two-dimensional XY array of digitally encoded PIXEL data bits;

(b) a memory having XY address locations for storing said two-dimensional XY array of digitally encoded PIXEL data bits;

(c) a vector image processor comprising n processing element(s) wherein "n" can be any whole integer value and wherein said n processing elements are disposed in parallel in those instances where "n" is greater than "1", said n processing element(s) each including:

(i) m latch means where the value of "m" is equal to the value of "A" in said AB neighborhood array and where said m latch means comprise m serially cascaded interconnected latches in those instances where "A" and "m" are greater than "1";

(ii) a neighborhood functional unit having a first group m, a second group m', and a third group m " of input terminals and an output terminal, said neighborhood functional unit being programmmed to perform selected NEIGHBORHOOD TRANSFORM processing operations on digitally encoded data presented on its input terminals upon receipt of a compute command signal; and, (iii) one of an arithmetic processing unit, a logic unit or an arithmetic logic unit having a pair of input terminals and an output terminal and programmed to perform a selected ARITHMETIC and/or LOGIC TRANSFORM processing operation on digitally encoded data presented on its input terminals upon receipt of a compute command signal;

(d) means for coupling said m latch means on each of said n processing elements to:
 (i) said first group m of input terminals on said neighborhood functional unit on that particular one of said n processing elements;
 (ii) said second group m' of input terminals on said neighborhood functional unit on any imnmediately adjacent northern one of said n processing elements; and,
 (iii) said third group m" of input terminals on said neighborhood functional unit on any immediately adjacent southern one of said n processing elements;

(e) means for coupling two of said m latch means on each of said n processing elements to respective ones of said pair of input terminals on the one of said arithmetic processing unit, logic unit or arithmetic logic unit on that particular one of said n processing elements; and, (f) means for generating a series of programmmed shift and compute command signals and for transmitting such signals to: (i) said memory XY address locations; (ii) said m latch means on each of said n processing elements; (iii) said neighborhood functional units on each of said n processing elements; and (iv), said one of said arithmetic processing unit, logic unit or arithmetic logic unit on each of said n processing elements, for inputting shift command signals thereto, and for inputting compute command signals to one only of said neighborhood functional unit or said one of said arithmetic processing unit, logic unit or arithmetic logic unit on each of said n processing elements; whereby each shift command signal input to: (i) n of said memory XY address locations; (ii) said m latch means on said n processing elements; (iii) said neighborhood functional units on each of said n processing elements; and (iv), said one of said arithmetic processing unit, logic unit or arithmetic logic unit on each of said n processing elements, serves to shift: (a) n of said "X" rows of digitally encoded PIXEL data bits stored in n adjacent ones of said memory XY address locations where "n" is equal to the number "n" of said processing elements; and (b), data bits stored in all of said latches and presented on said first, second and third groups m, m' and m" of input terminals of each of said neighborhood functional units and on said pair of input terminals on said one of said arithmetic processing unit, logic unit or arithmetic logic unit on each of said n processing elements by one column position so as to shift n of said "X" rows of digitally encoded PIXEL data bits successively through respective ones of said m latch means on each of said n processing elements in column-by-column internally pipelined order whereby m digitally encoded PIXEL data bits are presented on said first, second and third groups m, m' and m" of input terminals on said neighborhood functional units on each of said n processing elements, and PIXEL data bits in two of said m latch means on each of said n processing elements are successively and simultaneously presented on said pair of input terminals on said one of said arithmetic processing unit, logic unit or arithmetic logic unit on that particular one of each of said n processing elements; and each compute command signal is input to one only of said neighborhood functional unit or said one of said arithmetic processing unit, said logic unit or said arithmetic logic unit on each of said n processing elements and serves to initiate a selected one of a NEIGHBORHOOD, ARITHMETIC or LOGIC TRANSFORM processing operation with the results of each of said n operations being output from said n processing elements on the next succeeding shift command signal and being input to the associated ones of said memory XY address locations.

53. An image processing system as set forth in claims 51 or 52 wherein said n processing elements are bit-serial processing elements.

54. An image processing system as set forth in claim 51 wherein n is greater than "1".

55. An image processing system as set forth in claim 52 wherein n is greater than "1".

56. An image processing system as set forth in claims 54 or 55 wherein said n processing elements are bit-serial synchronous processing elements.

57. An image processing system as set forth in claims 51, 52 54 or 55 wherein each said AB neighborhood array is a two-dimensional 3×3 array and m is equal to "3".

58. An image processing system as set forth in claims 51, 52, 54 or 55 wherein each said AB neighborhood array is a Golay Surround.

59. An image processing system as set forth in claims 51 or 52 wherein n is greater than "2" and wherein the digitally encoded data in said m latch means of the northernmost one of said n processing elements provides north neighbor inputs to said third group m" of input terminals on said neighborhood functional unit on the adjacent southern processing element, the digitally encoded data in said m latch means of the southernmost one of said n processing elements provides south neighbor inputs to said second group m' of input terminals on said neighborhood functional unit on the adjacent northern processing element, and wherein the digitally encoded data in said m latch means of all intermediate ones of said n processing elements provides north neighbor inputs to said third group m" of input terminals on said neighborhood functional unit on the adjacent southern processing element and south neighbor inputs to said second group m' of input terminals on said neighborhood functional unit on the adjacent north processing element.

60. An image processing system as set forth in claim 59 further characterized in that said memory includes boundary address locations for storing digitally encoded data bits representative of the northern, southern, eastern and western boundaries of said two-dimensional XY PIXEL image array and wherein data output from the northernmost and southernmost ones of said n processing elements is also input to respective ones of said south and north boundary address locations in said memory.

61. An image processing system as set forth in claims 51 or 52 wherein n is greater than "1" and is a whole integer fraction of "X", and further including means for shifting adjacent strips of said XY PIXEL image array each including n rows of PIXEL data relatively through said vector image processor in parallel row internally pipelined column-by-column order with said strips being processed in series.

62. An image processing system as set forth in claims 51 or 52 wherein n is on the order of up to about "64" and wherein all of said n processing elements, said m latch means, and said coupling means are formed on a single integrated circuit.

63. In an image processing system of the type employing: (i) a sensor for detecting image data and outputting such data in the form of a two-dimensional XY array of digitally encoded PIXEL data bits disposed in "X" rows "A", "B", "C" . . . "$X_n$" and "Y" columns "0", "1", "2" . . . "$Y_n$" wherein said array contains discrete PIXEL data bits and wherein said two-dimensional XY array includes a plurality of overlapping AB neighborhood arrays for each and every PIXEL location in the XY array where at least one of "A" and "B" has an interger value greater than "2"; (ii) a memory having XY address locations for storing said two-dimensional XY array of digitally encoded PIXEL data bits; (iii) a special purpose image processor; (iv) a host central processing unit coupled to the memory and to the special purpose image processor; and (v) a sequencer controlled by the central processing unit for inputting shift command signals to the memory and both shift command signals and compute command signals to the special purpose image processor; the improvement in said special purpose image processor comprising, in combination:

(a) means for shifting n of said "X" rows of digitally encoded PIXEL data bits through said special purpose image processor in parallel and in column-by-column stepwise internally pipelined order where "n" is any whole interger greater than "2";

(b) means for storing n AB neighborhood arrays each including a particular PIXEL data bit in one of the n "X" rows and all neighboring PIXEL data bits in the preselected AB array during periods intermediate successive data shift signals;

(c) means for performing a NEIGHBORHOOD TRANSFORM processing operation on all data bits in each of the n stored AB arrays; whereby said two-dimensional XY array of PIXEL data bits is processed in parallel row and internally pipelined column-by-column order; and (d) n processing elements and wherein said means for storing n AB neighborhood arrays comprises n sets of m latch means where "m" is less than "n" and with one such set formed on each of said n processing elements whereby the centermost one of said m latch means on any given one of said n processing elements contains the PIXEL data bits to be analyzed by that processing element during a NEIGHBORHOOD TRANSFORM and wherein that processing element comprises the centermost one of m of said n processing elements, and wherein all latch means in said n processing elements surrounding the centermost one of said m latch means on said given one of said n processing elements provide neighbor inputs to that one of said n processing elements containing said centermost one of said m latch means.

64. In an image processing system of the type employing: (i) a sensor for detecting image data and ouputting such data in the form of a two-dimensional XY array of digitally encoded PIXEL data bits disposed in "X" rows "A", "B", "C" . . . "$X_n$" and "Y" columns "0", "1", "2" . . . "$Y_n$" wherein said array contains discrete PIXEL data bits and wherein said two-dimensional XY array includes a plurality of overlapping AB neighborhood arrays for each and every PIXEL location in the XY array where at least one of "A" and "B" has an integer value greater than "2"; (ii) a memory having XY address locations for storing said two-dimensional XY array of digitally encoded PIXEL data bits: (iii) a special purpose image processor; (iv) a host central processing unit coupled to the memory and to the special purpose image processor; and (v), a sequencer controlled by the central processing unit for inputting shift command signals to the memory and both shift command signals and compute command signals to the special purpose image processor; the improvement in said special purpose image processor comprising, in combination:

(a) means for shifting n of said "X" rows of digitally encoded PIXEL data bits through said special purpose image processor in parallel and in column-by-column stepwise internally pipelined order where "n" is any whole integer greater than "2";

(b) means for storing n AB neighborhood arrays each including a particular PIXEL data bit in one of the n "X" rows and all neighboring PIXEL data bits in the preselected AB array during periods intermediate successive data shift signals;

(c) means for performing a selected one of:

(i) a NEIGHBORHOOD TRANSFORM processing operation on all data bits in each of the n stored AB arrays: or, (ii) one only of an ARITHMETIC TRANSFORM and a LOGIC TRANSFORM processing operation with respect to each PIXEL data bit being analyzed in each of said n "X" rows and an adjacent PIXEL data bit in one of said n "X" rows;

whereby said two two-dimensional XY array of PIXEL data bits is processed in parallel row and internally pipelined column-by-column order; and (d) n processing elements and wherein said means for storing n AB neighborhood arrays comprises n sets of m latch means where "m" is less than "n" and with one such set formed on each of said n processing elements whereby the centermost one of said m latch means on any given one of said n processing elements contains the PIXEL data bits to be analyzed by that processing element during a NEIGHBORHOOD TRANSFORM and wherein that processing element comprises the centermost one of m of said n processing elements, and wherein all latch means in said n processing elements surrounding the centermost one of said m latch means on said given one of said n processing elements provide neighbor inputs to that one of said n processing elements containing said centermost one of said m latch means.

65. The improvement in a special purpose image processor as set forth in claim 63 or 64 wherein said AB neighborhood array is a two-dimensional 3×3 array, m is "3", and each of said n processing elements provides north neighbor inputs to its neighbor processing element on the south and south neighbor inputs to its neighbor processing element on the north.

66. The improvement in a special purpose image processor as set forth in claim 65 characterized in that said memory includes boundary address locations for storing digitally encoded data bits representative of the northern, southern, eastern and western boundaries of said XY array; and, further including north and south sets of three serially cascaded latches for respectively storing north and south boundary data bits output from said memory boundary address locations in column-by-column pipelined order and where said north set provides north neighbor inputs to the northernmost one of said n processing elements and said south set provides south neighbor inputs to the southernmost one of said n processing elements.

67. The improvement in a special purpose image processor as set forth in claim 66 wherein n is on the order of up to about "64" and wherein said means for storing n AB neighborhood arrays, said means for performing a processing operation, and said north and south sets of boundary data latches are formed on a single integrated circuit.

68. A one-dimensional columnar vector image processor for use in processing digitally encoded PIXEL data bits contained within a multiplicity of overlapping AB neighborhood arrays where at least one of "A" and "B" has any desired whole integer value greater than "1", wherein said processor processes such digitally encoded data bits in parallel row, internally pipelined, column-by-column order and is adapted for use with an image processing system having: (i) a sensor for outputting an XY video image having a plurality of discrete PIXELS oriented in "X" rows "A", "B", "C" ... "$X_n$" and "Y" columns "0", "1", "2" ... "$Y_n$"; (ii) a memory for receiving data from said sensor and containing XY address locations for storage of said PIXEL data bits; (iii) a central processing unit coupled to said sensor and said memory; and (iv), a sequencer controlled by said central processing unit and coupled to said memory and said vector image processor for inputting data shift command signals thereto and for inputting compute command signals to said vector image processor for initiating a computational processing operation; said vector image processor comprising, in combination:
  (a) n processing elements disposed in parallel where "n" is any whole integer greater than "1", each of said n processing elements including:
    (i) m latch means where the value of "m" is equal to the value of "A" in said AB neighborhood arrays and where said m latch means comprises m serially cascaded interconnected latches where "A" and "m" are greater than "1";
    (ii) a neighborhood functional unit having a first group m, a second group m', and a third group m" of input terminals and an output terminal, said neighborhood functional unit being programmed to perform selected NEIGHBORHOOD TRANSFORM processing operations on digitally encoded data presented on its input terminals upon receipt of a compute command signal; and,
    (iii) one of an arithmetic processing unit, a logic unit or an arithmetic logic unit having a pair of input terminals and an output terminal, said one of arithmetic processing unit, logic unit or arithmetic logic unit being programmed to perform one of an ARITHMETIC TRANSFORM or a LOGIC TRANSFORM processing operation on digitally encoded data presented on its input terminals upon receipt of a compute command signal;
  (b) means for coupling said m latch means on each of said n processing elements to:
    (i) said first group m of input terminals on said neighborhood functional unit on that particular one of said n processing elements;
    (ii) said second group m' of input terminals on said neighborhood functional unit on any immediately adjacent northern one of said n processing elements; and,
    (iii) said third group m" of input terminals on said neighborhood functional unit on any immediately adjacent southern one of said n processing elements; and,
  (c) means for coupling said one of said m latch means containing the particular PIXEL data bit to be processed and an adjacent one of said m latch means on each of said n processing elements to respective ones of said pair of input terminals of said one of said arithmetic processing unit, logic unit or arithmetic logic unit on each of said n processing elements;
  whereby each shift command signal generated by the sequencer and input to said vector image processor serves to shift all PIXEL data bits in each of said AB neighborhoods by one column position and where each compute command signal transmitted by the sequencer to said vector image processor serves to initiate a computational operation in either said neighborhood logic unit or in the one of said arithmetic processing unit, logic unit or arithmetic logic unit on each of said n processing elements for initiating a selected one of a NEIGHBORHOOD TRANSFORM, an ARITHMETIC TRANSFORM, or a LOGIC TRANSFORM.

69. A one-dimensional columnar vector image processor as set forth in claim 68 wherein said n processing elements are bit-serial synchronous processing elements.

70. A one-dimensional columnar vector image processor as set forth in claim 68 wherein each said AB neighborhood array is a two-dimensional 3×3 array and "m" is equal to "3".

71. A one-dimensional columnar vector image processor as set forth in claim 68 wherein each said AB neighborhood array is a Golay Surround.

72. A processing element for use in a vector image processing system of the type employed in processing discrete digitally encoded PIXEL data bits in a video image comprising a multiplicity of overlapping AB neighborhood arrays, where at least one of "A" and "B" has any desired whole integer value greater than "1", in a two-dimensional XY PIXEL image array oriented in "X" rows and "Y" columns and containing a plurality of discrete PIXELS in internally pipelined column-by-column order upon receipt of shift and compute command signals from a suitable command source, said processing element comprising, in combination:
  (a) a support;
  (b) m latch means mounted on said support where "m" is equal to the number of PIXEL data bits located in a horizontal row in each of said AB neighborhood arrays and where said m latch means comprise m serially cascaded interconnected latches in those instances where m is greater than "1";
  (c) input terminal means mounted on said support and coupled to the upstream one of said plurality of m latch means for sequentially inputting successive discrete digitally encoded PIXEL data bits in a given "X" row to said m latch means;
  (d) a neighborhood functional unit mounted on said support for performing preprogrammed NEIGHBORHOOD TRANSFORM processing operations, said neighborhood functional unit having 3n input terminals and an output terminal;

(e) means for coupling each of said m latch means to respective ones of a first group of n of said 3n input terminals on said neighborhood functional unit;

(f) means defining n first input terminals on said support for inputting n discrete bits of digitally encoded data from n north neighbors corresponding in column "Y" position to the digitally encoded data bits in each of said m latch means, said n first input terminal defining means being coupled to respective ones of a second group of n of said 3n input terminals on said neighborhood functional unit;

(g) means defining n second input terminals on said support for inputting n discrete bits of digitally encoded data from n south neighbors corresponding in column "Y" position to the digitally encoded data bits in said m latch means, said n second input terminal defining means being coupled to respective ones of a third group of n of said 3n input terminals on said neighborhood functional unit;

(h) means defining n first output terminals on said support and respectively coupled to said m latch means for outputting the digitally encoded PIXEL data bits stored in said m latch means to a neighboring north processing element;

(i) means defining n second output terminals on said support and respectively coupled to said m latch means for outputting the digitally encoded PIXEL data bits stored in said m latch means to a neighboring south processing element;

(j) means defining a command input terminal formed on said support and coupled to each of said m latch means and to said neighborhood functional unit for shifting data stored therein by one column position upon receipt of a shift command signal and for initiating a NEIGHBORHOOD TRANSFORM processing operation with respect to data on the input terminals of said neighborhood functional unit upon receipt of a compute command signal; and, (k) an output terminal on said support coupled to said output terminal on said neighborhood functional unit for outputting digitally encoded data from said neighborhood functional unit representative of the computational result of said NEIGHBORHOOD TRANSFORM processing operation;

whereby as PIXEL data bits are shifted into and through said m latch means on said processing element is successive PIXEL-by-PIXEL order, a NEIGHBORHOOD TRANSFORM processing operation is conducted on each and every PIXEL stored in a given one of said m latch means with each said PIXEL data bit being processed based upon its relation to all neighboring PIXEL data bits in said AB neighborhood.

73. A processing element for use in a vector image processing system of the type employed in processing discrete digitally encoded PIXEL data bits in a video image comprising a multiplicity of overlapping AB neighborhood arrays, where at least one of "A" and "B" has any desired whole integer value greater than "1", in a two-dimensional XY PIXEL image array oriented in "X" rows and "Y" columns and containing a plurality of discrete PIXELS in internally pipelined column-by-column order upon receipt of shift and compute command signals from a suitable command source, said processing element comprising, in combination:

(a) a support;

(b) m latch means mounted on said support where "m" is equal to the number of PIXEL data bits located in a horizontal row in each of said AB neighborhood arrays and where said m latch means comprise m serially cascaded interconnected latches in those instances where m is greater than "1";

(c) input terminal means mounted on said support and coupled to the upstream one of said plurality of m latch means for sequentially inputting successive discrete digitally encoded PIXEL data bits in a given "X" row to said m latch means;

(d) a neighborhood functional unit mounted on said support for performing preprogrammed NEIGHBORHOOD TRANSFORM processing operations, said neighborhood functional unit having 3n input terminals and an output terminal;

(e) means for coupling each of said m latch means to respective ones of a first group of n of said 3n input terminals on said neighborhood functional unit;

(f) means defining n first input terminals on said support for inputting n discrete bits of digitally encoded data from n north neighbors corresponding in column "Y" position to the digitally encoded data bits in each of said m latch means, said n first input terminal defining means being coupled to respective ones of a second group of n of said 3n input terminals on said neighborhood functional unit;

(g) means defining n second input terminals on said support for inputting n discrete bits of digitally encoded data from n south neighbors corresponding in column "Y" position to the digitally encoded data bits in said m latch means, said n second input terminal defining means being coupled to respective ones of a third group of n of said 3n input terminals on said neighborhood functional unit;

(h) means defining n first output terminals on said support and respectively coupled to said m latch means for outputting the digitally encoded PIXEL data bits stored in said m latch means to a neighboring north processing element;

(i) means defining n second output terminals on said support and respectively coupled to said m latch means for outputting the digitally encoded PIXEL data bits stored in said m latch means to a neighboring south processing element;

(j) means defining one of an arithmetic processing unit, a logic unit or an arithmetic logic unit on said support for performing a selected one of a preprogrammed ARITHMETIC or LOGIC TRANSFORM, said one unit having a pair of input terminals and an output terminal;

(k) means for coupling two adjacent ones of said m latch means, including that latch means containing PIXEL data bits for the particular PIXEL being analyzed in each of said n processing elements, to respective ones of said pair of input terminals on said one unit;

(l) means defining a command input terminal formed on said support and coupled to each of said m latch means and to said neighborhood functional unit and to said one of said arithmetic processing unit, logic unit or arithmetic logic unit for shifting data stored therein by one column position upon receipt of a shift command signal and for initiating one only of a NEIGHBORHOOD, ARITHMETIC or LOGIC TRANSFORM processing operation with respect to data on the input terminals of one only of said neighborhood functional unit or said one of said arithmetic processing unit, said logic unit or said arithmetic logic unit upon receipt of a compute command signal; and, (m) an output terminal on said support coupled to said output terminal on said neighborhood functional unit and to said output terminal on said one of said arithmetic processing unit, said logic unit or said arithmetic logic unit for outputting digitally encoded data from one only of said units representative of the computational result of said NEIGHBORHOOD, ARITHMETIC or LOGIC TRANSFORM processing operation;

whereby as PIXEL data bits are shifted into and through said m latch means on each of said n processing elements in successive PIXEL-by-PIXEL order, a NEIGHBORHOOD, ARITHMETIC or LOGIC TRANSFORM processing operation is conducted on each and every PIXEL stored in a given one of said m latch means and wherein each NEIGHBORHOOD TRANSFORM conducted with respect to each said PIXEL data bit being processed is based upon that PIXEL data bit's relation to all neighboring PIXEL data bits in said AB neighborhood.

74. A processing element as set forth in claims 72 or 73 wherein each said AB array is a two-dimensional 3×3 array and "n" is "3".

75. A processing element as set forth in claims 72 or 73 wherein each said AB array is a Golay Surround, said m latch means are three in number and are serially cascaded and interconnected, said n first and second input terminals are each two in number and are coupled to respective ones of four input terminals on said neighborhood functional unit, and said n first and second output terminals are each two in number.

76. A vector image processor for use in processing digitally encoded PIXEL data bits contained within a multiplicity of two-dimensional 3×3 neighborhood arrays in parallel row, internally pipelined, column-by-column order and for use with an image processing system having: (i) a sensor for outputting a two-dimensional XY video image having a plurality of discrete PIXELS oriented in "X" rows "A", "B", "C" ... "$X_n$" and "Y" columns "0", "1", "2" ... "$Y_n$"; (ii) a memory for receiving data from said sensor and containing XY address locations for storage of said PIXEL data bits; (iii) a central processing unit coupled to said sensor and said memory; and (iv), a sequencer controlled by said central processing unit and coupled to said memory and said vector image processor for inputting data shift command signals thereto and for inputting compute command signals to said vector image processor for initiating a computational processing operation; said vector image processor comprising, in combination:

(a) a processing element having:
 (i) three (3) serially cascaded interconnected latches P−, P and P+;
 (ii) a neighborhood functional unit for performing programmed NEIGHBORHOOD TRANSFORM processing operations and having nine (9) input terminals P−, P, P+, N−, N, N+, S−, S and S+ and an output terminal; and, (iii) means for transmitting the data contained in respective ones of said latches P−, P and P+ at any given instant of time to respective ones of said input terminals P−, P and P+ on said neighborhood functional unit;

(b) a series of three (3) serially cascaded interconnected latches N−, N and N+;

(c) a series of three (3) serially cascaded interconnected latches S−, S and S+;

(d) means for transmitting data contained in respective ones of said latches N−, N, N+, S−, S and S+ at any given instant of time to respective ones of said input terminals N−, N, N+, S−, S and S+ on said neighborhood functional unit;

(e) means for coupling said latch P− to the memory for receiving data stored in said XY address locations for a given "X" row in column-by-column pipelined order upon generation of shift command signals by the sequencer;

(f) means for coupling said output terminal on said neighborhood functional unit to the memory for inputting data to the appropriate XY address locations therein for data output from a given processing operation upon generation of shift command signals by the sequencer;

(g) means for transmitting data shift command signals generated by the sequencer and coupled to the memory to all of said latches and to said neighborhood functional unit for causing data contained therein to be shifted one column position for each data shift command signal; and, (h) means for transmitting a compute command signal generated by the sequencer to said neighborhood functional unit for initiating a NEIGHBORHOOD TRANSFORM processing operation;

whereby said "X" rows of data in said XY array are processed in sequential column-by-column and row-by-row order.

77. A vector image processor for use in processing digitally encoded PIXEL data bits contained within a multiplicity of two-dimensional 3×3 neighborhood arrays in parallel row, internally pipelined, column-by-column order and for use with an image processing system having: (i) a sensor for outputting a two-dimensional XY video image having a plurality of discrete PIXELS oriented in "X" rows "A", "B", "C" ... "$X_n$" and "Y" columns "0", "1", "2" ... "$Y_n$"; (ii) a memory for receiving data from said sensor and containing XY address locations for storage of said PIXEL data bits; (iii) a central processing unit coupled to said sensor and said memory; and (iv), a sequencer controlled by said central processing unit and coupled to said memory and said vector image processor for inputting data shift command signals thereto and for inputting compute command signals to said vector image processor for initiating a computational processing operation; said vector image processor comprising, in combination:

(a) a processing element having:
 (i) three (3) serially cascaded interconnected latches P−, P and P+;
 (ii) a neighborhood functional unit for performing programmed NEIGHBORHOOD TRANSFORM processing operations and having nine (9) input terminals P−, P, P+, N−, N, N+, S−, S and S+ and an output terminal;
 (iii) one of an arithmetic processing unit, a logic unit or an arithmetic logic unit for performing one of programmed ARITHMETIC or LOGIC TRANSFORM processing operations and having a pair of input terminals P− and P and an output terminal; and, (iv) means for transmitting the data contained in respective ones of said latches P−, P and P+ at any given instant of time to respective ones of said input terminals P−, P and P+ said neighborhood functional unit and to respective ones of said input terminals P− and P on said one of said arithmetic processing unit, said logic unit or said arithmetic logic unit;

(b) a series of three (3) serially cascaded interconnected latches N−, N and N+;

(c) a series of three (3) serially cascaded interconnected latches S−, S and S+;

(d) means for transmitting data contained in respective ones of said latches N−, N, N+, S−, S and S+ at any given instant of time to respective ones of said input terminals N−, N, N+, S−, S and S+ on said neighborhood functional unit;

(e) means for coupling said latch P− to the memory for receiving data stored in said XY address locations for a given "X" row in column-by-column pipelined order upon generation of shift command signals by the sequencer;

(f) means for coupling said output terminals on said neighborhood functional unit and said one of said arithmetic processing unit, logic unit or arithmetic logic unit to the memory for inputting data to the appropriate XY address locations therein for data output from a given processing operation upon generation of shift command signals by the sequencer;

(g) means for transmitting data shift command signals generated by the sequencer and coupled to the memory to all of said latches and to both said neighborhood functional unit and said one of said arithmetic processing unit, logic unit or arithmetic logic unit for causing data contained therein to be shifted one column position for each data shift command signal; and, (h) means for transmitting a compute command signal generated by the sequencer to one of said neighborhood functional unit or said one of said arithmetic processing unit, said logic unit or said arithmetic logic unit for initiating one only of a NEIGHBORHOOD, ARITHMETIC or LOGIC TRANSFORM processing operation; whereby said "X" rows of data in said XY array are processed in sequential column-by-column and row-by-row order.

78. A vector image processor as set forth in claims 76 or 77 wherein said latches N−, N, N+, S−, S and S+, all of said coupling means and said transmitting means are mounted on said processing element.

* * * * *